United States Patent
Lee et al.

(10) Patent No.: US 12,328,684 B2
(45) Date of Patent: Jun. 10, 2025

(54) ELECTRONIC DEVICE AND METHOD FOR CONTROLLING POWER OF TRANSMISSION SIGNAL IN TRANSFORMABLE ELECTRONIC DEVICE

(71) Applicant: Samsung Electronics Co., Ltd., Suwon-si (KR)

(72) Inventors: Changhwa Lee, Suwon-si (KR); Sohee Jang, Suwon-si (KR); Hyungjoon Yu, Suwon-si (KR); Youngkwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 17/689,473

(22) Filed: Mar. 8, 2022

(65) Prior Publication Data
US 2022/0286980 A1   Sep. 8, 2022

Related U.S. Application Data

(63) Continuation of application No. PCT/KR2022/003099, filed on Mar. 4, 2022.

(30) Foreign Application Priority Data

Mar. 8, 2021 (KR) .................. 10-2021-0030174

(51) Int. Cl.
*H04W 52/36* (2009.01)
*H04B 1/3827* (2015.01)
*H04W 52/42* (2009.01)

(52) U.S. Cl.
CPC ........ *H04W 52/367* (2013.01); *H04B 1/3838* (2013.01); *H04W 52/42* (2013.01)

(58) Field of Classification Search
CPC ...... H04B 1/04; H04B 1/3827; H04B 1/3838; H04B 1/40; H04M 1/02; H04W 52/36; H04W 52/367; H04W 52/38; H04W 52/42
See application file for complete search history.

(56) References Cited

U.S. PATENT DOCUMENTS 5,815,820 A * 9/1998 Kiem ................... H04M 1/6075
343/702
9,769,769 B2 * 9/2017 Harper ................... H04B 7/022
(Continued)

FOREIGN PATENT DOCUMENTS

| CN | 110113459 A | 8/2019 |
| JP | 2011-045055 A | 3/2011 |

(Continued)

OTHER PUBLICATIONS

International Search Report dated Jun. 7, 2022, issued in International Patent Application No. PCT/KR2022/003099.
(Continued)

*Primary Examiner* — Nguyen T Vo
(74) *Attorney, Agent, or Firm* — Jefferson IP Law, LLP

(57) ABSTRACT

An electronic device is provided. The electronic device includes first and second housings, a memory, an application processor, a communication processor, a Radio Frequency Integrated Circuit (RFIC) connected with the communication processor, and a plurality of antennas each connected with the RFIC through a Radio Frequency Front-End (RFFE) circuit. The communication processor may identify a change in an antenna-related setting for the plurality of antennas, identify frequency band information about a signal being communicated through at least one antenna among the plurality of antennas, in response to the change in the antenna-related setting, identify folding state information between the first housing and the second housing received
(Continued)

from the application processor, identify, from the memory, a transmission power-related setting value set corresponding to the identified frequency band information, the folding state information, and an event related to the communication processor, and adjust a power of a transmission signal.

17 Claims, 44 Drawing Sheets

(56) References Cited

U.S. PATENT DOCUMENTS

| | | |
|---|---|---|
| 2006/0135079 A1 | 6/2006 | Barnett et al. |
| 2006/0199604 A1 | 9/2006 | Walton et al. |
| 2008/0106477 A1 | 5/2008 | Mashima et al. |
| 2009/0305742 A1 | 12/2009 | Caballero et al. |
| 2010/0029231 A1 | 2/2010 | Martin |
| 2014/0240178 A1 | 8/2014 | Chun et al. |
| 2016/0043751 A1 | 2/2016 | Broyde et al. |
| 2016/0049924 A1 | 2/2016 | Broyde et al. |
| 2017/0192478 A1* | 7/2017 | Mercer .................. G01D 5/142 |
| 2019/0081387 A1 | 3/2019 | Pandya et al. |
| 2019/0103656 A1 | 4/2019 | Shi et al. |
| 2020/0136668 A1 | 4/2020 | Chu et al. |
| 2020/0195336 A1 | 6/2020 | Raghavan et al. |
| 2020/0329435 A1* | 10/2020 | Lee .................... H04M 1/0243 |
| 2021/0328329 A1 | 10/2021 | Kim et al. |
| 2022/0109472 A1 | 4/2022 | Na et al. |

FOREIGN PATENT DOCUMENTS

| | | |
|---|---|---|
| JP | 2013-066226 A | 4/2013 |
| JP | 2018-195955 A | 12/2018 |
| JP | 2019-050555 A | 3/2019 |
| KR | 10-2007-0108280 A | 11/2007 |
| KR | 10-2011-0077362 A | 7/2011 |
| KR | 10-2014-0105886 A | 9/2014 |
| KR | 10-2016-0135812 A | 11/2016 |
| KR | 10-2017-0012447 A | 2/2017 |
| KR | 10-2020-0025439 A | 3/2020 |
| KR | 10-2020-0041970 A | 4/2020 |
| KR | 10-2020-0049391 A | 5/2020 |
| KR | 10-2020-0120134 A | 10/2020 |
| KR | 10-2020-0121199 A | 10/2020 |
| WO | 2017/063497 A1 | 4/2017 |
| WO | 2020/256478 A1 | 12/2020 |

OTHER PUBLICATIONS

European Search Report dated Apr. 30, 2024, issued in European Application No. 22767419.9.
Indian Office Action dated Mar. 28, 2025, issued in an Indian Patent Application No. 202317065470.

* cited by examiner

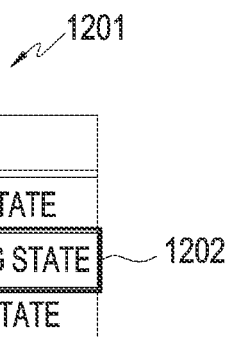
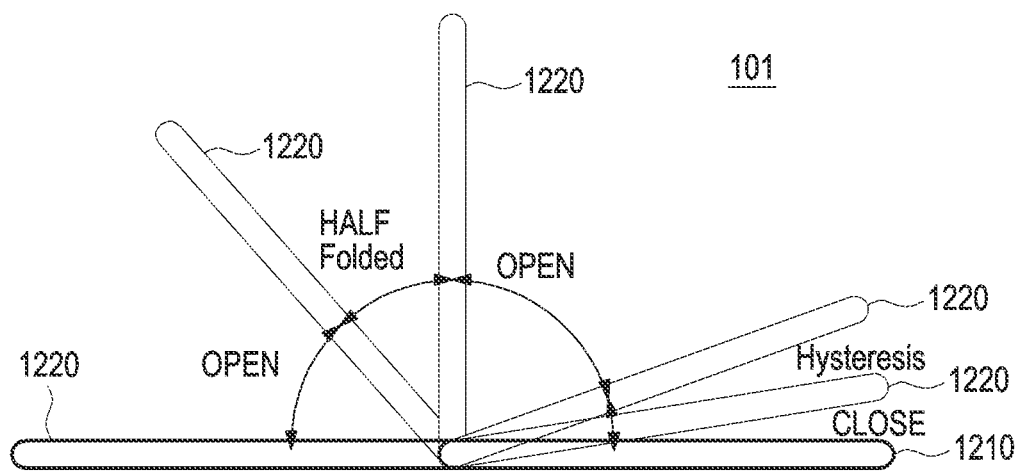
FIG.12A

ELECTRONIC DEVICE AND METHOD FOR CONTROLLING POWER OF TRANSMISSION SIGNAL IN TRANSFORMABLE ELECTRONIC DEVICE

CROSS-REFERENCE TO RELATED APPLICATION(S)

This application is a continuation application, claiming priority under § 365(c), of an International application No. PCT/KR2022/003099, filed on Mar. 4, 2022, which was based on and claimed the benefit of a Korean patent application number 10-2021-0030174, filed on Mar. 8, 2021, in the Korean Intellectual Property Office, the disclosure of which is incorporated by reference herein in its entirety.

TECHNICAL FIELD

The disclosure relates to an electronic device and a method for controlling the power of a transmission signal in a transformable electronic device.

BACKGROUND ART

According to the widespread adaptation of portable terminals providing various functions due to the recent development of a mobile communication technology, efforts to develop a $5^{th}$ generation (5G) communication system to meet an increasing wireless data traffic demand are being made. The 5G communication system considers implementation in a higher frequency band (for example, mmWave band or band of 25 to 60 GHz) in addition to a 3G communication system and a frequency band used for a Long Term Evolution (LTE) communication system in order to provide a higher data transmission speed so as to achieve a higher data transmission rate.

For example, in the 5G communication system, technologies such as beamforming, massive multiple-input and multiple-output (MIMO), Full Dimensional MIMO (FD-MIMO), an array antenna, analog beam-forming, and a large scale antenna are being discussed to mitigate a propagation path loss in the mmWave band and increase a propagation transmission distance.

To transmit a signal from an electronic device to a communication network (e.g., a base station), data generated from a processor or a communication processor in the electronic device may be signal-processed through a Radio Frequency Integrated Circuit (RFIC) and Radio Frequency Front-End (RFFE) circuit and then transmitted to the outside of the electronic device through at least one antenna.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Aspects of the disclosure are to address at least the above-mentioned problems and/or disadvantages and to provide at least the advantages described below. Accordingly, an aspect of the disclosure is to provide an electronic device that provides a plurality of transmission paths (Tx paths) to transmit signals to a communication network (e.g., a base station). The plurality of transmission paths provided by the electronic device may include an RFIC and/or RFFE circuit for each path. Further, each RFFE circuit may be connected with one or more antennas and, accordingly, the plurality of transmission paths may be divided into a plurality of antenna transmission paths (antenna Tx paths) corresponding to the one or more antennas.

In an LTE or 5G communication environment, to increase communication speed and provide high traffic, multi-radio access technology (RAT) interworking (e.g., Evolved Universal Terrestrial Radio Access (E-UTRA), new radio dual-connectivity (EN-DC), or carrier aggregation (CA) technology) may be applied. The total radiation power (TRP) of the electronic device may be expressed as the sum of an antenna gain and the transmission power (Tx power) (e.g., conduction power). The electronic device may change the antenna gain by the antenna switch controller and change the transmission power by the transmission power controller, thereby changing the overall radiation power of the electronic device. For example, when the electronic device changes the antenna gain considering multiple frequency components, such as EN-DC or carrier aggregation, the transmission power controller may not identify the magnitude of the changed overall radiation power, so that it may be difficult to additionally adjust the overall radiation power. As the transmission power controller fails to reflect the change in the overall radiation power, the communication performance of the electronic device may be degraded.

Additional aspects will be set forth in part in the description which follows and, in part, will be apparent from the description, or may be learned by practice of the presented embodiments.

According to various embodiments, there may be provided an electronic device capable of enhancing the communication performance of the electronic device by integratedly managing the state between the antenna gain and the transmission power in an environment in which two or more transmission signals (e.g., 2Tx) are transmitted, such as EN-DC or uplink CA (ULCA), and a method for controlling the power of a transmission signal in a transformable electronic device.

According to various embodiments, there may be provided an electronic device capable of enhancing the communication performance of the electronic device by transmitting a signal based on the transmission power set corresponding to an event related to an application processor or an event related to a communication processor and a method for controlling the power of a transmission signal in a transformable electronic device.

According to various embodiments, there may be provided an electronic device capable of enhancing the communication performance of the electronic device by transmitting a signal based on the transmission power set corresponding to an event related to a communication processor and/or information (e.g., folding state information) related to a transformation when an antenna-related setting is changed in a transformable electronic device and a method for controlling the power of a transmission signal in a transformable electronic device.

Technical Solution

According to various embodiments, an electronic device may comprise a first housing, a second housing pivotably coupled with the first housing, a memory, an application processor, a communication processor, at least one radio frequency integrated circuit (RFIC) connected with the communication processor, and a plurality of antennas each disposed inside or in a portion of the first housing or the second housing and connected with the at least one RFIC through at least one radio frequency front-end (RFFE) circuit to transmit or receive a signal corresponding to at least one communication network. The communication processor may identify a change in an antenna-related setting for the plurality of antennas, identify frequency band information about a signal being communicated through at least one antenna among the plurality of antennas, in response to the change in the antenna-related setting, identify folding state information between the first housing and the second housing received from the application processor, identify, from the memory, a transmission power-related setting value set corresponding to the identified frequency band information, the folding state information, and an event related to the communication processor, and control to adjust a power of a transmission signal to be transmitted through at least one antenna among the plurality of antennas, based on the identified transmission power-related setting value.

According to various embodiments, a method for controlling a power of a transmission signal in an electronic device comprising a first housing, a second housing pivotably coupled with the first housing, a memory, an application processor, a communication processor, at least one RFIC connected with the communication processor, and a plurality of antennas each disposed inside or in a portion of the first housing or the second housing and connected with the at least one RFIC through at least one RFFE circuit to transmit or receive a signal corresponding to at least one communication network, may comprise identifying a change in an antenna-related setting for the plurality of antennas, identifying frequency band information for a signal being communicated through at least one antenna among the plurality of antennas, in response to the change in the antenna-related setting, identifying folding state information between the first housing and the second housing received from the application processor, identifying, from the memory, a transmission power-related setting value set corresponding to the identified frequency band information, the folding state information, and an event related to the communication processor, and adjusting a power of a transmission signal to be transmitted through at least one antenna among the plurality of antennas, based on the identified transmission power-related setting value.

Advantageous Effects

According to various embodiments, it is possible to compensate for loss of transmission power, which may occur in the structure and design of the electronic device, and enhance communication performance by transmitting a signal based on a transmission power set corresponding to an event related to the communication processor and/or information related to a transformation (e.g., folding state information) in a transformable electronic device, such as a foldable electronic device or a slidable electronic device.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which:

FIG. 12A is a view illustrating folding state information about an electronic device according to an embodiment of the disclosure;

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
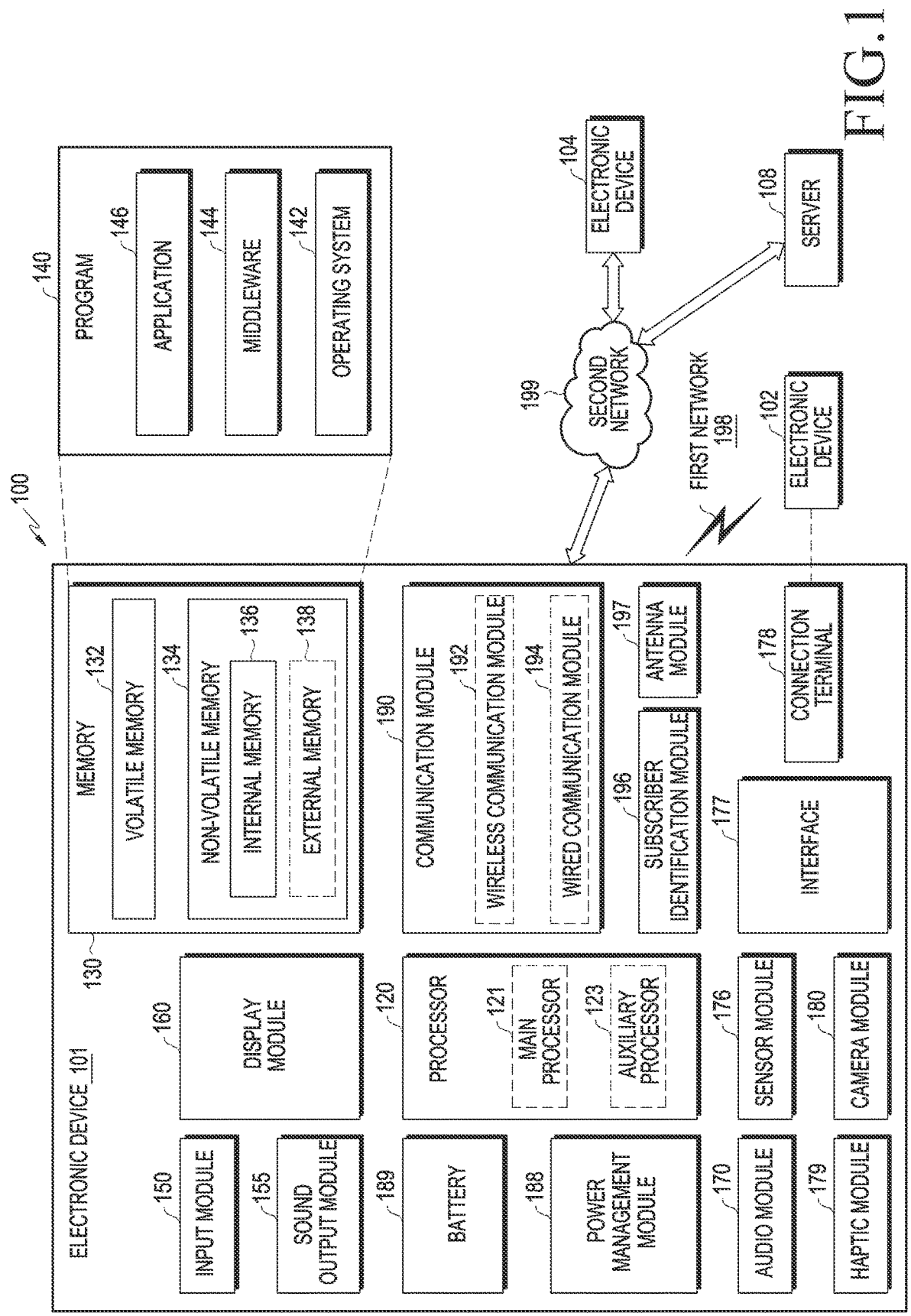
FIG. 1 is a block diagram illustrating an electronic device in a network environment according to an embodiment of the disclosure.

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
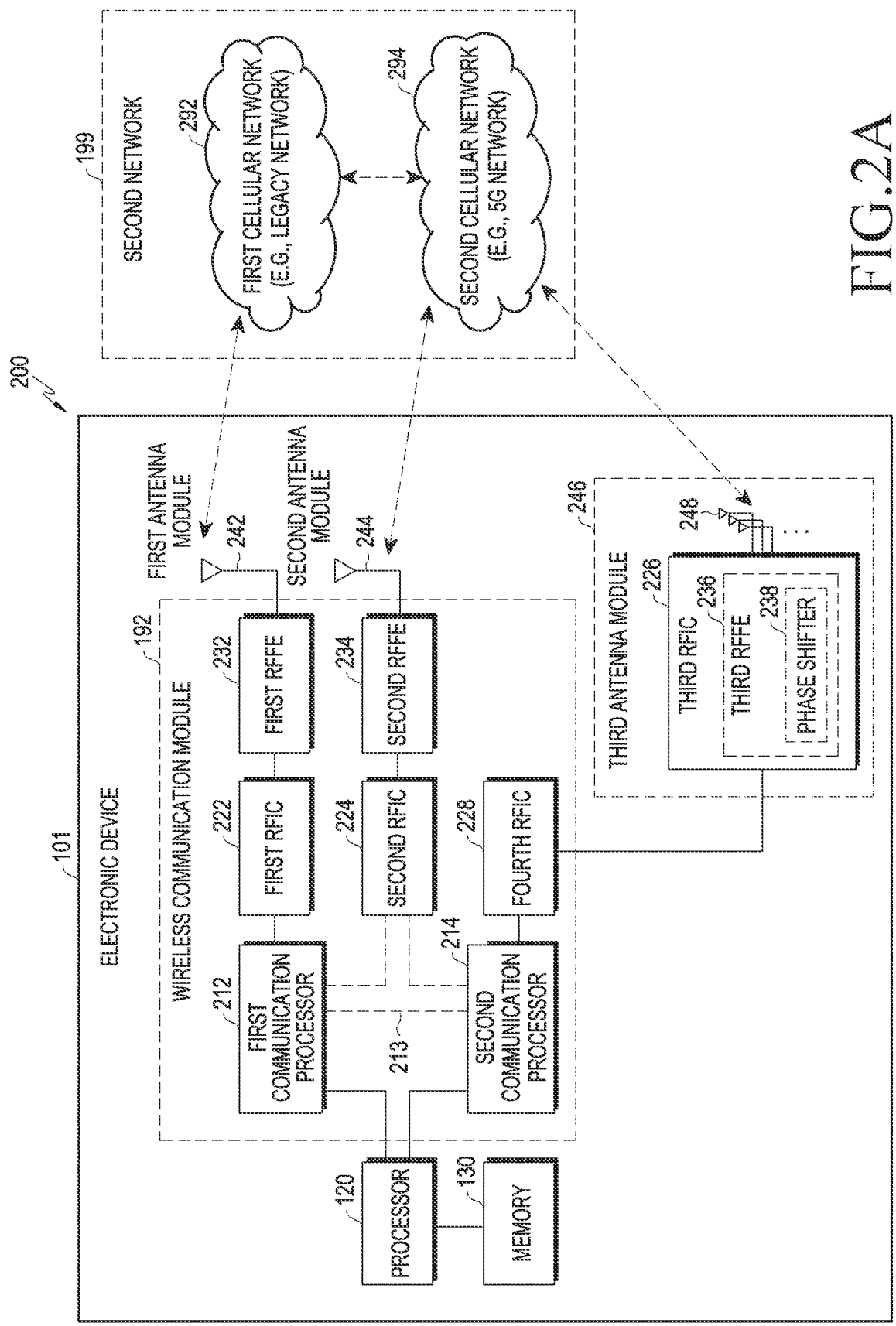
FIG. 2A is a block diagram illustrating an electronic device for supporting legacy network communication and 5G network communication according to an embodiment of the disclosure.

FIG. 2A is a block diagram 200 illustrating an electronic device for supporting legacy network communication and 5G network communication according to an embodiment of the disclosure. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second communication processor 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second communication processor 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment, the first communication processor 212 and the second communication processor 214 may be implemented in a single chip or a single package. According to an embodiment, the first communication processor 212 or the second communication processor 214, along with the processor 120, an auxillary processor 123, or communication module 190, may be formed in a single chip or single package.

Figure 2B:
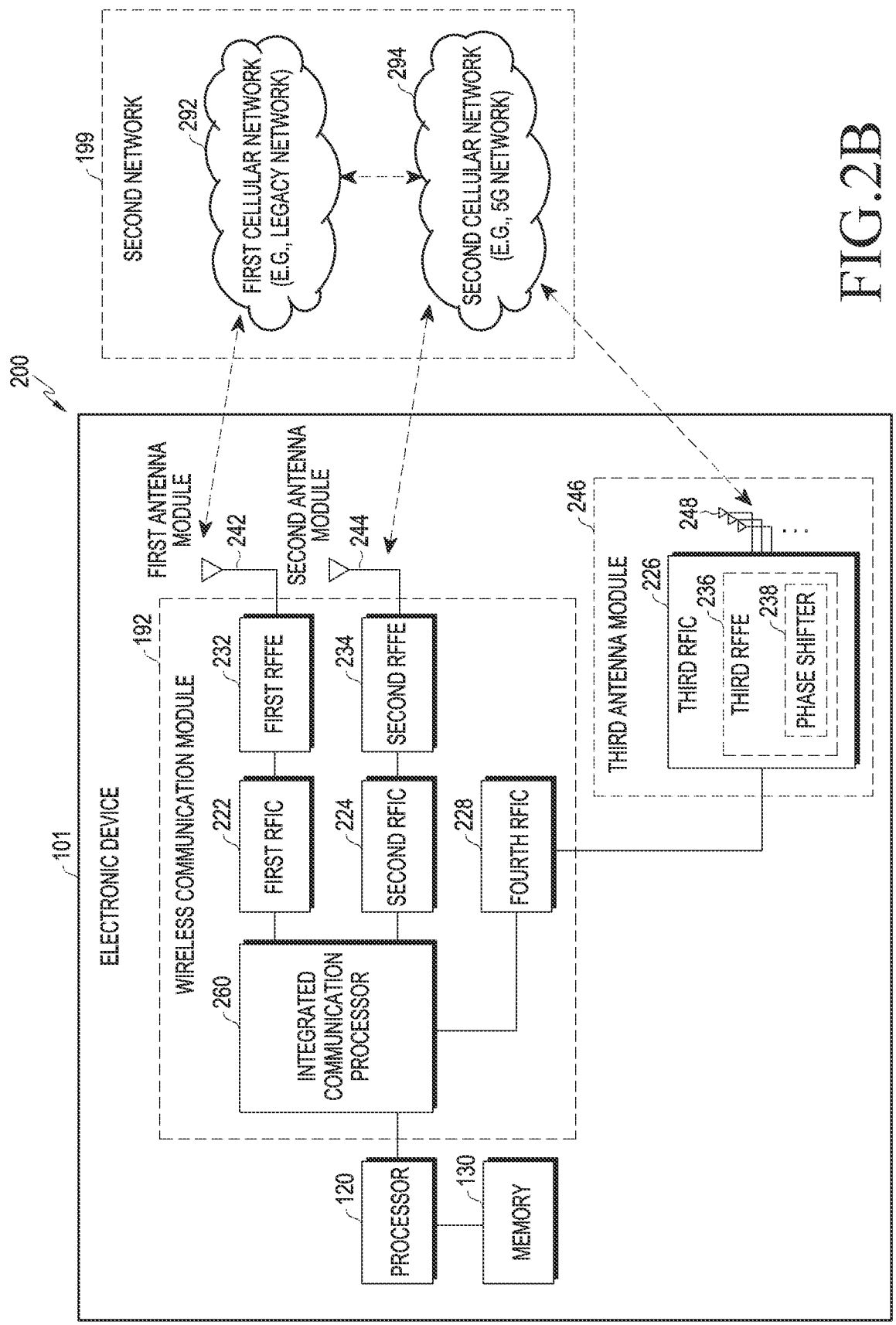
FIG. 2B is a block diagram illustrating an electronic device for supporting legacy network communication and 5G network communication according to an embodiment of the disclosure.

FIG. 2B is a block diagram illustrating an electronic device for supporting legacy network communication and 5G network communication according to various an embodiments of the disclosure Referring to FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second cellular network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 130 and be accessed by other components (e.g., the processor 120, the first communication processor 212, or the second communication processor 214).

Figure 3A:
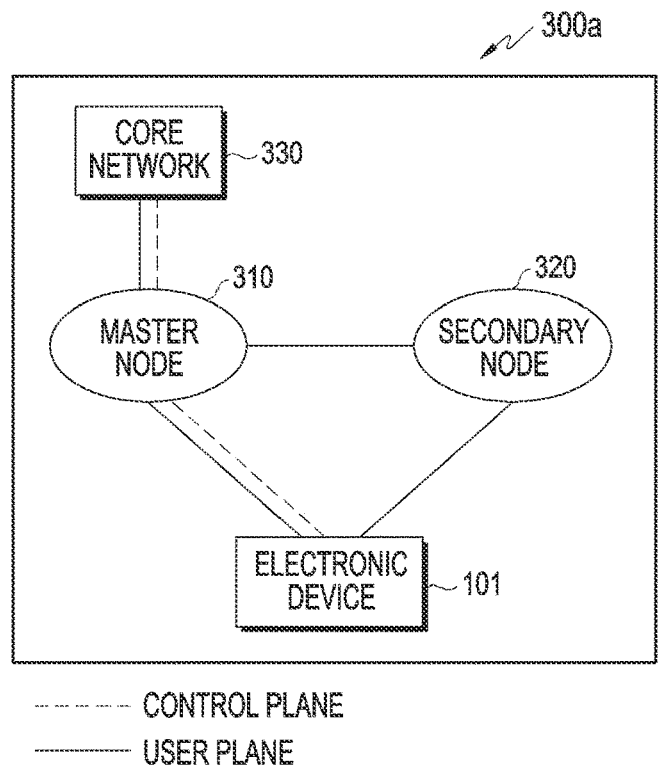
FIG. 3A is a view illustrating wireless communication systems providing a legacy communication network and/or a 5G communication network according to an embodiment of the disclosure.
Figure 3B:
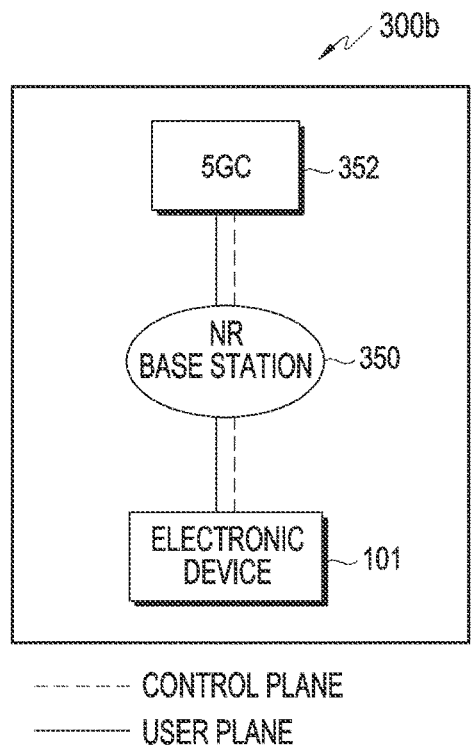
FIG. 3B is a view illustrating wireless communication systems providing a legacy communication network and/or a 5G communication network according to an embodiment of the disclosure.
Figure 3C:
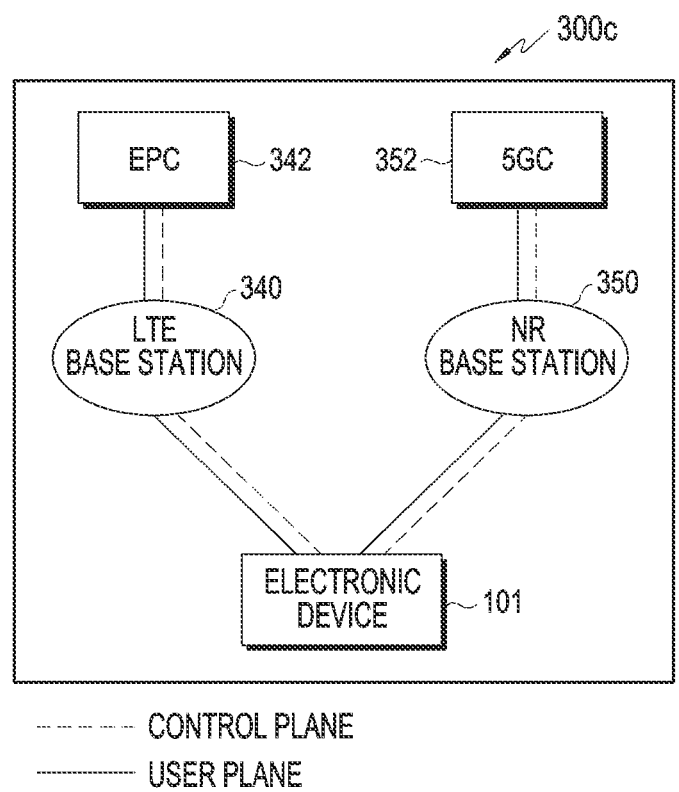
FIG. 3C is a view illustrating wireless communication systems providing a legacy communication network and/or a 5G communication network according to an embodiment of the disclosure.

FIGS. 3A, 3B, and 3C are views illustrating wireless communication systems providing legacy communication and/or 5G communication networks according to various embodiments of the disclosure. Referring to FIGS. 3A, 3B, and 3C, the network environment 301a to 300c may include at least one of a legacy network and a 5G network. The legacy network may include, e.g., a 3GPP-standard 4G or LTE base station 340 (e.g., an eNodeB (eNB)) that supports radio access with the electronic device 101 and an evolved packet core (EPC) 342 that manages 4G communication. The 5G network may include, e.g., a new radio (NR) base station 350 (e.g., a gNodeB (gNB)) that supports radio access with the electronic device 101 and a 5th generation core (5GC) 352 that manages 5G communication for the electronic device 101.

According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may mean, e.g., user data except for control messages transmitted or received between the electronic device 101 and the core network 330 (e.g., the EPC 342).

Referring to FIG. 3A, according to an embodiment, the electronic device 101 may transmit or receive at least one of a control message or user data to/from at least part (e.g., the NR base station 350 or 5GC 352) of the 5G network via at least part (e.g., the LTE base station 340 or EPC 342) of the legacy network.

According to various embodiments, the network environment 300a may include a network environment that provides wireless communication dual connectivity (DC) to the LTE base station 340 and the NR base station 350 and transmits or receives control messages to/from the electronic device 101 via one core network 230 of the EPC 342 or the 5GC 352.

According to various embodiments, in the DC environment, one of the LTE base station 340 or the NR base station 350 may operate as a master node (MN) 310, and the other as a secondary node (SN) 320. The MN 310 may be connected with the core network 230 to transmit or receive control messages. The MN 310 and the SN 320 may be connected with each other via a network interface to transmit or receive messages related to radio resource (e.g., communication channel) management therebetween.

According to an embodiment, the MN 310 may include the LTE base station 340, the SN 320 may include the NR base station 350, and the core network 330 may include the EPC 342. For example, control messages may be transmitted/received via the LTE base station 340 and the EPC 342, and user data may be transmitted/received via at least one of the LTE base station 340 or the NR base station 350.

According to an embodiment, the MN 310 may include the NR base station 350, and the SN 320 may include the LTE base station 340, and the core network 330 may include the 5GC 352. For example, control messages may be transmitted/received via the NR base station 350 and the 5GC 352, and user data may be transmitted/received via at least one of the LTE base station 340 or the NR base station 350.

Referring to FIG. 3B, according to an embodiment, the 5G network may include the NR base station 350 and the 5GC 352 and transmit or receive control messages and user data independently from the electronic device 101.

Referring to FIG. 3C, according to an embodiment, the legacy network and the 5G network each may provide data transmission/reception independently. For example, the electronic device 101 and the EPC 342 may transmit or receive control messages and user data via the LTE base station 340. As another example, the electronic device 101 and the 5GC 352 may transmit or receive control messages and user data via the NR base station 350.

According to various embodiments, the electronic device 101 may be registered in at least one of the EPC 342 or the 5GC 352 to transmit or receive control messages.

According to various embodiments, the EPC 342 or the 5GC 352 may interwork with each other to manage communication for the electronic device 101. For example, mobility information for the electronic device 101 may be transmitted or received via the interface between the EPC 342 and the 5GC 352.

As set forth above, dual connectivity via the LTE base station 340 and the NR base station 350 may be referred to as E-UTRA new radio dual connectivity (EN-DC).

Hereinafter, referring to FIGS. 4A, 4B, 4C, 4D, 4E, 4F, 5A, 5B, 5C, 5D, 6, and 7, the structure and operation of the electronic device 101 according to various embodiments are described in detail. Although each drawing of the embodiments described below illustrates that one communication processor 260 and one RFIC 410 are connected to a plurality of RFFEs 431, 432, 433, and 611 to 640, various embodiments described below are not limited thereto. For example, in various embodiments described below, as illustrated in FIG. 2A or FIG. 2B, a plurality of communication processors 212 and 214 and/or a plurality of RFICs 222, 224, 226, and 228 may be connected to a plurality of RFFEs 431, 432, 433, and 611 to 640.

According to various embodiments, the embodiments described below may be applied to transformable electronic devices. For example, the electronic device 101 described below may include a foldable electronic device which may switch to an unfolding state or a folding state as a first housing and a second housing are pivotably coupled to each other. The electronic device 101 described below may include a rollable or slidable electronic device that may enlarge or shrink the display as a second housing is pivotally coupled to a first housing.

FIGS. 4A, 4B, 4C, 4D, and 4E are block diagrams illustrating an electronic device according to various embodiments of the disclosure.

Figure 4A:
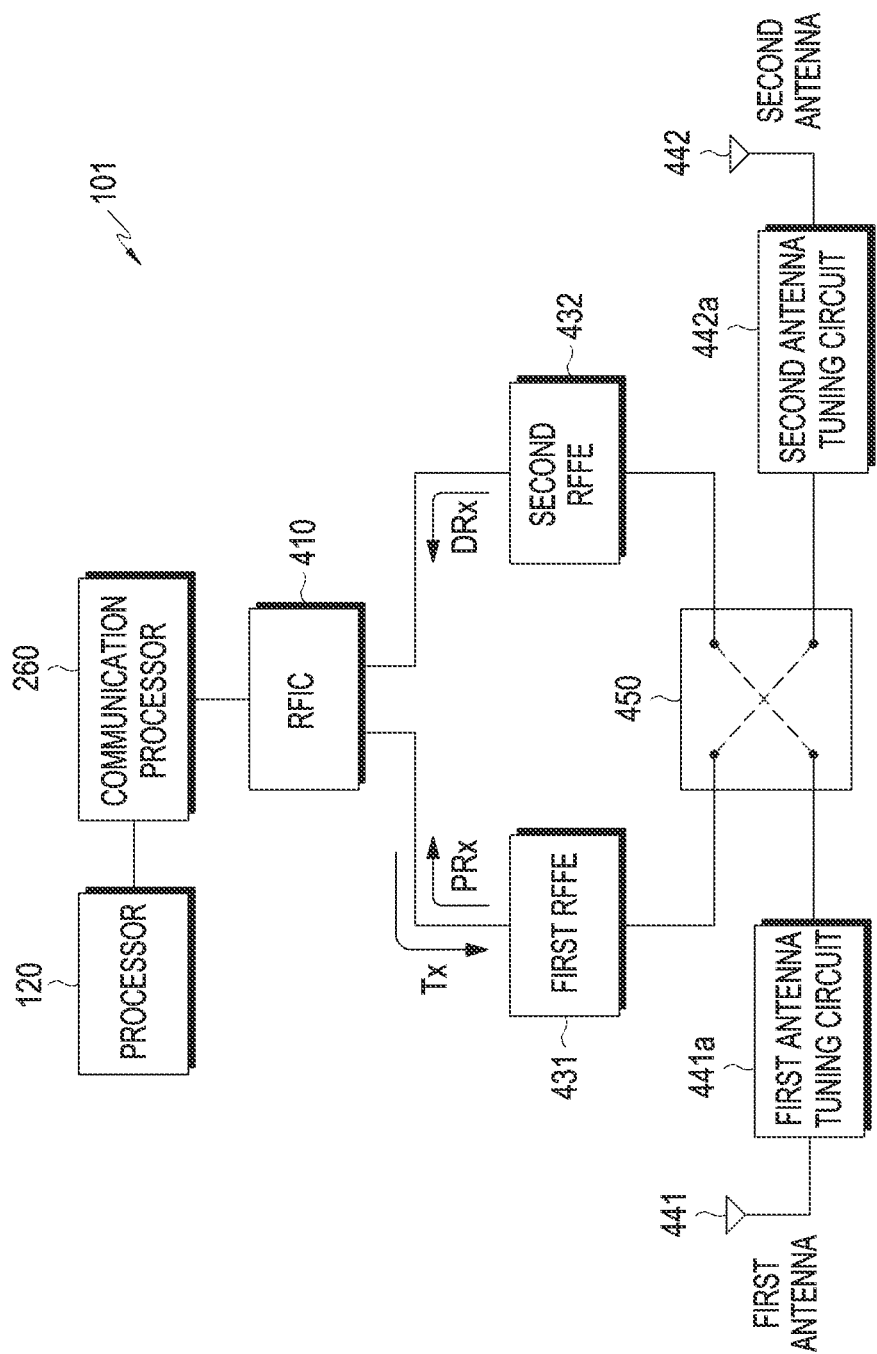
FIG. 4A is a block diagram illustrating an electronic device according to an embodiment of the disclosure.
Figure 4B:
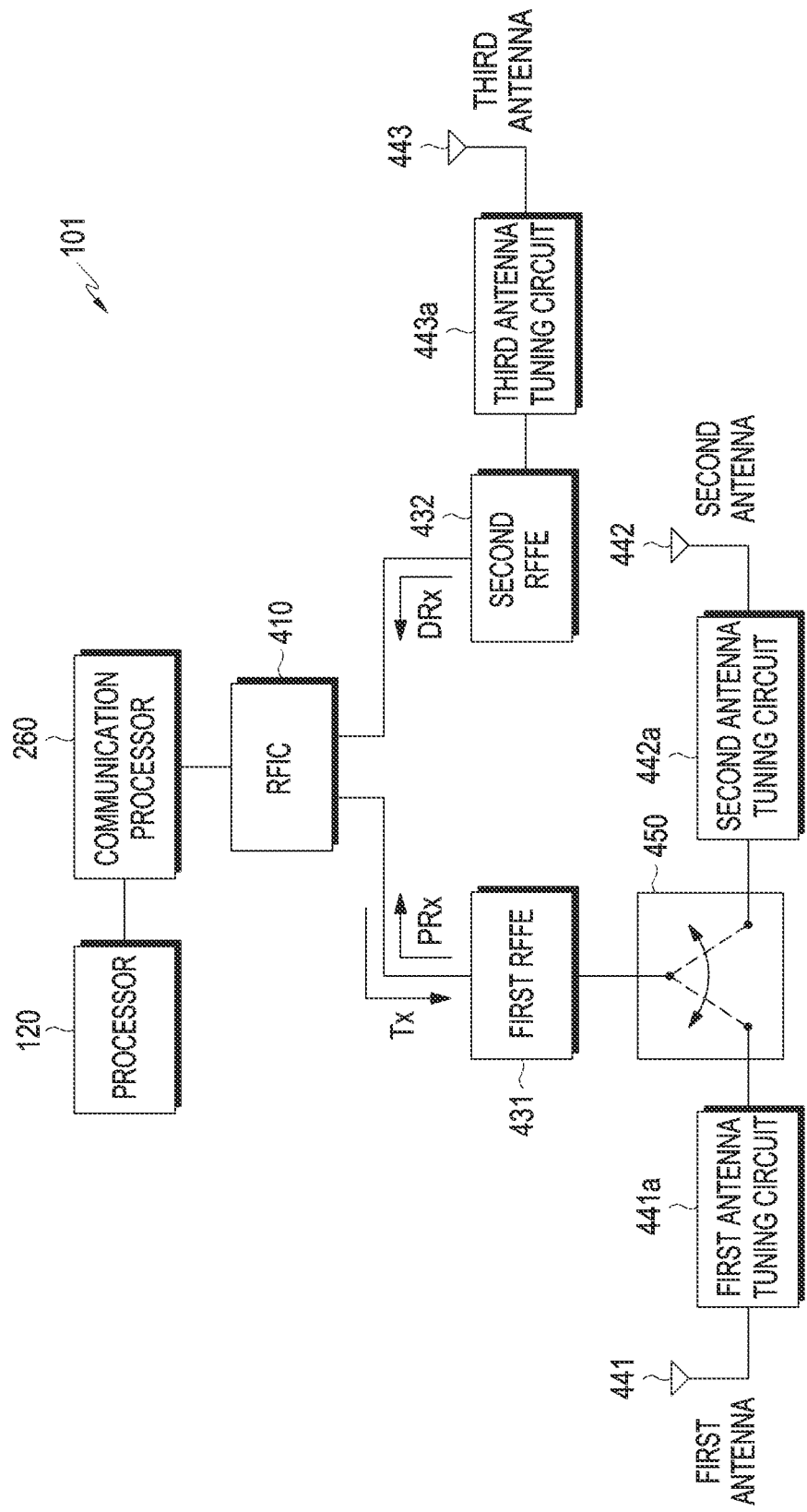
FIG. 4B is a block diagram illustrating an electronic device according to an embodiment of the disclosure.

According to various embodiments, FIG. 4A illustrates an embodiment in which the electronic device 101 includes two antennas 441 and 442 and switches a transmission path, and FIG. 4B illustrates an embodiment in which the electronic device 101 includes three antennas 441, 442, and 443 and switches a transmission path.

Referring to FIG. 4A, according to various embodiments, an electronic device (e.g., the electronic device 101 of FIG. 1) may include a processor 120, a communication processor 260, an RFIC 410, a first RFFE 431, a second RFEE 432, a first antenna 441, a second antenna 442, a switch 450, a first antenna tuning circuit 441a, or a second antenna tuning circuit 442a. For example, the first RFFE 431 may be disposed at an upper end in the housing of the electronic device 101, and the second RFFE 432 may be disposed at a lower end in the housing of the electronic device 101. However, various embodiments are not limited to the placement positions.

According to various embodiments, upon transmission, the RFIC 410 may convert a baseband signal generated by the communication processor 260 into a radio frequency (RF) signal used in the communication network. For example, the RFIC 410 may transmit an RF signal used in the first communication network to the first antenna 441 or the second antenna 442 through the first RFFE 431 and the switch 450.

According to various embodiments, the transmission path of transmission from the RFIC 410 to the first antenna 441 through the first RFFE 431 and the switch 450 may be referred to as a 'first antenna transmission path (Ant Tx 1)'. The transmission path of transmission from the RFIC 410 to the second antenna 442 through the first RFFE 431 and the switch 450 may be referred to as a 'second antenna transmission path (Ant Tx 2)'. According to various embodiments, different path loss may occur in the two antenna transmission paths because the lengths of the transmission paths and/or components disposed on the transmission paths are different from each other. Further, as the antennas (e.g., the first antenna 441 and the second antenna 442) corresponding to each separate antenna transmission path are disposed in different positions on the electronic device 101, different antenna losses may occur.

According to various embodiments, the first antenna tuning circuit 441a may be connected with the front end of the first antenna 441, and the second antenna tuning circuit 442a may be connected to the front end of the second antenna 442. The communication processor 260 may adjust the setting value of the first antenna tuning circuit 441a and the setting value of the second antenna tuning circuit 442a to adjust (e.g., tuning) the characteristics of the signal (e.g., transmission signal Tx) transmitted through each connected antenna and the signal (e.g., reception signal Rx) received through each connected antenna. Detailed embodiments thereof are described below with reference to FIGS. 5A, 5B, 5C, and 5D.

According to various embodiments, the communication processor 260 may control the switch 450 to set the first RFFE 431 to be connected with the first antenna tuning circuit 441a and the first antenna 441. In this case, the transmission signal Tx generated by the communication processor 260 may be transmitted through the RFIC 410, the first RFFE 431, the switch 450, the first antenna tuning circuit 441a, and the first antenna 441.

According to various embodiments, the first antenna 441 may be set as a primary reception (Rx) (PRx) antenna, and the second antenna 442 may be set as a diversity Rx (Drx) antenna. The electronic device 101 may receive and decode the signal transmitted from the base station through the first antenna 441 and/or the second antenna 442. For example, the signal received through the first antenna 441, as a PRx signal, may be transmitted to the communication processor 260 through the first antenna tuning circuit 441a, the switch 450, the first RFFE 431, and the RFIC 410. Further, the signal received through the second antenna 442, as a DRx signal, may be transmitted to the communication processor 260 through the second antenna tuning circuit 442a, the switch 450, the second RFFE 432, and the RFIC 410.

According to various embodiments, the first RFFE 431 may include at least one duplexer or at least one diplexer to process the transmission signal Tx and the reception signal PRx together. The second RFFE 432 may include at least one duplexer or at least one diplexer to process the transmission signal Tx and the reception signal DRx together.

According to various embodiments, the communication processor 260 may control the switch 450 to set the first RFFE 431 to be connected with the second antenna tuning circuit 442a and the second antenna 442. In this case, the transmission signal Tx generated by the communication processor 260 may be transmitted through the RFIC 410, the first RFFE 431, the switch 450, the second antenna tuning circuit 442a, and the second antenna 442.

According to various embodiments, when the first RFFE 431 is set to be connected with the second antenna tuning circuit 442a and the second antenna 442 as described above, the second antenna 442 may be set as a primary reception (Rx) antenna (PRx), and the first antenna 441 may be set as a diversity Rx antenna (DRx). The electronic device 101 may receive and decode the signal transmitted from the base station through the first antenna 441 and the second antenna 442. For example, the signal received through the second antenna 441, as a PRx signal, may be transmitted to the communication processor 260 through the second antenna tuning circuit 442a, the switch 450, the first RFFE 431, and the RFIC 410. Further, the signal received through the first antenna 441, as a DRx signal, may be transmitted to the communication processor 260 through the first antenna tuning circuit 441a, the switch 450, the second RFFE 432, and the RFIC 410.

According to various embodiments, the communication processor 260 may set or change (e.g., switch) an antenna for transmitting the transmission signal Tx by controlling the switch 450 according to various setting conditions. According to various embodiments, the communication processor 260 may set a transmission path corresponding to an antenna capable of radiating the transmission signal Tx in the maximum power. For example, if a transmission signal is transmitted by the electronic device 101 including a plurality of antenna transmission paths as illustrated in FIG. 4A, an optimal antenna transmission path may be set considering the channel environment (e.g., the strength of the reception signal) corresponding to each antenna (e.g., the first antenna 441 and the second antenna 442) and the maximum transmittable power. The communication processor 260 may determine an optimal antenna transmission path and may control the switch 450 so that a transmission signal is transmitted through the determined optimal antenna transmission path.

According to various embodiments, the electronic device 101 (e.g., the communication processor 260) may identify (or identify whether to switch antennas) whether to change the transmission paths of the transmission signal at each set time period (e.g., 640 ms) or when a specific event occurs (e.g., when an SAR event occurs or the electric field situation drastically changes, or upon base station signaling, EN-DC operation, or CA operation).

Figure 4C:
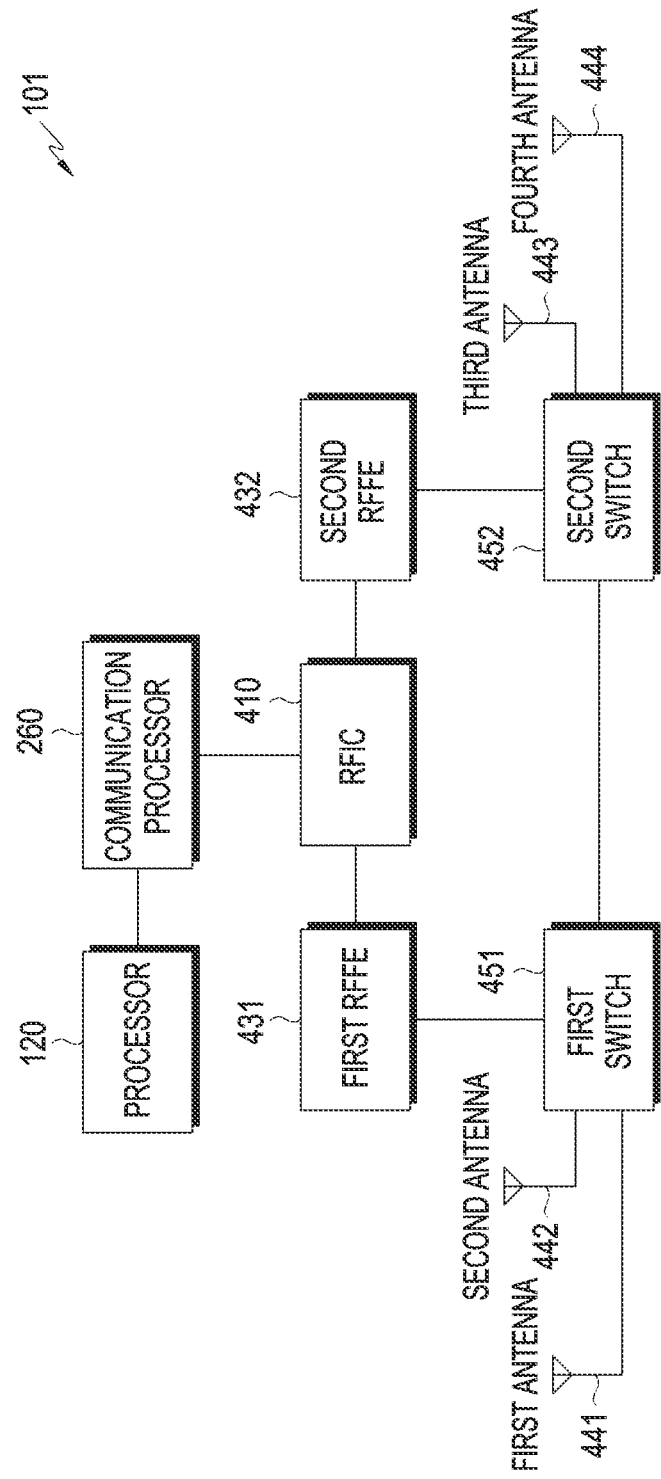
FIG. 4C is a block diagram illustrating an electronic device according to an embodiment of the disclosure.
Figure 4D:
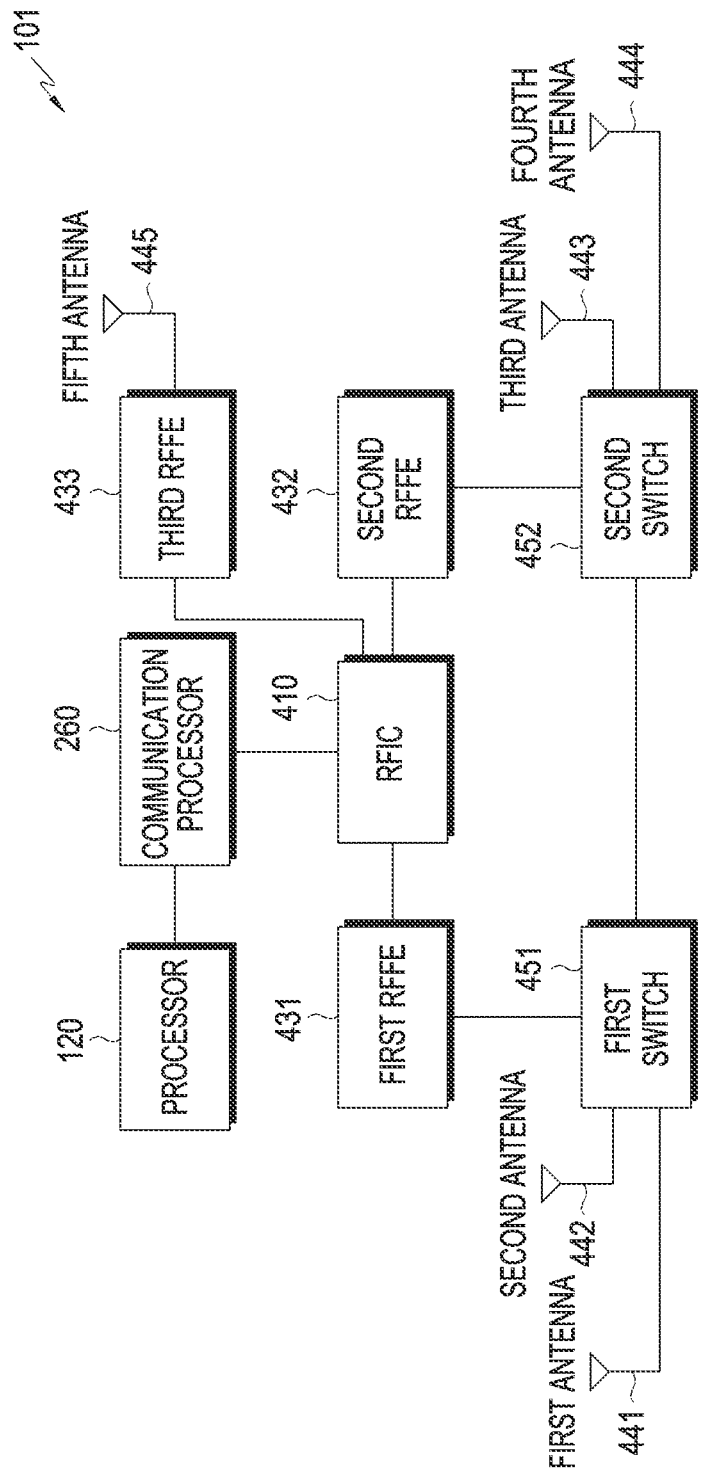
FIG. 4D is a block diagram illustrating an electronic device according to various embodiments.
Figure 4E:
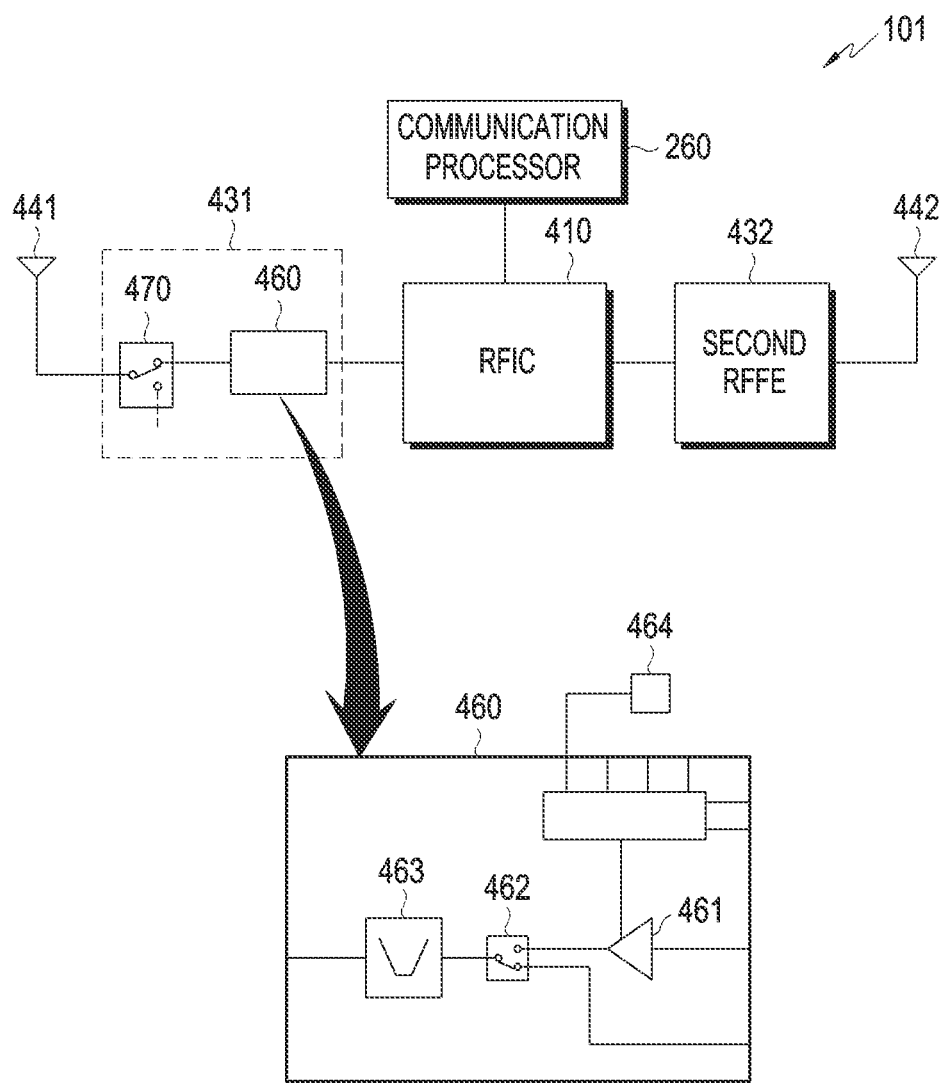
FIG. 4E is a block diagram illustrating an electronic device according to an embodiment of the disclosure.
Figure 4F:
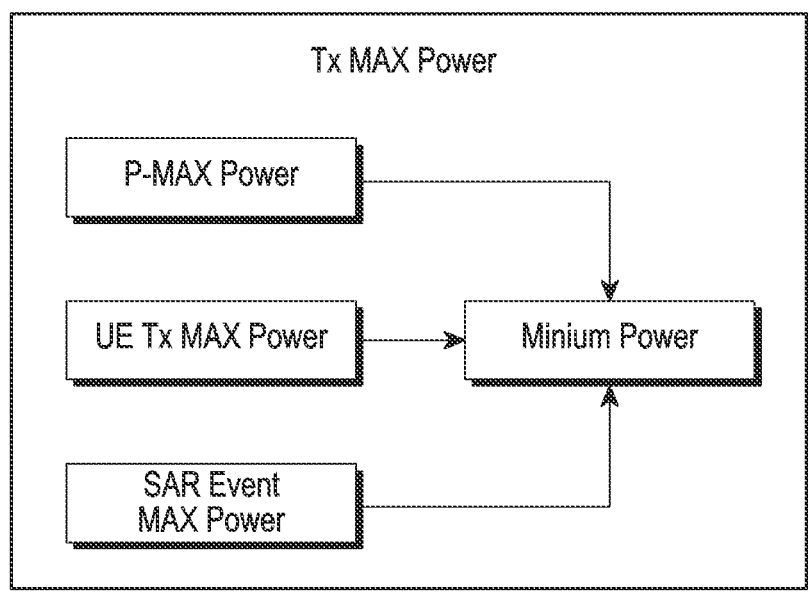
FIG. 4F is a block diagram illustrating an example of a method for determining maximum transmittable power according to an embodiment of the disclosure.

FIG. 4F is a block diagram illustrating an example of a method for determining maximum transmittable power according to an embodiment of the disclosure. Referring to FIG. 4F, according to various embodiments, the maximum transmittable power for each transmission path may be set considering at least one of the maximum transmittable power (P-MAX power (PeMax)) received from each communication network (e.g., a base station), the maximum transmittable power (UE Tx MAX power (PcMax)) for each transmission path set by the electronic device 101, or an SAR event maximum transmittable power (SAR EVENT MAX power) set corresponding to each SAR event considering the specific absorption rate (SAR) backoff. For example, the maximum transmittable power may be determined as a minimum value among the plurality of the above exemplified maximum transmittable powers (e.g., P-MAX power, UE Tx MAX power, and SAR EVENT MAX power), but is not limited thereto. According to various embodiments, the maximum transmittable power of the SAR event may be set to differ according to each SAR event (e.g., a grip event or a proximity event). Hereinafter, an example of determining the maximum transmittable power for each transmission path based on the plurality of maximum transmittable powers exemplified above is described in detail.

According to various embodiments, the maximum transmittable power (P-MAX power) (PeMax) received from the communication network (e.g., a base station) may be set to differ according to the power class (PC) supportable by each communication network or electronic device. For example, when the power class is PC2, it may be determined as a value (e.g., 27 dBm) within a range set with respect to 26 dBm, and it may be determined as a value (e.g., 24 dBm) within a range set with respect to 23 dBm when the power class is PC3.

According to various embodiments, the maximum transmittable power (UE Tx MAX power, PcMax) for each transmission path set in the electronic device 101 may differ as the RFFE for each transmission path is different, and it may also differ as the length of each transmission path is different. Hereinafter, an example in which the maximum transmittable power (UE Tx MAX power, PcMax) for each transmission path set in the electronic device 101 is different for each transmission path is described with reference to FIG. 4F.

FIG. 4E is a block diagram illustrating an electronic device according to an embodiment of the disclosure. Referring to FIG. 4E, according to various embodiments, the electronic device 101 may support communication with a plurality of communication networks. For example, the electronic device 101 may support a first communication network and a second communication network. The first communication network and the second communication network may be different communication networks. For example, the first communication network may be a 5G network, and the second communication network may be a legacy network (e.g., an LTE network). When the first communication network is a 5G network, the first RFFE 431 may be designed to be suitable for processing signals corresponding to the 5G network, and the second RFFE 432 may be designed to be suitable for processing signals corresponding to the legacy network.

According to various embodiments, a frequency band of a signal transmitted through the first RFFE 431 and a frequency band of a signal transmitted through the second RFFE 432 may be the same, similar, or different. For example, the frequency band of the signal transmitted through the first RFFE 431 may be an N41 band (2.6 GHz), which is a frequency band of a 5G network, and the frequency band of the signal transmitted through the second RFFE 432 may be a B41 band (2.6 GHz), which is a frequency band of an LTE network. In this case, the first RFFE 431 and the second RFFE 432 process the same or similar frequency band signals, but the first RFFE 431 may be designed to enable signal processing suitable for the characteristics of the 5G network, and the second RFFE 432 may be designed to enable signal processing suitable for the characteristics of the LTE network.

According to various embodiments, the first RFFE 431 may be designed to process a signal of a wider frequency bandwidth than the second RFFE 432. For example, the first RFFE 431 may be designed to process up to a frequency bandwidth of 100 MHz, and the second RFFE 432 may be designed to process up to a frequency bandwidth of 60 MHz.

According to various embodiments, the first RFFE 431 may include additional components (e.g., a single pole double throw (SPDT) switch for transmitting sounding reference signals (SRSs), a filter to prevent interference between the 5G signal and the WIFI signal of similar bands, a component to separate the WIFI signal from the reception signal, and a duplexer to separate different 5G band signals) different from the second RFFE 432 for multi-band support or for signal processing appropriate for the characteristics of 5G network. Referring to FIG. 4E, the first RFFE 431 may include a front end module (FEM) 460 and a first SPDT switch 470. According to various embodiments, the FEM 460 may include a power amplifier (PA) 461, a switch 462, and a filter 463. According to various embodiments, the FEM 460 may be connected with a PA envelop tracking (ET) IC 464 to amplify power according to the amplitude of the signal, thereby reducing current consumption and heat generation and enhancing the performance of the PA 461.

According to various embodiments, the first SPDT switch 470 may selectively output the first communication network signal (e.g., N41 band signal) and the sounding reference signal (SRS) (e.g., N41 band SRS signal) transmitted through the FEM 460 from the RFIC 410 and transmit it through the first antenna 441. For example, the attenuation (e.g., path loss) caused according to the processing of the transmission signal by the components added for 5G signal processing or multi-band signal processing configured inside the first RFFE 431 and the first SPDT switch 470 for SRS transmission may increase over that in the second RFFE 432. For example, although each of the power amplifier of the first RFFE 431 and the power amplifier of the second RFFE 432 is controlled to transmit the same power of signal by the communication processor 260, since the path loss of the first RFFE 431 is larger than the path loss of the second RFFE 432, the magnitude of the signal transmitted through the first antenna 441 may be smaller than the magnitude of the signal transmitted through the second antenna 442.

Referring to Table 1, as each transmission path differs in the same N41 band (or B41 band), the maximum power may differ for each transmission path.

TABLE 1

| Paths | Path Loss(dB) | Max Power(dBm) |
| --- | --- | --- |
| upper N41 | −4.59 | 24.5 dBm |
| lower N41 | −2.1 | 27 dBm |

Referring to Table 1, it may be seen that the path loss for the upper N41 path transmitted through the first RFFE 431 is larger than the path loss for the lower N41 path transmitted through the second RFFE 432 by 2 dB or more. Referring back to FIG. 4A, according to various embodiments, even when the same magnitude of signal is transmitted from the first RFFE 431, the power actually radiated from the first antenna 441 through the switch 450 and the power actually radiated from the second antenna 442 through the switch 450 may be different from each other. Further, for the maximum transmittable power transmitted from the electronic device 101, the maximum transmittable power when a signal is transmitted through the first RFFE 431 to the first antenna 441, the maximum transmittable power transmitted when a signal is transmitted to the second antenna 442 through the first RFFE 431, the maximum transmittable power when a signal is transmitted through the second RFFE 432 to the first antenna 441, and the maximum transmittable power when a signal is transmitted through the second RFFE 432 to the second antenna 442 may differ from each other.

According to various embodiments, when the first communication network performs transmission/reception of the N41 band signal of the 5G network, the first RFFE 431 may be designed to be appropriate for processing the signal corresponding to the 5G network, and the second RFFE 432 may be designed to be appropriate for processing the mid/high-band LTE signal (e.g., B2 or B41 band signal). At least one of the first RFFE 431 and the second RFFE 432 may be configured in the form of a power amplitude module including duplexer (PAMiD).

According to various embodiments, a frequency band of a signal transmitted through the first RFFE 431 and a frequency band of a signal transmitted through the second RFFE 432 may be the same, similar, or different. For example, the frequency band of the signal transmitted through the first RFFE 431 may be an N41 band (2.6 GHz), which is a high band frequency of a 5G network, and the frequency band of the signal transmitted through the second RFFE 432 may be a B41 band (2.6 GHz), which is a high band frequency of an LTE network. In this case, the first RFFE 431 and the second RFFE 432 process the same or similar frequency band signals, but the first RFFE 431 may be designed to enable signal processing suitable for the characteristics of the 5G network, and the second RFFE 432 may be designed to enable signal processing suitable for the characteristics of the LTE network.

According to another embodiment, the frequency band of the signal transmitted through the first RFFE 431.

may be an N41 band (2.6 GHz), which is a high band frequency of a 5G network, and the frequency band of the signal transmitted through the second RFFE 432 may be a B2 band (1.9 GHz), which is a mid-band frequency of an LTE network.

According to various embodiments, as the second RFFE 432 is designed to be suitable for processing mid/high-band LTE signals (e.g., B2 or B41 band signals), the first RFFE 431 and the electronic device 101 may operate in various types of EN-DC. For example, the first RFFE 431 and the second RFFE 432 may be combined to operate as EN-DC of B2-N41 and they may also operate as EN-DC of B41-N41.

According to various embodiments, the maximum transmittable power (UE Tx MAX power) for each transmission path set in the electronic device 101 may be set further considering a predefined maximum power reduction (MPR) or additional maximum power reduction (A-MPR) as shown in Table 2 and Table 3 below.

TABLE 2

| | MPR(dB) | |
| --- | --- | --- |
| Modulation | Outer RB allocations | Inner RB allocations |
| DFT-s-OFDM PI/2 BPSK | ≤0.5 | 0 |

TABLE 2-continued

| Modulation | MPR(dB) | |
| --- | --- | --- |
| | Outer RB allocations | Inner RB allocations |
| DFT-s-OFDM QPSK | ≤1 | 0 |
| DFT-s-OFDM 16 QAM | ≤2 | ≤1 |
| DFT-s-OFDM 64 QAM | | ≤2.5 |
| DFT-s-OFDM 256 QAM | | ≤4.5 |
| CP-OFDM QPSK | ≤3 | ≤1.5 |
| CP-OFDM 16 QAM | ≤3 | ≤2 |
| CP-OFDM 64 QAM | | ≤3.5 |
| CP-OFDM 256 QAM | | ≤6.5 |

TABLE 3

| Modulation | MPR(dB) | | |
| --- | --- | --- | --- |
| | Edge RB allocations | Outer RB allocations | Inner RB allocations |
| DFT-s-OFDM PI/2 BPSK | ≤3.5 | ≤0.5 | 0 |
| DFT-s-OFDM QPSK | ≤3.5 | ≤1 | 0 |
| DFT-s-OFDM 16 QAM | ≤3.5 | ≤2 | ≤1 |
| DFT-s-OFDM 64 QAM | ≤3.5 | | ≤2.5 |
| DFT-s-OFDM 256 QAM | | ≤4.5 | |
| CP-OFDM QPSK | ≤3.5 | ≤3 | ≤1.5 |
| CP-OFDM 16 QAM | ≤3.5 | ≤3 | ≤2 |
| CP-OFDM 64 QAM | | ≤3.5 | |
| CP-OFDM 256 QAM | | ≤6.5 | |

Referring to Table 2 and Table 3, the maximum transmission power of each antenna transmission path may be set to differ according to a difference in path loss. Table 2 and Table 3 show the MPRs defined according to the 3GPP standard. Table 2 shows the MPR for power class (PC) 3, and Table 3 shows the MPR for power class 2. According to various embodiments, the MPR backoff may vary according to the modulation type or bandwidth (BW) even in the same channel environment. According to various embodiments, when the electronic device 101 receives the power class, as power class 3 of Table 2, from the base station, the maximum power of the first transmission path (e.g., the upper N41 transmission path of the electronic device 101) and the second transmission path (e.g., the lower N41 transmission path of the electronic device 101) may be determined to differ as shown in Table 4 below.

TABLE 4

| Paths | Max Power(dBm) | Max Power by PC3 | CP OFDM Inner 16QAM | CP OFDM Outer 16QAM | CP OFDM 64QAM | CP OFDM 256QAM |
| --- | --- | --- | --- | --- | --- | --- |
| upper N41 | 24.5 dBm | 24 dBm | 22.5 dBm | 21.5 dBm | 21 dBm | 18 dBm |
| lower N41 | 27 dBm | 24 dBm | 24 dBm | 24 dBm | 23.5 dBm | 20.5 dBm |

Figure 8:
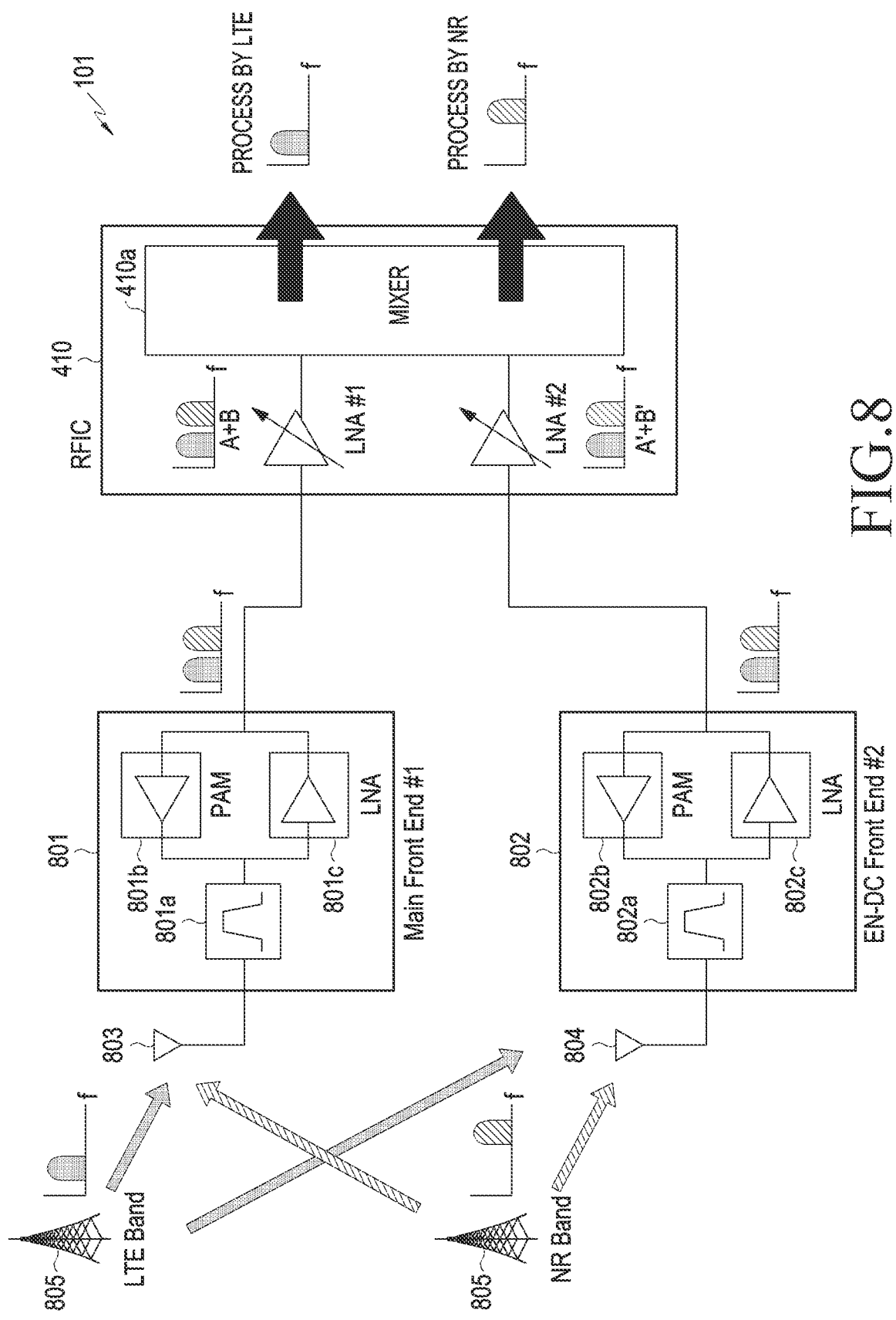
FIG. 8 is a block diagram illustrating an electronic device according to an embodiment of the disclosure.

Referring to Table 4 above, e.g., even in a state in which the maximum transmission power (P-MAX power) received by the electronic device 101 from the base station is the same as 24 dBm corresponding to PC3, if the path loss described in connection with Table 1 and the MPR backoff described in connection with Tables 2 and 3 are applied, the maximum transmittable power for each transmission path may be set to differ according to each modulation type or bandwidth. For example, the maximum transmittable power for the upper N41 transmission path (first transmission path) in Table 4 may be identified as 24 dBm, which is the minimum value as illustrated in FIG. 8, if the maximum transmission power set in the electronic device considering the path loss of Table 1 is 24.5 dBm, and the maximum transmission power corresponding to PC3, which is received from the base station, is 24 dBm. In this case, if the minimum values of P-MAX Power and UE Tx MAX Power are calculated by applying the MPR backoff of Table 2 and Table 3 to UE Tx MAX Power, 22.5 dBm, 21.5 dBm, 21 dBm, and 18 dBm may be identified in cycle prefix (CP) orthogonal frequency-division multiplexing (OFDM) Inner 16 quadrature amplitude modulation (QAM), CP OFDM Outer 16QAM, CP OFDM 64QAM, and CP OFDM 256QAM, respectively, as shown in Table 4.

Further, the maximum transmittable power for the lower N41 transmission path (second transmission path) in Table 4 may be identified as 24 dBm, which is the minimum value as illustrated in FIG. 8, if the maximum transmission power set in the electronic device considering the path loss of Table 1 is 27 dBm, and the maximum transmission power corresponding to PC3, which is received from the base station, is 24 dBm. In this case, if the minimum values of P-MAX Power and UE Tx MAX Power are calculated by applying the MPR backoff of Table 2 and Table 3 to UE Tx MAX Power, 24 dBm, 24 dBm, 23.5 dBm, and 20.5 dBm may be identified in CP OFDM Inner 16QAM, CP OFDM Outer 16QAM, CP OFDM 64QAM, and CP OFDM 256QAM, respectively, as shown in Table 4.

Referring to Table 4, as the application of the MPR is varied depending on the modulation scheme or bandwidth so that the UE Tx MAX Power is varied, the difference in the maximum transmittable power for each transmission path finally calculated according to FIG. 8 may be shown as different. For example, the maximum transmittable power for each transmission path may differ by 1.5 dB in CP OFDM Inner 16QAM, by 2.5 dB in CP OFDM Outer 16QAM, by 1.5 dB in CP OFDM 64QAM, and by 1.5 dB in CP OFDM 256QAM.

According to various embodiments, upon determining the maximum transmittable power, the SAR event maximum transmittable power set considering the SAR backoff may be further considered. For example, referring to Table 5 below, if SAR backoff is applied according to the SAR event for each type, the maximum transmittable power for each path may vary. For example, if a SAR event, such as a grip event or a proximity event, is detected by the sensor, the electronic device 101 may apply the SAR backoff corresponding to each SAR event to the maximum transmittable power.

TABLE 5

| Paths | Max Power(dBm) | GRIP Event | Proximity |
|---|---|---|---|
| upper band | 24 dBm | 24 dBm | 19 dBm |
| lower band | 24 dBm | 21 dBm | 24 dBm |

Referring to Table 5, if a proximity event occurs, the SAR backoff for the proximity event is applied to the upper N41 transmission path (first transmission path) so that the maximum transmittable power may be determined as 19 dBm and, if a grip event occurs, the SAR backoff for the grip event is applied to the lower N41 transmission path (second transmission path) so that the maximum transmittable power may be determined as 21 dBm. For example, the grip event may be detected by a touch sensor when the user grips the electronic device 101 in her hand, and the proximity event may be detected by the proximity sensor when the user approaches the electronic device 101 for a phone call. The event detection result by each sensor may be transferred to the communication processor 260 through the processor 120. Hereinafter, an electronic device according to various embodiments is described with reference to FIGS. 4B, 4C, and 4D. In the embodiments described below, since the methods for determining the transmission path described above with reference to FIG. 4A may be applied in the same or similar manner, the overlapping description will be omitted.

FIG. 4B is a block diagram illustrating an electronic device according to various embodiments.

Referring to FIG. 4B, according to various embodiments, an electronic device (e.g., the electronic device 101 of FIG. 1) may include a processor 120, a communication processor 260, an RFIC 410, a first RFFE 431, a second RFEE 432, a first antenna 441, a second antenna 442, a third antenna 443, a switch 450, a first antenna tuning circuit 441a, a second antenna tuning circuit 442a, or a third antenna tuning circuit 443a. For example, the first RFFE 431 may be disposed at an upper end in the housing of the electronic device 101, and the second RFFE 432 may be disposed at a lower end in the housing of the electronic device 101. However, various embodiments of the disclosure are not limited to the placement positions.

According to various embodiments, upon transmission, the RFIC 410 may convert a baseband signal generated by the communication processor 260 into a radio frequency (RF) signal used in the communication network. For example, the RFIC 410 may transmit an RF signal used in the first communication network to the first antenna 441 or the second antenna 442 through the first RFFE 431 and the switch 450.

According to various embodiments, the transmission path of transmission from the RFIC 410 to the first antenna 441 through the first RFFE 431 and the switch 450 may be referred to as a 'first antenna transmission path (Ant Tx 1)'. The transmission path of transmission from the RFIC 410 to the second antenna 442 through the first RFFE 431 and the switch 450 may be referred to as a 'second antenna transmission path (Ant Tx 2)'. According to various embodiments, different path loss may occur in the two antenna transmission paths because the lengths of the transmission paths and components disposed on the transmission paths are different from each other. Further, as the antennas (e.g., the first antenna 441 and the second antenna 442) corresponding to each separate antenna transmission path are disposed in different positions on the electronic device 101, different antenna losses may occur. Further, the first antenna tuning circuit 441a may be connected with the front end of the first antenna 441, and the second antenna tuning circuit 442a may be connected to the front end of the second antenna 442. The communication processor 260 may adjust the setting value of the first antenna tuning circuit 441a and the setting value of the second antenna tuning circuit 442a to tune the signal (e.g., transmission signal Tx) transmitted through each connected antenna and the signal (e.g., reception signal Rx) received through each connected antenna. A detailed description thereof is given below in connection with FIGS. 5A, 5B, 5C, and 5D.

According to various embodiments, the communication processor 260 may control the switch 450 to set the first RFFE 431 to be connected with the first antenna tuning circuit 441a and the first antenna 441. In this case, the transmission signal Tx generated by the communication processor 260 may be transmitted through the RFIC 410, the first RFFE 431, the switch 450, the first antenna tuning circuit 441a, and the first antenna 441.

According to various embodiments, the first antenna 441 may be set as a primary reception (Rx) (PRx) antenna, and the third antenna 443 may be set as a diversity Rx (Drx) antenna. The electronic device 101 may receive and decode the signal transmitted from the base station through the first antenna 441 and the third antenna 443. For example, the signal received through the first antenna 441, as a PRx signal, may be transmitted to the communication processor 260 through the first antenna tuning circuit 441a, the switch 450, the first RFFE 431, and the RFIC 410. Further, the signal received through the third antenna 443, as a DRx signal, may be transmitted to the communication processor 260 through the third antenna tuning circuit 443a, the second RFFE 432, and the RFIC 410.

According to various embodiments, the communication processor 260 may control the switch 450 to set the first RFFE 431 to be connected with the second antenna tuning circuit 442a and the second antenna 442. In this case, the transmission signal Tx generated by the communication processor 260 may be transmitted through the RFIC 410, the first RFFE 431, the switch 450, the second antenna tuning circuit 442a, and the second antenna 442.

According to various embodiments, the second antenna 442 may be set as a primary reception (Rx) (PRx) antenna, and the third antenna 443 may be set as a diversity Rx (Drx) antenna. The electronic device 101 may receive and decode the signal transmitted from the base station through the second antenna 442 and the third antenna 443. For example, the signal received through the second antenna 442, as a PRx signal, may be transmitted to the communication processor 260 through the second antenna tuning circuit 442a, the switch 450, the first RFFE 431, and the RFIC 410. Further, the signal received through the third antenna 443, as a DRx signal, may be transmitted to the communication processor 260 through the third antenna tuning circuit 443a, the second RFFE 432, and the RFIC 410.

FIGS. 4C and 4D are block diagrams illustrating electronic devices according to various embodiments. According to various embodiments, FIG. 4C illustrates an embodiment in which the electronic device 101 has two transmission paths with respect to the RFFE and operates as standalone (SA) or non-standalone (NSA), and FIG. 4D illustrates an embodiment in which the electronic device 101 has three transmission paths with respect to the RFFE and operates as NSA.

Referring to FIG. 4C, according to various embodiments, an electronic device (e.g., the electronic device 101 of FIG. 1) may include a processor 120, a communication processor 260, an RFIC 410, a first RFFE 431, a second RFEE 432, a first antenna 441, a second antenna 442, a third antenna 443, a fourth antenna 444, a first switch 451, or a second switch 452. For example, the first RFFE 431 may be disposed at an upper end in the housing of the electronic device 101, and the second RFFE 432 may be disposed at a lower end in the housing of the electronic device 101. However, various embodiments of the disclosure are not limited to the placement positions.

According to various embodiments, upon transmission, the RFIC 410 may convert a baseband signal generated by the communication processor 260 into a radio frequency (RF) signal used in the first communication network. For example, the RFIC 410 may transmit an RF signal used in the first communication network to the first antenna 441 or the second antenna 442 through the first RFFE 431 and the first switch 451. Further, the RFIC 410 may transmit an RF signal used in the first communication network to the third antenna 443 or the fourth antenna 444 through the first RFFE 431, the first switch 451, and the second switch 452.

According to various embodiments, upon transmission, the RFIC 410 may convert a baseband signal generated by the communication processor 260 into a radio frequency (RF) signal used in the second communication network. For example, the RFIC 410 may transmit an RF signal used in the second communication network to the third antenna 443 or the fourth antenna 444 through the second RFFE 432 and the second switch 452. Further, the RFIC 410 may transmit an RF signal used in the second communication network to the first antenna 441 or the second antenna 442 through the second RFFE 432, the second switch 452, and the first switch 451.

According to various embodiments, the transmission path of transmission from the RFIC 410 to the first antenna 441 through the first RFFE 431 and the first switch 451 may be referred to as a 'first antenna transmission path (Ant Tx 1)'. The transmission path of transmission from the RFIC 410 to the second antenna 442 through the first RFFE 43 1and the first switch 451 may be referred to as a 'second antenna transmission path (Ant Tx 2)'. The transmission path of transmission from the RFIC 410 to the third antenna 443 through the first RFFE 431, the first switch 451, and the second switch 452 may be referred to as a 'third antenna transmission path (Ant Tx 3)'. The transmission path of transmission from the RFIC 410 to the fourth antenna 444 through the first RFFE 431, the first switch 451, and the second switch 452 may be referred to as a 'fourth antenna transmission path (Ant Tx 4)'. According to various embodiments, different path loss may occur in the four antenna transmission paths because the lengths of the transmission paths and components disposed on the transmission paths are different from each other.

FIG. 4D is a block diagram illustrating an electronic device according to an embodiment of the disclosure.

Referring to FIG. 4D, according to various embodiments, an electronic device (e.g., the electronic device 101 of FIG. 1) may include a processor 120, a communication processor 260, an RFIC 410, a first RFFE 431, a second RFEE 432, a third RFEE 433, a first antenna 441, a second antenna 442, a third antenna 443, a fourth antenna 444, and a fifth antenna 445.

According to various embodiments, upon transmission, the RFIC 410 may convert a baseband signal generated by the communication processor 260 into a radio frequency (RF) signal used in the first communication network or the second communication network. For example, the RFIC 410 may transmit an RF signal used in the first communication network to the first antenna 441 or the second antenna 442 through the first RFFE 431 and the first switch 451. Further, the RFIC 410 may transmit an RF signal used in the first communication network to the third antenna 443 or the fourth antenna 444 through the first RFFE 431, the first switch 451, and the second switch 452.

According to various embodiments, upon transmission, the RFIC 410 may convert a baseband signal generated by the communication processor 260 into a radio frequency (RF) signal used in the second communication network. For example, the RFIC 410 may transmit an RF signal used in the second communication network to the third antenna 443 or the fourth antenna 444 through the second RFFE 432 and the second switch 452. Further, the RFIC 410 may transmit an RF signal used in the second communication network to the first antenna 441 or the second antenna 442 through the second RFFE 432, the second switch 452, and the first switch 451.

According to various embodiments, upon transmission, the RFIC 410 may convert a baseband signal generated by the communication processor 260 into a radio frequency (RF) signal used in the third communication network. For example, the RFIC 410 may transmit an RF signal used in the third communication network to the fifth antenna 445 through the third RFEE 433.

According to various embodiments, upon reception, an RF signal may be obtained from the first communication network through the first antenna 441 or the second antenna 442 and may go through the first switch 451 and be preprocessed through the first RFFE 431. The RFIC 410 may convert the RF signal preprocessed through the first RFFE 431 into a baseband signal to be processed by the communication processor 260. Further, an RF signal may be obtained from the second communication network through the third antenna 443 or the fourth antenna 444 and may go through the second switch 452 and be preprocessed through the second RFFE 432. The RFIC 410 may convert the RF signal preprocessed through the second RFFE 432 into a baseband signal to be processed by the communication processor 260. Further, an RF signal may be obtained from the third communication network through the fifth antenna 445 and may be preprocessed through the third RFFE 433. The RFIC 410 may convert the RF signal preprocessed through the third RFFE 433 into a baseband signal to be processed by the communication processor 260.

According to various embodiments, the first communication network, the second communication network, and the third communication network may be the same or different communication networks. For example, the first communication network may be a 5G network, and the second communication network and the third communication network may be legacy networks (e.g., LTE networks). According to various embodiments, the second communication network and the third communication network may support communication of different frequency bands even though they are the same LTE networks. For example, the second communication network may be a communication network that transmits and receives high-band LTE (e.g., B41 band) signals, and the fourth communication network may be a communication network that transmits and receives low-band LTE (e.g., B5 band, B12 band, or B71 band) signals. According to various embodiments, the low band frequency may be 0.6 GHz to 1.0 GHz, the mid-band frequency may be 1.7 GHz to 2.2 GHz, and the high band frequency may be 2.3 GHz to 3.7 GHz. However, this is merely for aid in understanding, and various embodiments are not limited to the specific frequency ranges.

According to various embodiments, when the first communication network performs transmission/reception of the N41 band signal of the 5G network, the first RFFE 431 may be designed to be appropriate for processing the signal corresponding to the 5G network, the second RFFE 432 may be designed to be appropriate for processing the high-band LTE signal (e.g., B41 band signal), and the third RFFE 433 may be designed to be appropriate for the low band LTE signal (e.g., B5 band signal). At least one of the second RFFE 432 and the third RFFE 433 may be configured in the form of a power amplitude module including duplexer (PAMiD).

According to various embodiments, a frequency band of a signal transmitted through the first RFFE 431 and a frequency band of a signal transmitted through the second RFFE 432 may be the same, similar, or different. For example, the frequency band of the signal transmitted through the first RFFE 431 may be an N41 band (2.6 GHz), which is a frequency band of a 5G network, and the frequency band of the signal transmitted through the second RFFE 432 may be a B41 band (2.6 GHz), which is a frequency band of an LTE network. In this case, the first RFFE 431 and the second RFFE 432 process the same or similar frequency band signals, but the first RFFE 431 may be designed to enable signal processing suitable for the characteristics of the 5G network, and the second RFFE 432 may be designed to enable signal processing suitable for the characteristics of the LTE network.

According to various embodiments, the first RFFE 431 may be designed to process a signal of a wider frequency bandwidth than the second RFFE 432. For example, the first RFFE 431 may be designed to process up to a frequency bandwidth of 100 MHz, and the second RFFE 432 may be designed to process up to a frequency bandwidth of 60 MHz.

According to various embodiments, the first RFFE 431 may include additional components (e.g., an SPDT switch for transmitting sounding reference signals (SRSs), a filter to prevent interference between the 5G signal and the WIFI signal of similar bands, a component to separate the WIFI signal from the reception signal, and a duplexer to separate different 5G band signals) different from the second RFFE 432 for multi-band support or for signal processing appropriate for the characteristics of 5G network. Since the first RFFE 431 further include an additional component as compared to the second RFFE 432, greater attenuation (e.g., path loss) may occur due to the processing of the transmission signal. For example, although each of the power amplifier of the first RFFE 431 and the power amplifier of the second RFFE 432 is controlled to transmit the same power of signal by the RFIC 410, since the path loss of the first RFFE 431 is larger than the path loss of the second RFFE 432, the magnitude of the signal transmitted through the first antenna 441 may be smaller than the magnitude of the signal transmitted through the second antenna 442.

FIGS. 5A to 5D are views illustrating antenna tuning circuits according to various embodiments of the disclosure.

Figure 5A:
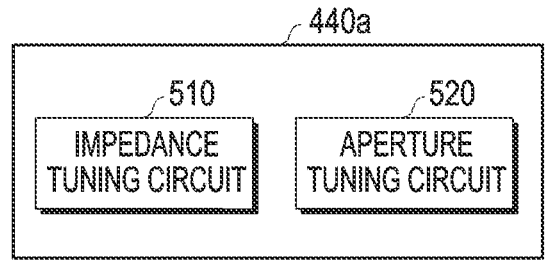
FIG. 5A is a view illustrating an antenna tuning circuit according to an embodiment of the disclosure.
Figure 5B:
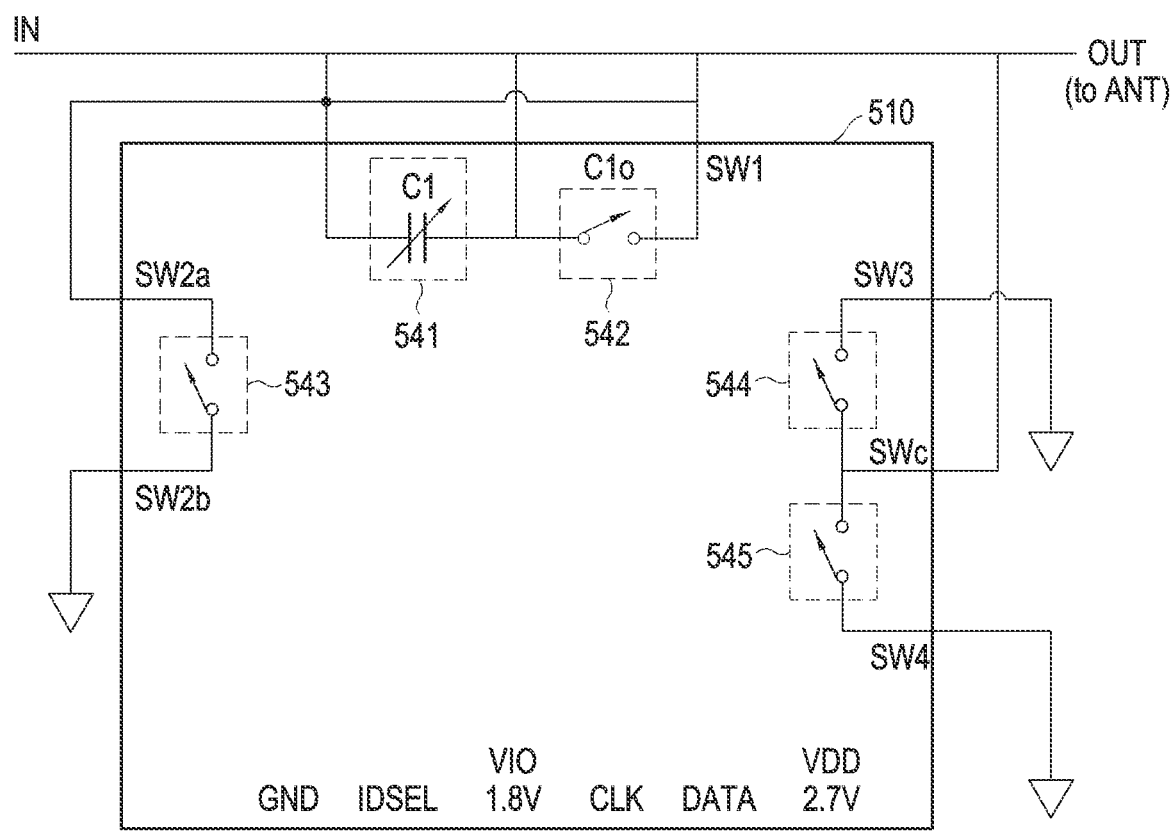
FIG. 5B is a view illustrating an antenna tuning circuit according to an embodiment of the disclosure.
Figure 5C:
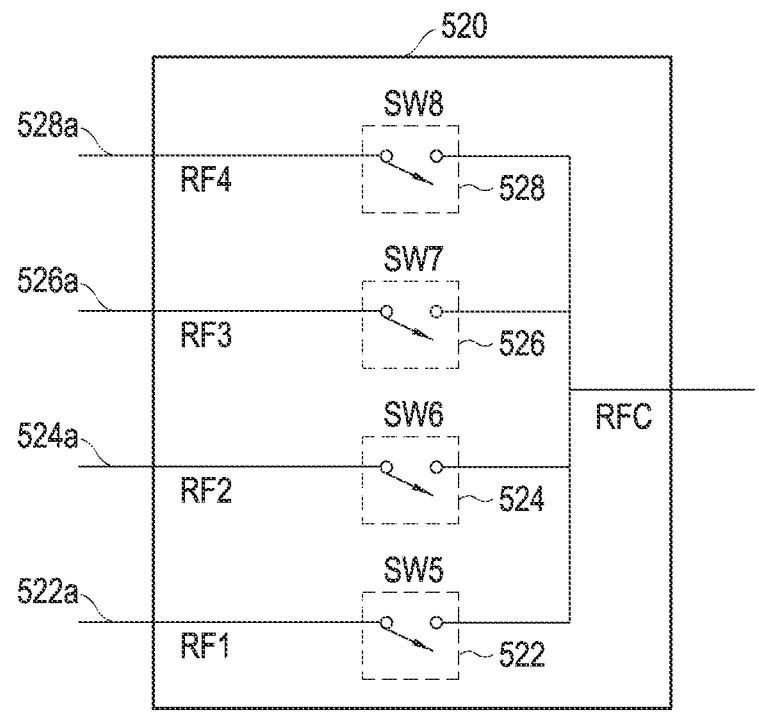
FIG. 5C is a view illustrating an antenna tuning circuit according to an embodiment of the disclosure.

Referring to FIG. 5A, an antenna tuning circuit 440*a* (e.g., the first antenna tuning circuit 441*a*, the second antenna tuning circuit 442*a*, and the third antenna tuning circuit 443*a* of FIG. 4A) according to various embodiments may include at least one impedance tuning circuit 510 and at least one aperture tuning circuit 520. The second antenna tuning circuit 442*a* may be implemented in the same way as the first antenna tuning circuit 441*a* but may be implemented differently. The impedance tuning circuit 510 according to various embodiments may be configured to perform impedance matching with the network according to the control of at least one processor (e.g., the processor 120, the communication processor 212 or 214, and/or the integrated communication processor 260). The aperture tuning circuit 520 according to various embodiments may change the structure of the antenna by turning on/off the switch according to the control of at least one processor. FIG. 5B illustrates a circuit diagram for describing the impedance tuning circuit 510. FIG. 5C illustrates a circuit diagram for describing the aperture tuning circuit 520.

Referring to FIG. 5B, the impedance tuning circuit 510 according to various embodiments may include at least one variable capacitor 541, a first switch 542, a second switch 543, a third switch 544, and a fourth switch 545. According to various embodiments, the number of the variable capacitor 541, the first switch 542, the second switch 543, the third switch 544, and the fourth switch 545 may be changed. At least one variable capacitor 541, the first switch 542, the second switch 543, the third switch 544, and the fourth switch 545 according to various embodiments may be implemented on one chip. The variable capacitor 541 according to various embodiments may have, e.g., 16 values (e.g., capacitance values). According to various embodiments, the number of capacitance values of the variable capacitor 541 may be changed. In this case, the impedance tuning circuit 510 according to various embodiments may have a total of 256 settable values (e.g., impedance values) (16 (the number of values that the variable capacitor may have)×16 (the number of cases that may be obtained by combinations of four switches). The variable capacitor 541 according to various embodiments may be electrically connected to the first switch 542. One end of each of the second switch 543, the third switch 544, and the fourth switch 545 according to various embodiments may be grounded.

Referring to FIG. 5C, the aperture tuning circuit 520 according to various embodiments may include a fifth switch 522, a sixth switch 524, a seventh switch 526, and an eighth switch 528. According to various embodiments, the fifth switch 522 may be connected to a first terminal (RF1) 522*a*. According to various embodiments, the sixth switch 524 may be connected to a second terminal (RF2) 524*a*. According to various embodiments, the seventh switch 526 may be connected to a third terminal (RF3) 526*a*. According to various embodiments, the eighth switch 528 may be connected to a fourth terminal (RF4) 528*a*. According to various embodiments, the number of the switches included in the aperture tuning circuit 520 may be changed. According to various embodiments, the fifth switch 522, the sixth switch 524, the seventh switch 526, and the eighth switch 528 may be implemented on a single chip. According to various embodiments, the aperture tuning circuit 520 may have a total of 16 possible cases by on/off combinations of the switches (e.g., the fifth switch 522, the sixth switch 524, the seventh switch 526, and the eighth switch 528). Accordingly, the tuning circuit 250 according to various embodiments may have a total of 4096 antenna configurations (e.g., 256×16).

As illustrated in FIGS. 5B and 5C, according to a change between on/off states of the switch included in the antenna tuning circuit 440*a* (e.g., the impedance tuning circuit 510 and/or the aperture tuning circuit 520), the resonance characteristics of the connected antenna (e.g., the resonance frequency of the antenna) may be changed. A combination of the on/off states of a switch may be referred to as an antenna configuration, and the antenna resonance characteristics or the antenna efficiency of the antenna may be changed according to the antenna configuration.

Figure 5D:
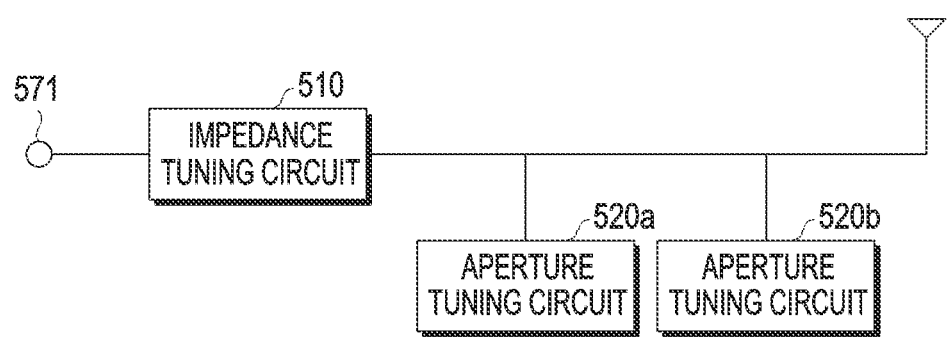
FIG. 5D is a view illustrating an antenna tuning circuit according to an embodiment of the disclosure.

According to various embodiments, referring to FIG. 5D, the impedance tuning circuit 510 may be connected to a conduction point 571. The conduction point 571 may be connected to, e.g., an RFFE (e.g., the first RFFE 431 or the second RFFE 432 of FIGS. 4A and 4B) and may be connected to the duplexer of the RFFE. The conduction point 571 may mean a power rail (or a power lane) to which the RFFE and the antenna tuning circuit are connected. The impedance tuning circuit 510 may be connected to the antenna 530, and the aperture tuning circuits 520a and 520b may be connected to the power rail connecting the impedance tuning circuit 510 and the antenna 530.

According to various embodiments, the electronic device 101 (e.g., the communication processor 260) may change the setting value of the antenna tuning circuit 440a according to the event (e.g., an EN-DC operation or a CA operation) related to the communication processor. As described above, the electronic device 101 may control to change the on/off state of the switch included in the antenna tuning circuit 440a (e.g., the impedance tuning circuit 510 and/or the aperture tuning circuit 520) according to a change in the setting value.

Figure 6:
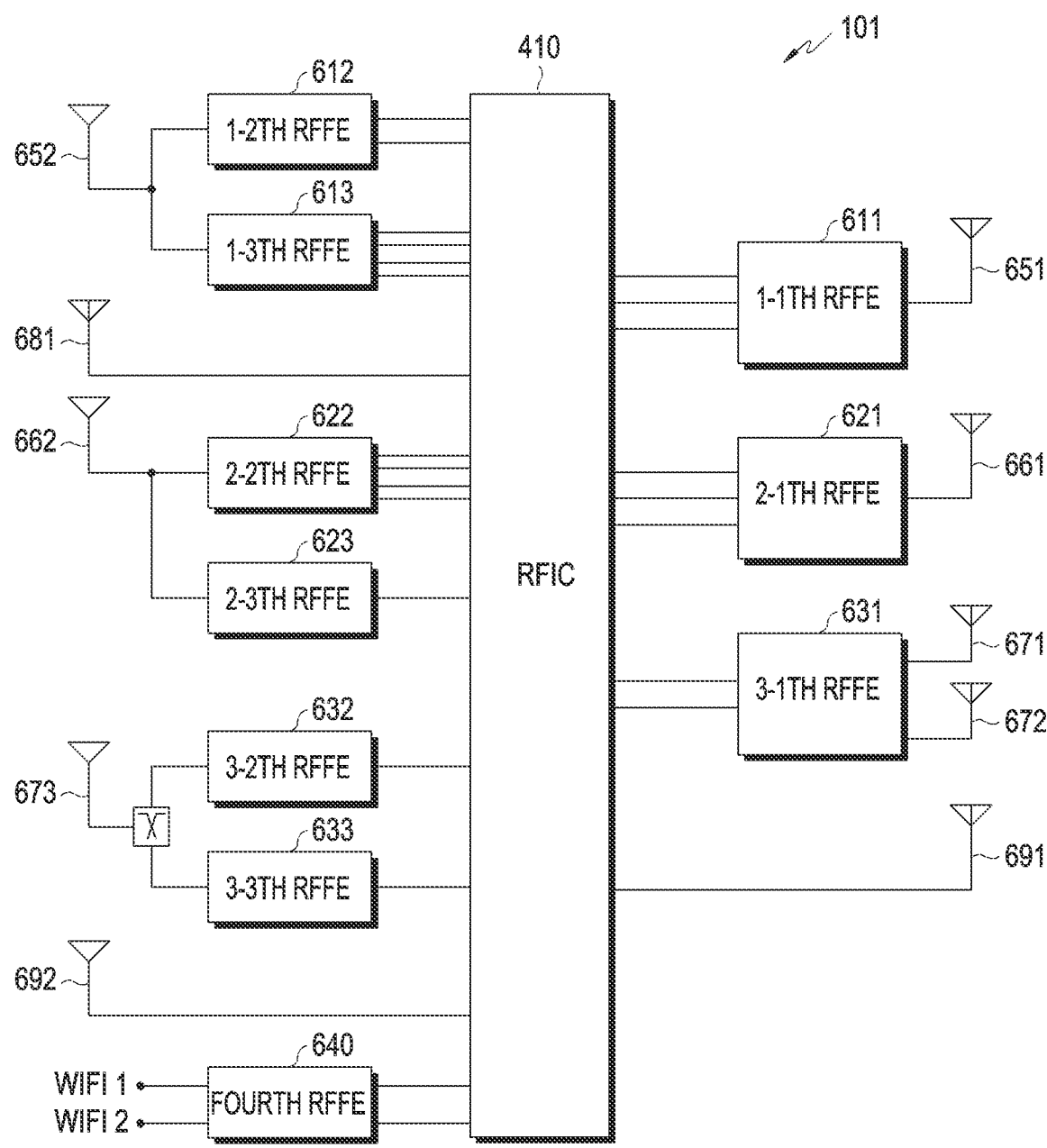
FIG. 6 is a block diagram illustrating an electronic device according to an embodiment of the disclosure.

FIG. 6 is a block diagram illustrating an electronic device according to an embodiment of the disclosure. Referring to FIG. 6, a plurality of RFFEs 611, 612, 613, 621, 622, 623, 631, 632, 633, and 640 may be connected to at least one RFIC 410. The plurality of RFFEs 611, 612, 613, 621, 622, 623, 631, 632, 633, and 640 may be connected to a plurality of antennas 651, 652, 661, 662, 671, 672, 673, 681, 691, and 692, respectively.

According to various embodiments, a 1-1th RFFE 611 and a 2-1th RFFE 621 may be connected with a first main antenna 651 and a second main antenna 661, respectively. A 1-2th RFFE 612 and a 1-3th RFFE 613 may be connected with a first sub antenna 652 to provide diversity with the first main antenna 651. A 2-2th RFFE 622 and a 2-3th RFFE 623 may be connected with a second sub antenna 662 to provide diversity with the second main antenna 661. A 3-1th RFFE 631 may be connected with two third main antennas 671 and 672 to provide MIMO. Further, a 3-2th RFFE 632 and a 3-3th RFFE 633 may be connected with a third sub antenna 673 through a duplexer to provide MIMO or diversity with the third main antennas 671 and 672. A fifth antenna 681 may be directly connected to the RFIC 410 without passing through a RFFE. A 6-6th antenna 691 and a 6-2th antenna 692 may also be directly connected to the RFIC 410 without passing through a RFFE and may provide MIMO or diversity through two antennas. A fourth RFFE 640 may be connected with two Wi-Fi antennas.

According to various embodiments, at least one of the RFFEs of FIG. 6 may correspond to one of the first RFFE 431, the second RFFE 432, and the third RFFE 433 described above in connection with FIGS. 4A, 4B, 4C and 4D. At least one of the antennas of FIG. 6 may correspond to the first antenna 441, the second antenna 442, the third antenna 443, the fourth antenna 444, and the fifth antenna 445 described above in connection with FIGS. 4A, 4B, 4C and 4D.

Figure 7:
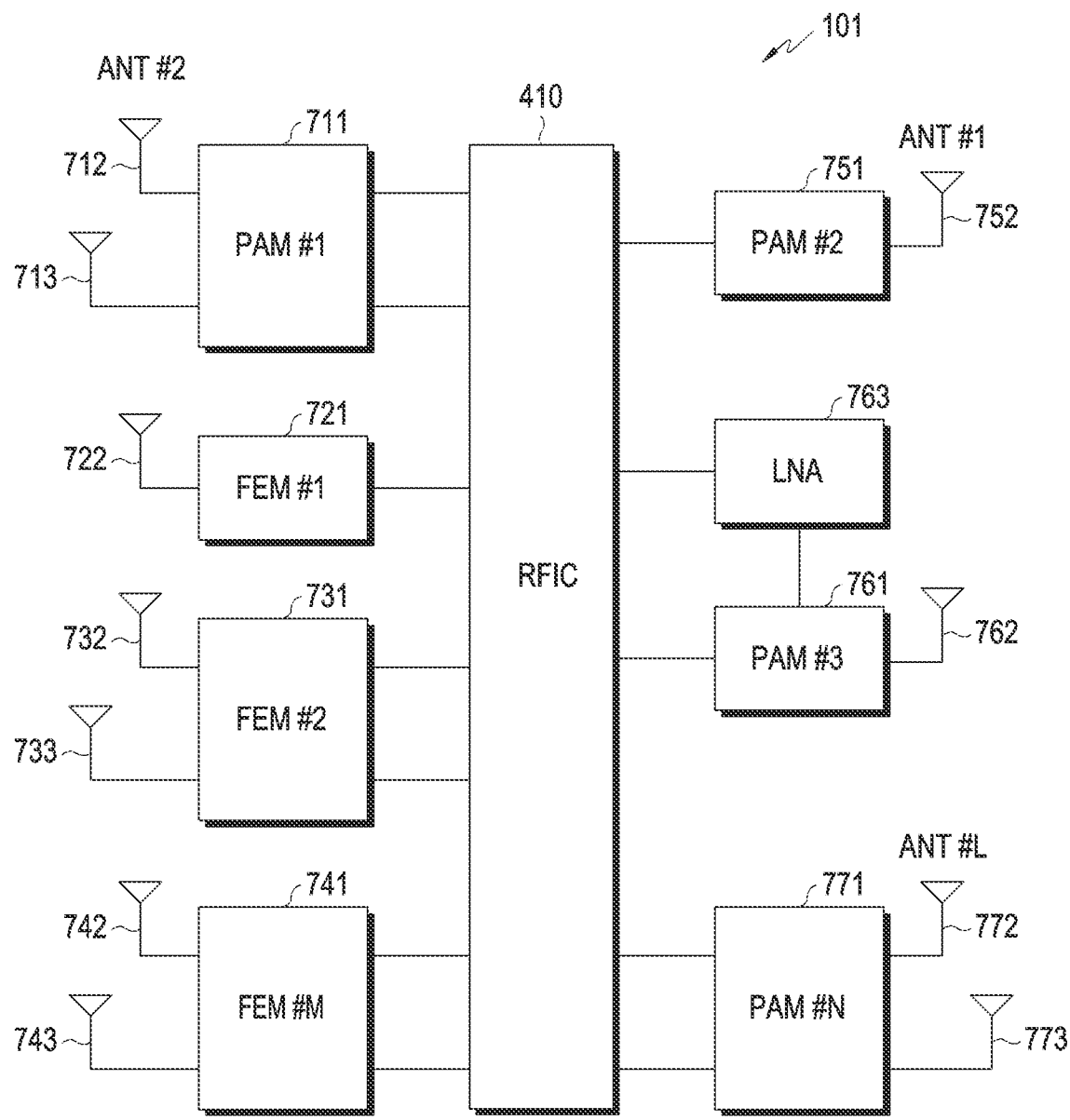
FIG. 7 is a block diagram illustrating an electronic device according to an embodiment of the disclosure.

FIG. 7 is a block diagram illustrating an electronic device according to an embodiment of the disclosure. Referring to FIG. 7, a plurality of PAMs 711, 751, 761, and 771 and/or a plurality of FEMs 721, 731, and 741 may be connected to at least one RFIC 410. The plurality of PAMs 711, 751, 761, and 771 and/or the plurality of FEMs 721, 731, and 741 each may be connected to at least one antenna 712, 713, 722, 732, 733, 742, 743, 752, 762, 772, and 773.

Each of the plurality of PAMs 711, 751, 761, and 771 may include a power amplifier PA and may amplify the transmission signal by the power amplifier and transmit it through the antenna 712, 713, 752, 761, 772, or 773. Each of the plurality of PAMs 711, 751, 761, and 771 may include a low noise amplifier (LNA) and may amplify the reception signal by the power amplifier and transmit it to the RFIC 410. PAM #3 761 may include at least one diplexer or at least one duplexer and may be configured in the form of a power amplitude module including duplexer (PAMiD). PAM #3 761 may transmit the data received through the antenna 762 to the LNA 763 through the diplexer or duplexer. The data received by the LNA 763 may be low-noise amplified and then transmitted to the RFIC 410. Each of the plurality of FEMs 721, 731, and 741 may include a low noise amplifier (LNA) and may amplify the reception signal by the power amplifier and transmit it to the RFIC 410.

According to various embodiments, PAM #1 711 may transmit/receive a mid-band or high-band 5G frequency (e.g., N1 band or N3 band) signal. PAM #2 751 may transmit and receive an ultra-high band 5G frequency (e.g., N78 band) signal. For example, when the electronic device 101 operates as SA, it may transmit/receive a 5G frequency signal through PAM #1 711 or PAM #N 771. When the electronic device 101 operates as EN-DC, it may transmit/receive a 5G frequency signal and an LTE frequency signal through PAM #1 711 and PAM #N 771, respectively.

According to various embodiments, when the electronic device 101 operates as CA or EN-DC, a frequency band to be supported may increase. The use of the FEM component and the antenna path may be restricted due to size limitations on the electronic device 101. The electronic device 101 may be configured to process multiple frequency components in one component and antenna so as to process various complicated frequency bands of components.

According to various embodiments, a refarming band using a part of the LTE frequency band as a 5G frequency band may be used. In a frequency band where only LTE or NR exists, when the electronic device 101 processes signals in the RFIC (e.g., the RFIC 410), a mixer in the RFIC may separate and process signals using a modulation/demodulation technique suitable for the RAT. According to various embodiments, in an environment where an LTE service and an NR service coexist, and proximate frequency components are mixed for NSA, the electronic device 101 may have difficulty in separating the LTE and NR signals only with the FEM component. For example, if the mixed signal of the LTE signal and the NR signal is input to the RFIC 410, the RFIC 410 of the electronic device 101 converts the signal with respect to one RAT in the modulation/demodulation process, and thus the signal of another RAT may be lost or remain as a noise component.

According to various embodiments, in order to process the refarming band of signals without loss when operating as NSA, the electronic device 101 should simultaneously receive two signals of the same frequency band and process them through different RF paths in the RFIC 410 so as to reconstruct the original signal without interference between the LTE signal and the NR signal.

FIG. 8 is a block diagram illustrating an electronic device according to an embodiment of the disclosure. When the NR band signal uses the refarming band of the LTE band, the LTE band and the NR band may be adjacent to each other. Referring to FIG. 8, according to various embodiments, the NR band signal transmitted from an NR base station 806 (e.g., gNB) may be received by a first FEM 801 through a first antenna 803. The LTE band signal transmitted from the LTE base station 805 (e.g., eNB) may be received by the first FEM 801 through the first antenna 803. The first FEM 801 may include a band pass filter (BPF) 801*a*, a power amplifier 801*b*, and a low noise amplifier 801*c*. The NR band signal and the LTE band signal received by the first FEM 801 may be filtered through the band pass filter 801*a* and may be amplified through the low noise amplifier 801*c*. The NR band signal and the LTE band signal amplified by the low noise amplifier 801*c* may be input to the mixer 410*a* through the first LNA of the RFIC 410. The mixer 410*a* may output LTE data by mixing the NR band signal and the LTE band signal with a carrier frequency of the LTE band.

According to various embodiments, the NR band signal transmitted from the NR base station 806 (e.g., gNB) may be received by a second FEM 802 through a second antenna 804. The LTE band signal transmitted from the LTE base station 805 (e.g., eNB) may be received by the second FEM 802 through the second antenna 804. The second FEM 802 may include a band pass filter (BPF) 802*a*, a power amplifier 802*b*, and a low noise amplifier 802*c*. The NR band signal and the LTE band signal received by the FEM 802 may be filtered through the band pass filter 802*a* and may be amplified through the low noise amplifier 802*c*. The NR band signal and the LTE band signal amplified by the low noise amplifier 802*c* may be input to the mixer 410*a* through the second LNA of the RFIC 410. The mixer 410*a* may output NR data by mixing the NR band signal and the LTE band signal with a carrier frequency of the NR band.

For example, when the electronic device 101 operates as EN-DC, the first FEM 801 may process a signal of a B1 band or B3 band, and the second FEM 802 may process a signal of an N1 band or N3 band, which is the refarming band of the B1 band or the B3 band.

Figure 9:
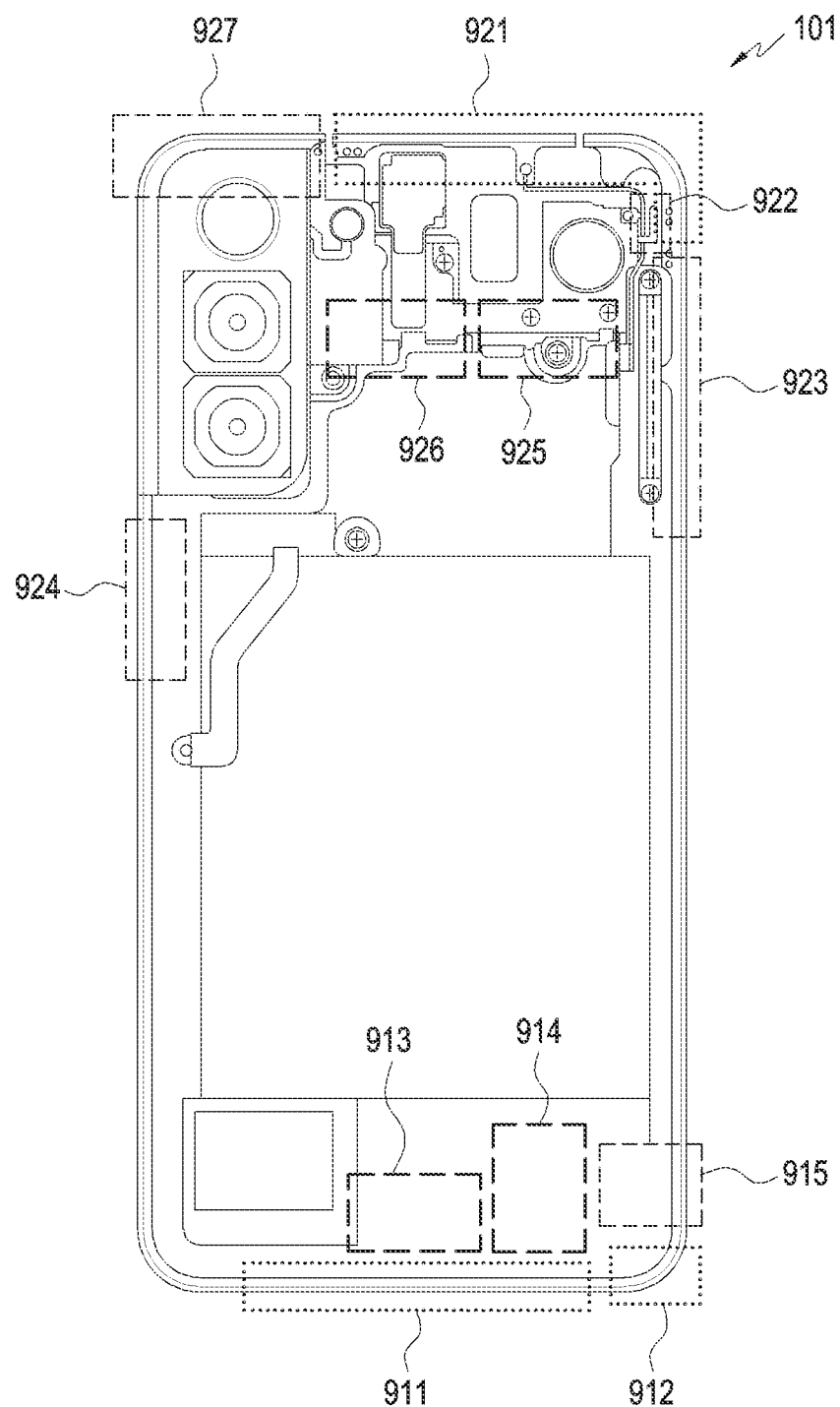
FIG. 9 illustrates an internal structure of an electronic device according to an embodiment of the disclosure.

FIG. 9 illustrates an internal structure of an electronic device according to an embodiment of the disclosure. Referring to FIG. 9, the electronic device 101 may include a plurality of antennas 911, 912, 913, 914, 915, 921, 922, 923, 924, 925, 926, and 927 inside and/or in at least a portion of the housing forming the exterior of the electronic device 101.

According to various embodiments, the antennas 911, 912, 913, 914, and 915 disposed at a lower portion of the electronic device 101 may be referred to as main antennas. Among the main antennas, a first main antenna 911 or a second main antenna 912 may be formed of metal at an outer portion of the housing. The first main antenna 911 may be used to transmit and receive 2G, 3G, LTE or NR signals. The second main antenna 912 may be used for transmission/reception of LTE signals or reception of NR signals.

According to various embodiments, a third main antenna 913 or a fourth main antenna 914 among the main antennas may be configured in the form of laser direct structuring (LDS) inside the housing. The third main antenna 913 may be used for reception of 3G, LTE, or NR signals. Among the main antennas, a fifth main antenna 915 may be configured in the form of LDS or a metal slit inside or in at least a portion of the housing.

According to various embodiments, the antennas 921, 922, 923, 924, 925, 926, and 927 disposed at an upper portion or side surfaces of the electronic device 101 may be referred to as sub antennas. A first sub antenna 921 among the sub antennas may be formed of metal at an outer portion of the housing. The first sub antenna 921 may be used to receive 2G, 3G, LTE or NR signals. Among the sub antennas, a third sub antenna 923 or a fourth sub antenna 924 may be configured in the form of a metal slit in at least a portion of the housing. The third sub antenna 923 may be used to receive GPS or Wi-Fi signals. The fourth sub antenna 924 may be used for transmission and reception of NR signals (e.g., N77 or N78). Among the sub antennas, a fifth sub antenna 925 or a sixth sub antenna 926 may be configured in the form of LDS inside the housing. The fifth sub antenna 925 may be used to receive Wi-Fi signals. The sixth sub antenna 926 may be used for reception of NR signals (e.g., N77 or N78). Among the sub antennas, a seventh sub antenna 927 may be configured in the form of LDS or a metal slit in at least a portion of the housing. The seventh sub antenna 927 may be used for reception of GPS, 2G, 3G, or LTE signals or transmission and reception of NR signals. According to various embodiments, it will be readily understood by one of ordinary skill in the art that the arrangement and use of the antennas of the electronic device 101 are not limited to those shown and described above.

Hereinafter, a method for controlling the power of a transmission signal in an electronic device according to various embodiments is described with reference to FIGS. 10 to 34.

According to various embodiments, when operating as CA or EN-DC, the electronic device 101 may use some of the antennas available in the corresponding FEM to simultaneously transmit/receive signals corresponding to multiple frequencies. The electronic device 101 (e.g., a communication processor (e.g., the auxiliary processor 123, the wireless communication module 192, the first communication processor 212, the second communication processor 214, or the integrated communication processor 260)) may change or adjust the setting of the antenna tuning circuit (e.g., the first antenna tuning circuit 441*a*, the second antenna tuning circuit 442*a*, or the third antenna tuning circuit 443*a*) connected to the antenna so as to increase the transmission/reception performance of the frequency component for the selected antenna. The antenna gain of the corresponding antenna may be changed according to a change in the setting of the antenna tuning circuit.

The total radiation power (TRP) of the signal output from the electronic device 101 through the antenna is the sum of the antenna gain and the transmission power and may be expressed as Equation 1 below.

$$\text{Total Radiation Power} = \text{Antenna Gain} + \text{Tx Power} \quad \text{Equation 1}$$

In Equation 1, the transmission power may mean the conduction power.

Figure 10:
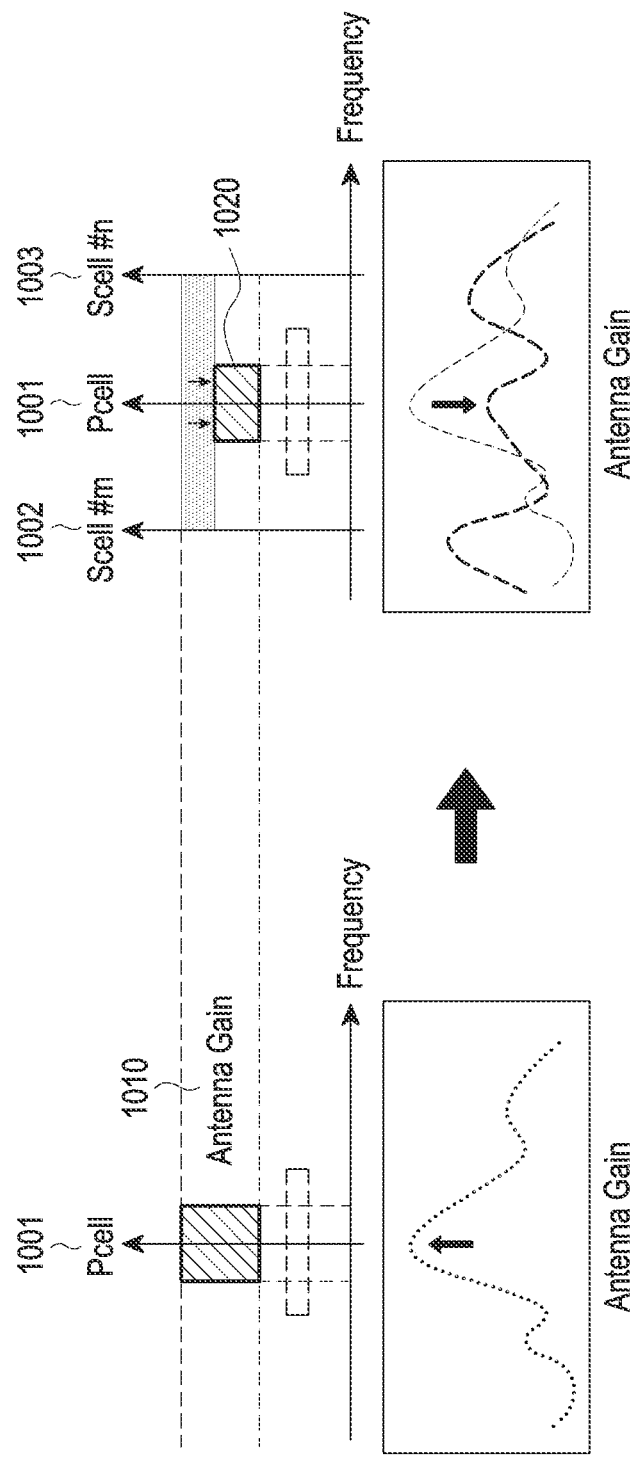
FIG. 10 is a view illustrating a change in antenna gain in carrier aggregation according to various embodiments.

FIG. 10 is a view illustrating a change in antenna gain in carrier aggregation according to an embodiment of the disclosure. Referring to FIG. 10, according to various embodiments, when the electronic device 101 operates as SA or transmits a signal of a single frequency band without CA, the antenna gain 1010 may adjust the setting of the antenna tuning circuit to be optimized for the frequency of the primary cell (PCell) 1001.

According to various embodiments, at least one secondary cell (SCell) 1002 and 1003 may exist in a multi-RAT (e.g., EN-DC) or multi-band (e.g., CA) environment, and as illustrated in FIG. 10, it is possible to change the antenna gain by changing the setting of the antenna tuning circuit considering the performance of a plurality of frequency components so that multiple frequency bands (PCell 1001+ SCell #m 1002+SCell #n 1003+ . . . ) may be used simultaneously. When the antenna tuning circuit is set considering the performance of the plurality of frequency components, the antenna gain 1020 of the PCell may be relatively reduced, so that the total radiation power may be reduced.

According to various embodiments, as illustrated in FIG. 10, when the antenna gain is changed considering multiple frequency components, if the antenna control module for controlling the antenna tuning circuit and the transmission power control module for controlling the transmission power operate separately, it may be difficult for the transmission power control module to identify a change in total radiation power. When the transmission power control module fails to identify the change in total radiation power, the electronic device 101 may have difficulty in additional compensation for the transmission power due to a reduction in antenna gain.

According to various embodiments, when the transmission power is changed in the transmission power control module, if it is not temporarily synchronized with the operation of the antenna control module, an unexpected change in the transmission power may occur. For example, the electronic device 101 may correct the transmission power through transmission power control (TPC) by the base station, but since the antenna gain may continue to change until the TPC control is completed, it may be difficult to constantly control the transmission power of the electronic device 101.

Figure 11:
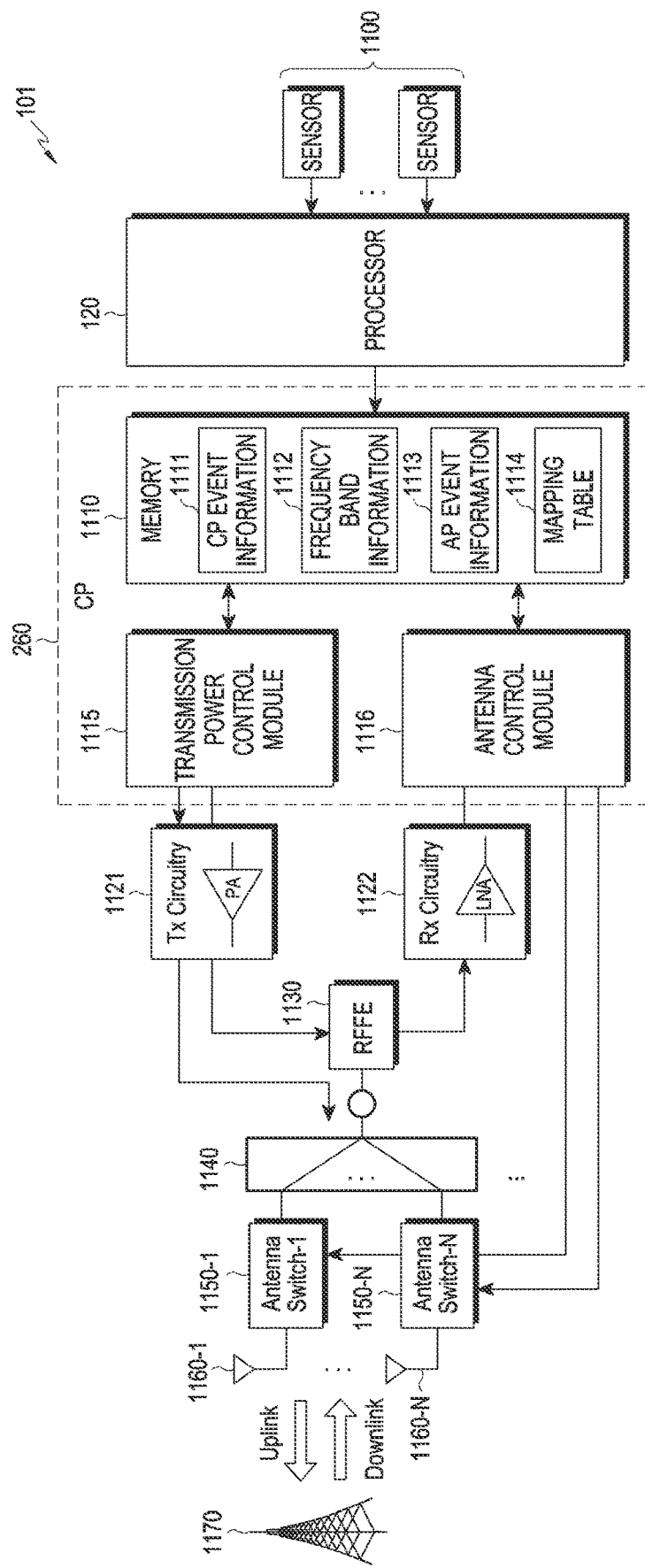
FIG. 11 is a block diagram illustrating an electronic device according to an embodiment of the disclosure.

In various embodiments, when the antenna gain of at least one antenna is changed in an environment in which two or more Tx signals are transmitted, such as EN-DC or ULCA, it is possible to prevent a situation where the total radiation power departs from the set reference and allow the electronic device 101 to transmit constant transmission power by integratedly managing the state of the antenna control module (e.g., the antenna control module 1116 of FIG. 11) and the power control module (e.g., the transmission power control module 1115 of FIG. 11).

In various embodiments, the electronic device 101 may determine an antenna path change or a path loss change that occurs due to a hardware limitation and may perform control so that the total radiation power becomes an optimal value according to each situation by adjusting the transmission power based on the setting value of the transmission power defined to fit for each state.

FIG. 11 is a block diagram illustrating an electronic device according to an embodiment of the disclosure.

Referring to FIG. 11, according to various embodiments, the electronic device 101 may include at least one sensor 1100, a processor 120 (e.g., an application processor, hereinafter referred to as an application processor with reference to FIG. 11), a communication processor 260, a transmission circuit 1121, a reception circuit 1122, an RFFE 1130, an antenna switching module 1140, a plurality of antenna tuning circuits 1150-1 to 1150-N, and a plurality of antennas 1160-1 to 1160-N. The communication processor 260 may include a memory 1110, a transmission power control module 1115, and an antenna control module 1116. The memory 1110 may store CP event information 1111, frequency band information 1112, AP event information 1113, and a mapping table 1114. According to an embodiment, although not shown, a memory (e.g., the memory 130 of FIG. 1) included in the electronic device 101 may be used separately from the communication processor 260, in addition to, or alternatively to the memory 1110. For example, at least a portion of the separate memory 130 may include a common portion accessible by both the application processor (i.e., processor 120) and the communication processor 260. The processor 120 and/or the communication processor 260 may store at least some of the CP event information 1111, frequency band information 1112, AP event information 1113, or mapping table 1114 in the separate memory 130.

According to various embodiments, the transmission power control module 1115 may control the power of the transmission signal. For example, as illustrated in FIG. 4F, according to various embodiments, the maximum transmittable power for each transmission path may be set considering at least one of the maximum transmittable power (P-MAX power (PeMax)) received from each communication network (e.g., a base station), the maximum transmittable power (UE Tx MAX power (PcMax)) for each transmission path set by the electronic device 101, or an SAR event maximum transmittable power (SAR EVENT MAX power) set corresponding to each SAR event considering the specific absorption rate (SAR) backoff. For example, the maximum transmittable power may be determined as a minimum value among the plurality of the above exemplified maximum transmittable powers (e.g., P-MAX power, UE Tx MAX power, and SAR EVENT MAX power). The transmission power control module 1115 of the electronic device 101 may set the transmission power based on the TPC controlled by the base station within the set maximum transmittable power. For example, the electronic device 101 may set the transmission power of the PUSCH for the subframe i when the radio access technology (RAT) is E-UTRA based on Equation 2 below.

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\}[\text{dBm}] \quad \text{Equation 2}$$

$P_{CMAX}$ is the maximum output power according to the power class of the electronic device 101. For example, $P_{CMAX}$ may be UE maximum output power defined in $3^{rd}$ generation partnership project (3GPP) technical specification (TS) 36.101, but is not limited thereto. $M_{PUSCH}(i)$ is the number of resource blocks allocated to the electronic device 101. $P_{O\_PUSCH}(j)$ is the sum of $P_{O\_NOMINAL\_PUSCH}(j)$ (a parameter specified by the cell) and $P_{O\_UE\_PUSCH}(j)$ (a parameter specified by the electronic device 101). PL is the downlink path-loss measured by the electronic device 101. The scaling factor $\alpha(j)$ may be determined in a higher layer considering the pathloss mismatch between the uplink channel and the downlink channel $\Delta_{TF}(i)$ is the modulation and coding scheme (MCS) compensation parameter or the transport format (TF) compensation parameter. f(i) is the value adjusted by downlink control information (DCI) from the base station after initial setting. The electronic device 101 may set the smaller of $P_{CMAX}$ and the sum of $M_{PUSCH}(i)$, $P_{O\_PUSCH}(j)$, the product of the scaling factor $\alpha(j)$ and PL, $\Delta_{TF}(i)$, and f(i), as the transmission power of the PUSCH. At least some of the parameters for Equation 2 may follow, e.g., 3rd generation partnership project (3GPP) technical specification (TS) 36.213. Alternatively, the electronic device 101 may set the transmission power of the PUSCH according to 3GPP TS 38.213, e.g., when the RAT is NR. The above-described example has been described for the transmission power for the PUSCH. The transmission power may be set not only for the PUSCH but also for various cases (e.g., SRS, PUCCH, PUSCH, and PRACH), and the setting method may follow, e.g., 3GPP TS 36.213 or 3GPP TS 38.213, but there is no limitation.

According to various embodiments, the electronic device 101 may identify the above-described maximum transmittable power. The maximum transmittable power of the electronic device 101 may be PeMax, and it may be set according to the power class of the electronic device 101 based on, e.g., 3GPP TS 36.101 or 3GPP TS 38.101, but the setting scheme is not limited to a specific one. If the power class of the electronic device 101 is PC 3, the maximum transmittable power may be, e.g., 23 dBm. Alternatively, the maximum transmittable power may be, e.g., a smaller value among values set in response to output power limiting events, such as PcMax and SAR events. The electronic device 101 may manage (or identify) the output power corresponding to the SAR event that allows for compliance with the SAR restriction regulation. For example, in response to a grip event, which is one of the SAR events, 16 dBm may be managed (or identified) as a limited output power. In this case, the electronic device 101 may identify, as the maximum transmittable power, 16 dBm, which is the smaller value of PeMax (e.g., 23 dBm) and output power (e.g., 16 dBm) corresponding to the SAR event. The event in which the output power is limited is not limited to the SAR event. For example, when dynamic power sharing (DPS) is being performed, the electronic device 101 may identify that the smaller of the UE maximum transmittable power and the limited maximum transmittable power by the DPS is the maximum transmittable power for specific RAT.

According to various embodiments, the antenna control module 1116 may control the antenna switching module 1140 according to the communication situation (e.g., EN-DC or CA) of the electronic device 101 to select a transmission path and antenna 1160-1 to 1160-N of each transmission signal from among the plurality of transmission paths and the plurality of antennas. The antenna control module 1116 may change the antenna gain by adjusting the setting of the antenna tuning circuit 1150-1 to 1150-N corresponding to the selected antenna 1160-1 to 1160-N. For example, the antenna control module 1116 may change the antenna gain for a specific transmission signal by changing the antennas 1160-1 to 1160-N or changing the setting of the antenna tuning circuit 1150-1 to 1150-N.

According to various embodiments, the setting of the antenna tuning circuit 1150-1 to 1150-N may be set to a specific constant value. A state or setting that may affect the antenna gain in the electronic device 101 may be defined as an event. The events that may affect the antenna gain may be classified into a CP event related to the communication processor 260 and an AP event related to the application processor (i.e., processor 120).

For example, the CP event may mean an event generated during communication between the base station 1170 and the electronic device 101, and may include at least one of, e.g., uplink carrier aggregation (CA) (UL-CA), downlink CA (DL-CA), antenna diversity (e.g., 2Rx or 4Rx), multiple-input and multiple-output (MIMO), antenna switching, a call event, dual-connectivity (DC), or a difference between reference signal received powers (RSRPs). The CP event may be stored as CP event information 1111 in the memory 1110.

The AP event may mean an event received by the application processor (i.e., processor 120), other than the CP event and may include at least one of a grip event sensed by a grip sensor, a proximity event sensed by a proximity sensor, an event related to an image sensor, or an event related to connection of an external connecting terminal. According to various embodiments, the AP event may include state information (e.g., folding state information) related to the shape of the electronic device 101. For example, when the electronic device is a foldable electronic device, the folding state information may include information corresponding to an angle between a first housing of the electronic device and a second housing pivotably coupled to the first housing. For example, the folding state information may include information corresponding to an unfolded state in which the electronic device is fully unfolded, a folded state in which the electronic device is fully folded, or a state in which the electronic device is unfolded by a predetermined angle.

FIG. 12A is a view illustrating a folding state of an electronic device associated with an angle between housings (e.g., a first housing and a second housing) of the electronic device according to an embodiment of the disclosure.

Referring to FIG. 12A, the electronic device 101 (e.g., at least one processor 120) may identify the state (e.g., the angle between a first housing 1210 and a second housing 1220) of the housings (e.g., the first housing 1210 and the second housing 1220) and generate AP event information corresponding to the identified folding state. For example, the electronic device may identify the angle between the first housing 1210 and the second housing 1220 and, as illustrated in 12a, identify a second folding state 1202 corresponding to a second angle range including the identified angle among a plurality of folding states 1201.

For example, the electronic device 101 (e.g., at least one processor 120) may identify the folding state corresponding to the angle between the housings (e.g., the first housing 1210 and the second housing 1220). As illustrated in 12a, the electronic device 101 may store, in the memory 130, a plurality of folding state information 1201 related to the angle between the first housing 1210 and the second housing 1220 and identify the folding state information corresponding to the current angle between the first housing 1210 and the second housing 1220. Each of the plurality of folding state information 1201 (e.g., a first folding state, second folding state, and third folding state of FIG. 12A) may correspond to a specific angle range (e.g., the first angle range, second angle range, and third angle range of FIG. 12A).

According to various embodiments, without being limited thereto, the above description may apply even where more than two housings are provided. For example, when the electronic device 101 includes three housings (e.g., the first housing 1210 to third housing), folding state information corresponding to the first angle range between the first housing 1210 and the second housing 1220 and the second angle range between the second housing 1220 and the third housing may be determined. According to various embodiments, the electronic device 101 (e.g., at least one processor 120) may identify the angle between the first housing 1210 and the second housing 1220 at various times. For example, when at least one of the first housing 1210 or the second housing 1220 starts to rotate (e.g., clockwise or counterclockwise), the electronic device 101 (e.g., at least one processor 120) may identify the angle between the first housing 1210 and the second housing 1220. As an example, the electronic device 101 (e.g., at least one processor 120) may continuously identify the angle between the first housing 1210 and the second housing 1220 while at least one of the first housing 1210 or the second housing 1220 starts to rotate and rotates about the rotation axis. As another example, at the time when at least one of the first housing 1210 or the second housing 1220 ends rotation about the rotation axis, the electronic device 101 may identify the angle between the first housing 1210 and the second housing 1220. As an example, the electronic device 101 (e.g., at least one processor 120) may identify the angle between the first housing 1210 and the second housing 1220 at a designated period regardless of rotation of at least one of the first housing 1210 or the second housing 1220.

According to various embodiments, an input framework of the electronic device 101 may receive various sensing values for measuring the unfolded/folded state of the electronic device 101. The input framework may identify sensing values obtained from at least one or more sensors, determine the unfolded/folded state of the electronic device 101, and transfer the determined state to the processor 120. For example, the sensor driver (e.g., at least one or more of an angle sensor driver, a distance sensor driver, and a gyro sensor driver) may transfer the sensing value to the input framework. The input framework may transmit, to a folding event handler, information indicating that the electronic device 101 is in the second folding state using the obtained sensing value. The folding event handler may transfer an AP event corresponding to the folding state information to the communication processor 260.

The AP event may be stored as AP event information 1113 in the memory 1110 of the communication processor 260. For example, the application processor (i.e., processor 120) may generate an AP event based on a signal or information sensed from at least one sensor 1100 (e.g., a grip sensor, a proximity sensor, or an image sensor) and may transmit the generated AP event to the communication processor 260. The communication processor 260 may store the AP event received from the application processor (i.e., processor 120) as AP event information 1113 in the memory 1110. As another example, when the AP event is stored in the memory 130 that exists separately outside the communication processor 260, the application processor (i.e., processor 120) may store the AP event in a common portion of the memory 130, and the communication processor 260 may access the common portion to read the AP event.

According to various embodiments, the electronic device 101 may declare the variable "[Multi RAT Radiation Status]" as shown in Table 6 below to synchronize event information between the transmission power control module 1115 and the antenna control module 1116 and may set a function capable of reading or writing frequency band information, AP event information, and CP event information from or to the memory 1110.

TABLE 6 u32 HAL_getCpEvent (void)
Get all stored CP EVENTs of RAT.
returens
    CP EVENT Value
u32 HAL_getNrCpEvent (void)
Get the CP Event stored with respect to NR.
returens
    CP Event Value
u32 HAL_getLteCpEvent (void)
Get the CP EVENT stored with respect to LTE.
returens
    CP EVENT Value
bool HAL_setCpEVENT (hal_rat_t rat, u32 event)
Store all CP Events that have occured in the UE so far
Parameters
    rat : band information (LTE, NR)
    event : event value to store
returens
    Return whether storage has been normally processed
u32 HAL_getLteband (void)
Get the stored LTE PCell Band information.
Return
    LTE's PCell Band
void HAL_setLteband (u32 band)
Update LTE PCell Band information.
Returens
    does not exist TABLE 6-continued u32 HAL_getNrband (void)
Get the stored NR PCell Band information.
return
    NR's PCell Band
void HAL_setNrband (u32 band)
Update NR PCell Band information.
Returens
    does not exist According to various embodiments, when transmitting a transmission signal, the transmission power control module 1115 of the electronic device 101 may identify the "[Multi RAT Radiation Status]" stored in the memory 1110 (e.g., by identifying the CP event information 1111 or the AP event information 1113) and, if it is determined that a new event has been updated, fetch the corresponding event information from the memory 1110 through the function defined in Table 6. The transmission power control module 1115 may identify the event information fetched from the memory 1110 to identify the current antenna configuration state and may determine the transmission power based on the mapping table 1114 set considering the antenna gain corresponding to each antenna configuration state. For example, the mapping table 1114 may be configured as shown in Table 7 below.

TABLE 7

| NUM | BAND #1 | BAND #2 | AP event | CP event | Tx POWER #1 | Tx POWER #2 |
|---|---|---|---|---|---|---|
| 1 | B1 | N5 | 0x01 | 0x20 | 170 | 170 |
| 2 | B1 | N78 | 0x01 | 0x20 | 180 | 180 |
| 3 | B5 | N41 | 0x01 | 0x20 | 190 | 190 |
| 4 | B7 | N3 | 0x01 | 0x20 | 200 | 200 |
| ... | ... | ... | ... | ... | ... | ... |
| N | BAND N | BAND M | AP EVENT | CP EVENT | Value #1 | Value #2 |

Referring to Table 7, the AP event "0x01" may indicate a grip event sensed by the grip sensor. The CP event "0x20" may indicate EN-DC. For example, each CP event of Table 7 may include EN-DC operations, such as B1-N5, B1-N78, B5-N41, and B7-N3. According to various embodiments, the transmission power control module 1115 may identify the CP event information 1111, the AP event information 1113, and the frequency band information 1112 from the memory 1110 and may identify the maximum transmittable power of each transmit signal from the mapping table 1114 as exemplified in Table 7, based on the identified information. According to various embodiments, if it is identified that the frequency band information 1112 is B1 or N5, the AP event information 1113 is "0x01" corresponding to the grip event, and the CP event information 1111 is "0x20" corresponding to EN-DC, the transmission power control module 1115 may identify that the current state is mapped to field no. 1 through the mapping table 1114 of Table 7. The transmission power control module 1115 may control the transmission power of the B1 signal by setting 170 mW, which is the first transmission power (Tx Power #1) set corresponding to field no. 1, as the maximum transmittable power for the B1 signal and control the transmission power of the N5 signal by setting 170 mW, which is the second transmission power (Tx Power #2), as the maximum transmittable power for the N5 signal.

According to various embodiments, if it is identified that the frequency band information 1112 is B1 or N78, the AP event information 1113 is "0x01" corresponding to the grip event, and the CP event information 1111 is "0x20" corresponding to EN-DC, the transmission power control module 1115 may identify that the current state is mapped to field no. 2 through the mapping table 1114 of Table 7. The transmission power control module 1115 may control the transmission power of the B1 signal by setting 180 mW, which is the first transmission power (Tx Power #1) set corresponding to field no. 2, as the maximum transmittable power for the B1 signal and control the transmission power of the N78 signal by setting 180 mW, which is the second transmission power (Tx Power #2), as the maximum transmittable power for the N78 signal.

According to various embodiments, if it is identified that the frequency band information 1112 is B5 or N41, the AP event information 1113 is "0x01" corresponding to the grip event, and the CP event information 1111 is "0x20" corresponding to EN-DC, the transmission power control module 1115 may identify that the current state is mapped to field no. 3 through the mapping table 1114 of Table 7. The transmission power control module 1115 may control the transmission power of the B5 signal by setting 190 mW, which is the first transmission power (Tx Power #1) set corresponding to field no. 3, as the maximum transmittable power for the B5 signal and control the transmission power of the N41 signal by setting 190 mW, which is the second transmission power (Tx Power #2), as the maximum transmittable power for the N41 signal.

According to various embodiments, if it is identified that the frequency band information 1112 is B7 or N3, the AP event information 1113 is "0x01" corresponding to the grip event, and the CP event information 1111 is "0x20" corresponding to EN-DC, the transmission power control module 1115 may identify that the current state is mapped to field no. 4 through the mapping table 1114 of Table 7. The transmission power control module 1115 may control the transmission power of the B7 signal by setting 200 mW, which is the first transmission power (Tx Power #1) set corresponding to field no. 4, as the maximum transmittable power for the B7 signal and control the transmission power of the N3 signal by setting 200 mW, which is the second transmission power (Tx Power #2), as the maximum transmittable power for the N3 signal.

According to various embodiments, referring to Table 7, when an antenna gain decrease due to an unintentional change in antenna characteristics occurs outside of the electronic device 101, such as the user's grip, the user's grip may be determined through the grip sensor, and the AP event corresponding to the user's grip, as the AP event information 1113, may be stored in the memory 1110. The electronic device 101 may identify the AP event corresponding to the user's grip and, since the power of the transmission signal transmitted through the antenna corresponding to the position gripped by the user may be attenuated by the user's grip, the electronic device 101 may increase the power of the transmission signal by a set value (e.g., 3 dB) and transmit it.

According to various embodiments, when the base station 1170 transmits a control message so that the electronic device 101 operates with a CA of 2 CCs or more, the electronic device 10 may determine the CA state through a control message (e.g., an RRCconnection reconfiguration message) received from the base station 1170. The electronic device 101 may identify the CA state and, if the band of the PCell is a low band and is thus not affected by the SAR, the electronic device 101 may further increase the transmission power by 0.5 dB. For example, the electronic device 101 may identify PCell information through the frequency band information 1112 and may identify the CA state through the CP event information 1111. The electronic device 101 may compensate for the transmission power by +0.5 dB more by referring to the mapping table 1114 based on the identified information.

According to various embodiments, when a condition requiring that each antenna-related setting be changed occurs (e.g., a changing of antenna or a change in the setting of the antenna tuning circuit), the antenna control module 1116 may control each antenna module 1150-1 to 1150-N by identifying the AP event information 1113 and the CP event information 1111 stored in the memory 1110. For example, the antenna control module 1116 may record the frequency band information and event information used to update "[Multi RAT RadiationStatus]" in the memory 1110 using a function as shown in Table 8 below.

Figure 12B:
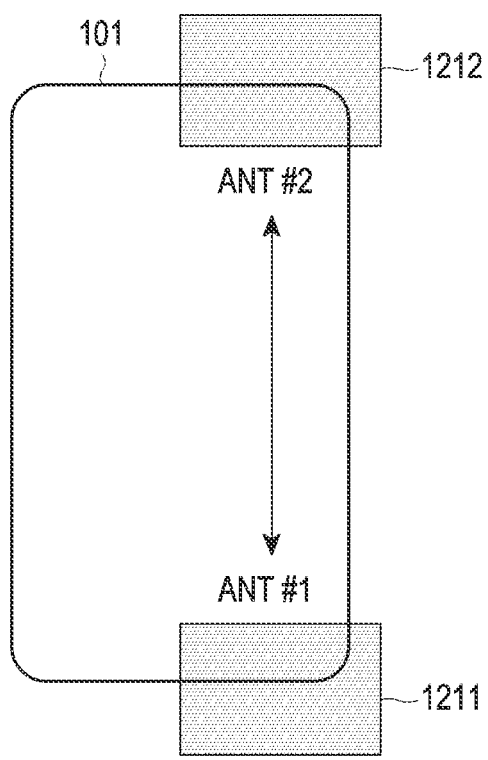
FIG. 12B illustrates an antenna arrangement of an electronic device according to an embodiment of the disclosure.

TABLE 8 void RfProcNr::ControlOpenLoopAit (void)
HAL__setNrband(Rf_Band[PCC__SCELL__IDX]);
    HAL__setCpEvent(RAT__5G, cp__event);
void RFAPI__ControlOpenLoopAit (u8 UeState)
HAL__setLteband(band__list[0]);
Cp__event = RFAPI__UpdateCpEventStatus((u8)UeState);

According to various embodiments, when the "[Multi RAT Radiation Status]" is updated by the antenna control module 1116, the transmission power control module 1115 may read each event information (e.g., the CP event information 1111 and the AP event information 1113) and the frequency band information 1112 stored in the memory 1110 and determine whether the transmission power is changed at the same timing as the time when a change in the antenna-related setting occurs. For example, the transmission power control module 1115 may compensate for the maximum transmittable power corresponding to the antenna gain attenuated due to a change in the antenna-related setting by determining whether mapping is performed through the mapping table 1114. FIG. 12B illustrates an antenna arrangement of an electronic device according to various embodiments. Referring to FIG. 12B, when the electronic device 101 operates as EN-DC or NE-DC, the electronic device 101 may simultaneously transmit the LTE signal and the NR signal through the first antenna 1211 and the second antenna 1212. For example, a mid-band LTE signal (e.g., a B1 band signal) may be transmitted through the first antenna 1211 disposed at the lower end of the electronic device 101, and a mid-band NR signal (e.g., an N3 band signal) may be transmitted through the second antenna 1212 disposed at the upper end of the electronic device 101.

According to various embodiments, when transmitting only the LTE signal of the B1 band, the electronic device 101 may set the first antenna 1211 disposed at the lower end of the electronic device 101 as a default antenna and may control to transmit the B1 band signal through the first antenna 1211. When transmitting only the NR signal of the N3 band, the electronic device 101 may control to transmit the N3 band signal through the first antenna 1211 set as the default antenna because the NR signal is identical or similar in frequency characteristics to the LTE signal of the B1 band.

According to various embodiments, when the electronic device 101 simultaneously transmits the B1 band signal and the N3 band signal as the NSA condition is met while transmitting the B1 band signal through the first antenna, the electronic device 101 may operate as EN-DC. For example, when the B1 band of LTE and the N3 band of NR use the same antenna or component, the N3 band signal and the B1 band signal may overlap so that signal loss may occur. When the electronic device 101 operates as EN-DC while transmitting the B1 band signal and thus simultaneously transmits the N3 band signal and the B1 band signal, the electronic device 101 may control to transmit the NR signal of the N3 band through the second antenna 1212 disposed at the upper end. The antenna control module 1116 of the electronic device 101 may store antenna related information (e.g., selected antenna information or configuration information for the antenna tuning circuit) set according to the EN-DC operation, as CP event information 1111.

Figure 13:
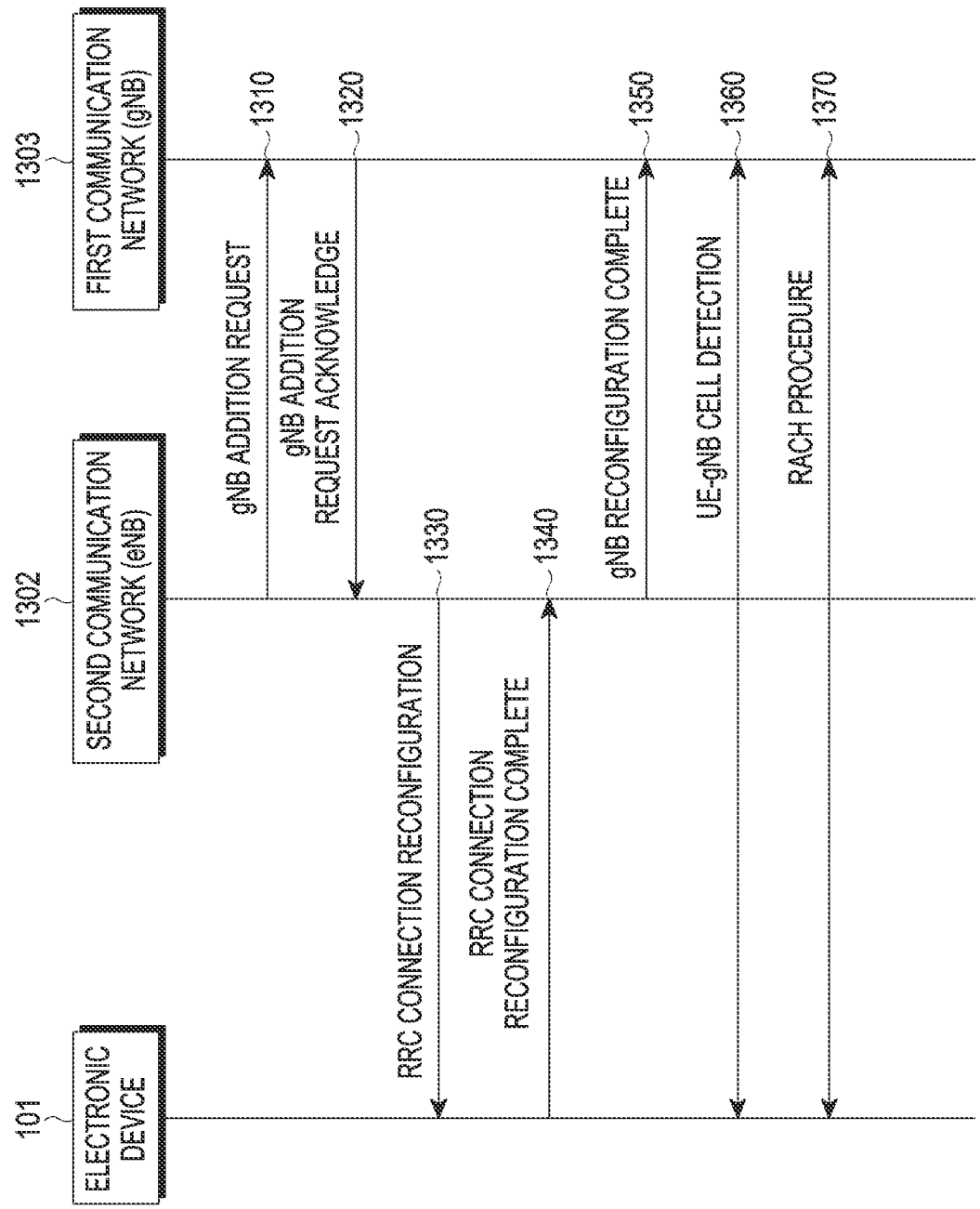
FIG. 13 is a flowchart illustrating EN-DC operations of an electronic device according to an embodiment of the disclosure.

FIG. 13 is a flowchart illustrating EN-DC operations of an electronic device according to an embodiment of the disclosure. Referring to FIG. 13, according to various embodiments, an electronic device (the electronic device 101 of FIG. 1) (e.g., the communication processor 260 of the electronic device) may operate as EN-DC by simultaneously connecting to a first communication network (e.g., NR) and a second communication network (LTE). According to various embodiments, in a state in which the electronic device 101 is connected with the second communication network (e.g., eNB) 1302, the second communication network 1302 may transmit a gNB addition Request 1310 to the first communication network 1303 (e.g., gNB). The first communication network 1303 may transmit a gNB addition Request Acknowledge to the second communication network 1302 in operation 1320.

According to various embodiments, the second communication network 1302 may transmit an RRC Connection Reconfiguration to the electronic device 101 in operation 1330. The electronic device 101 may transmit an RRC Connection Reconfiguration Complete to the second communication network 1302 in operation 1340. The second communication network 1302 may transmit a gNB Reconfiguration Complete to the first communication network 1303 in operation 1350.

The electronic device 101 may perform UE-gNB cell detection with the first communication network 1303 in operation 1360 and may perform a RACH procedure in operation 1370, thereby operating as EN-DC through the first communication network 1303 and the second communication network 1302.

According to various embodiments, the RRC Connection Reconfiguration in operation 1330 may include band/bandwidth (BW) information for the first communication network 1303 to be connected as shown in Table 9 below.

TABLE 9

LTE RRC OTA Packet -- DL_DCCH/RRCConnectionReconfiguration
Subscription ID = 1
Pkt Version = 26
RRC Release Number.Major.minor = 15.5.0
Radio Bearer ID = 1, Physical Cell ID = 0
Freq = 2525
SysFrameNum = N/A, SubFrameNum = 0
PDU Number = DL_DCCH Message, Msg Length = 313
SIB Mask in SI = 0x00
physicalCellGroupconfig
{
  p-NR-FR1 30,
  pdsch-HARQ-ARK-Codebook dynamic
},
spCellConfig
{
   servCellIndex 1,
   reconfigurationWithSync TABLE 9-continued {
  physCellId 0,
  downlinkConfigcommon
  {
    frequencyInfoDL
    {
      absoluteFrequencySSB 392000,
      frequencyBandList
      {
        2
      },
      absoluteFrequencyPointA
      scs-SpecificCarrierList
      {
        {
          ofsetToCarrier 0,
          subcarrierSpacing kHz 15,
          carrierBandwidth 52
        }
      }
    },
    initialDownlinkBWP
    {
      genericParameters
    {
      locatonAndBandwidth 14025,
      subcarrierSpacing kHz 15
    }, The electronic device 101 may receive an RRC Connection Reconfiguration message including Table 9 above and may store the frequency band included in the message, as frequency band information 1112, in the memory 1110. When the transmission power control module 1115 of the electronic device 101 cannot distinguish between the antenna to transmit the signal for the NR band in SA and the antenna to transmit the signal for the NR band in NSA, it is possible to relatively reduce the maximum transmittable power by setting the transmission power based on the one with poorer antenna gain of the two antennas. As described above, in various embodiments, the transmission power control module 1115 of the electronic device 101 may set the maximum transmittable power to be relatively higher based on the antenna gain set for the antenna selected according to the EN-DC operation.

According to various embodiments, when the electronic device 101 transmits a transmission signal using the first antenna 1211 disposed at the lower end, it may be affected by an AP event related to the first antenna 1211. For example, when a grip event occurs due to the user's grip on the electronic device 101 or when an access-related event is caused by OTG/USB or earjack connection, the power of the transmission signal may be affected. According to various embodiments, when the electronic device 101 transmits a transmission signal using the second antenna 1212 disposed at the upper end, it may be affected by an AP event related to the second antenna 1212. For example, when a proximity event occurs due to call reception in the electronic device 101 or when an image sensor-related event occurs according to a camera operation, the power of the transmission signal may be affected.

According to various embodiments, the electronic device 101 may apply a different power limitation due to the influence by the SAR according to the frequency as shown in Table 10 below.

TABLE 10

| Type | Frequency (MHz) | Band | SAR Limit |
|---|---|---|---|
| mid-band (MID) | 1920 to 1980 | B1 | 19.5 |
| mid-band (MID) | 1710 to 1785 | B3 | 19.5 |
| low band (LOW) | 824 to 849 | B5 | — |
| high band (HIGH) | 2500 to 2570 | B7 | 20 |
| low band (LOW) | 880 to 915 | B8 | — |

For example, since the mapping table 1114 stored in the memory 1110 of the electronic device 101 is relatively less affected by the SAR when the frequency band information 1112 is the low band, the maximum transmittable power may be set so that the transmission power is not limited by the SAR. According to various embodiments, referring back to FIG. 12B, when the electronic device 101 is connected with the NR communication network of the N3 band while in connection with the LTE communication network of the B1 band and operates as EN-DC, the electronic device 101 may control to transmit the B1 band signal through the first antenna 1211 and the N3 band signal through the second antenna 1212 based on the EN-DC operation as described above. When the electronic device 101 operates as EN-DC, since LTE is an anchor, the electronic device 101 may set the total transmission power for the B1 band signal to be higher than the total transmission power for the N3 band signal.

For example, when the user's grip is detected in the EN-DC operation, if the transmission power control module 1115 cannot distinguish between the first antenna 1211 and the second antenna 1212, the transmission power of both the first antenna 1211 and the second antenna 1212 may be limited to 19.5 dBm according to Table 10 above. According to various embodiments, when the transmission power control module 1115 of the electronic device 101 distinguishes between the first antenna 1211 and the second antenna 1212, since the user's grip does not influence the second antenna 1212 disposed at the upper end, it is possible to increase the performance of transmission power by refraining from applying the transmission power limitation due to the grip sensor to the N3 band signal transmitted through the second antenna 1212.

According to various embodiments, when the user performs a voice call using the electronic device 101, if the transmission power control module 1115 cannot distinguish between the first antenna 1211 and the second antenna 1212, the transmission power of both the first antenna 1211 and the second antenna 1212 may be limited by 2 dB in consideration of the effect on the head. According to various embodiments, when the transmission power control module 1115 of the electronic device 101 distinguishes between the first antenna 1211 and the second antenna 1212, it may be applied to each antenna whether to limit the transmission power separately for VoLTE or VoNR which is a condition for the voice call. For example, when a voice call is performed with VoLTE, since the voice packets are transferred through the first antenna 1211 at the lower end, the transmission power control module 1115 of the electronic device 101 may further compensate for the power that may be reduced due to the user's grip, for the signal transmitted through the first antenna 1211 and, since the second antenna 1212 disposed at the upper end reduces in spacing from the head during phone talk and may thus influence the SAR, it may reduce the transmission power by 2 dB only under the EN-DC condition.

Hereinafter, various embodiments of adjusting the maximum transmittable power using the mapping table described above are described with reference to FIGS. 14A to 32.

With the development of display components, in transformable electronic devices, (e.g., foldable electronic devices, slidable electronic devices, or rollable electronic devices), the relative placement form of the physical antenna may be changed in real-time. Examples of compensating for performance degradation of transmission signals when the RX path or antenna configuration is changed due to a transformation of the electronic device are described below in connection with various embodiments.

Figure 14A:
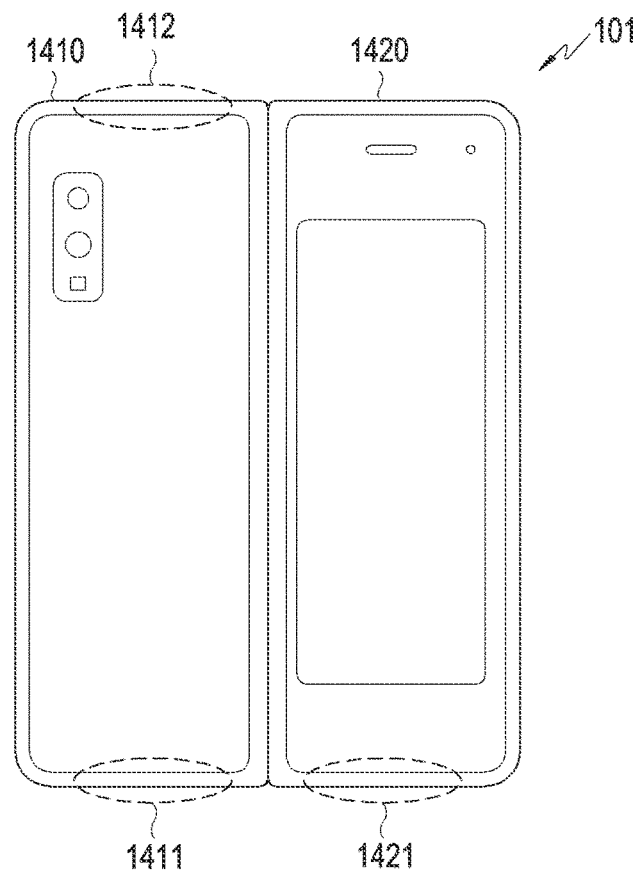
FIG. 14A is a plan view illustrating an electronic device according to an embodiment of the disclosure.

FIG. 14A is a plan view illustrating an electronic device according to an embodiment of the disclosure.

Figure 14B:
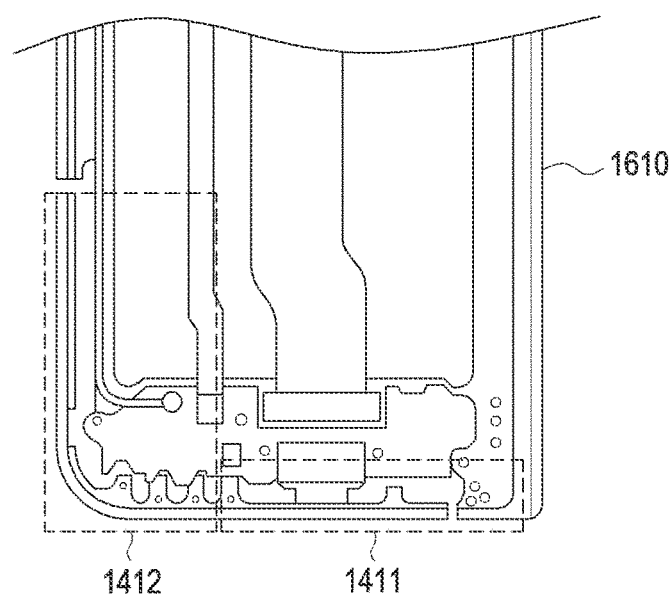
FIG. 14B is a cross-sectional view illustrating an inside of an electronic device according to an embodiment of the disclosure.

FIG. 14B is a cross-sectional view illustrating an inside of an electronic device according to an embodiment of the disclosure.

Referring to FIG. 14A, the electronic device 101 may include a first housing 1410 and a second housing 1420 pivotably coupled with the first housing 1410. When the user uses the electronic device 101 in a fully unfolded state, it may be used in a tablet type, and when it is used in a fully folded state, it may be used in a smartphone type. According to various embodiments, a first antenna 1411 may be disposed at a lower end of the first housing 1410, and a second antenna 1412 may be disposed at an upper end thereof. A third antenna 1421 may be disposed at a lower end of the second housing 1420. Referring to FIG. 14B, the first antenna 1411 and a fourth antenna 1413 may be disposed at a lower end of the first housing 1410. In the following description, for convenience of description, the first housing 1410 is referred to as a main board, and the second housing 1420 is referred to as a sub board. When the electronic device 101 is folded, a shape in which the display is positioned inside may be referred to as an in-fold type, and a shape in which the display is exposed to the outside may be referred to as an out-fold type. FIG. 14A illustrates an example of the in-fold type. The camera module may be exposed through an outer surface of the first housing 1410 which is the main board. An auxiliary display may be disposed on an outer surface of the second housing 1420 which is a sub board.

As illustrated in FIG. 14A, the electronic device 101 which is horizontally folded may have three separate operating conditions as follows, but is not limited thereto. According to various embodiments, the electronic device 101 may reduce transmission power loss by compensating for transmission power according to a change in the shape of the electronic device 101.

1. Folder Open (unfolded state)/tablet-type condition
2. Folder Close (folded state)/phone-type condition
3. Folder Close (folded state)+voice call/hand grip and head spacing reduction condition The electronic device 101 may operate identically or similarly to an electronic device that is not a foldable electronic device in the phone-type condition which is the folded state. In the tablet-type condition, which is the unfolded state, the electronic device 101 may operate based on the specifications according to Table 11 below as the SAR reference varies.

TABLE 11

| FCC | measuring distance | Specification (1 g) | Power Backoff |
|---|---|---|---|
| folded state (Close) | 10 mm | 1.4 | 3 to 5 dB |
| unfolded state (Open) | 0 mm | 1.4 | 8 to 12 dB |

Referring to Table 11, in the tablet-type condition, the measurement distance is 0 mm, and the transmission power limit is very high. Since this condition differs depending on the length of the wavelength of the frequency, the transmission power may be limited. According to various embodiments, the electronic device 101 may determine a change in the shape of the electronic device 101 and apply different transmission power to the unfolded state and the folded state. For example, in the folded state, the electronic device 101 may adjust the transmission power not to apply the transmission power limit of the unfolded state, thereby compensating for transmission power. According to various embodiments, when the user uses the electronic device 101 in the unfolded state, the first antenna 1411 disposed in the first housing 1410 maintains a predetermined distance from the antenna disposed in the second housing 1420 and may thus be less influenced by the load impedance. The fourth antenna 1413 may be influenced by the load impedance due to the hinge between the first housing 1410 and the second housing 1420 and/or the display outside the second housing 1420. According to various embodiments, an unfolded state and folded state of the electronic device 101 may be set as an AP event, and transmission power may be adjusted based on the AP event.

According to various embodiments, when the user uses the electronic device 101 in the folded state, interference with the antenna (e.g., the third antenna 1421) may occur due to the high frequency component of the fourth antenna 1413. According to various embodiments, when the user grips the electronic device 101 in her hand, a transmission power loss may occur.

Figure 14C:
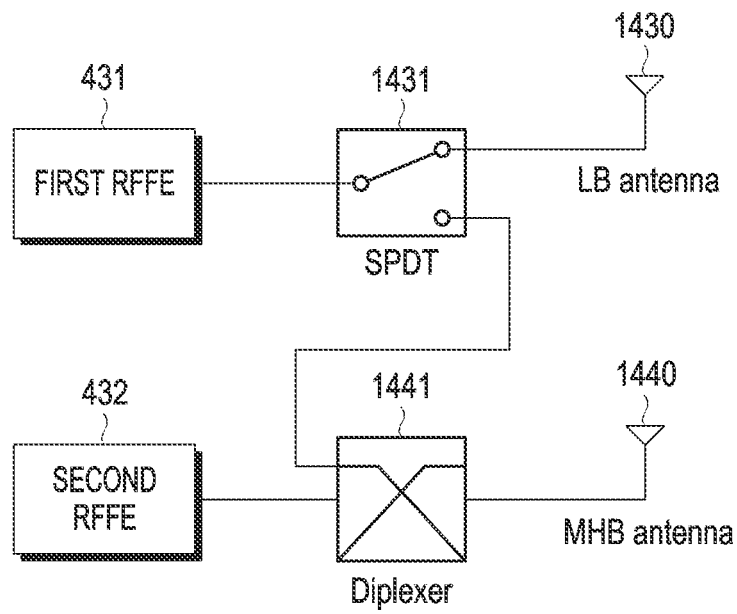
FIG. 14C is a circuit diagram illustrating an electronic device according to an embodiment of the disclosure.
Figure 14D:
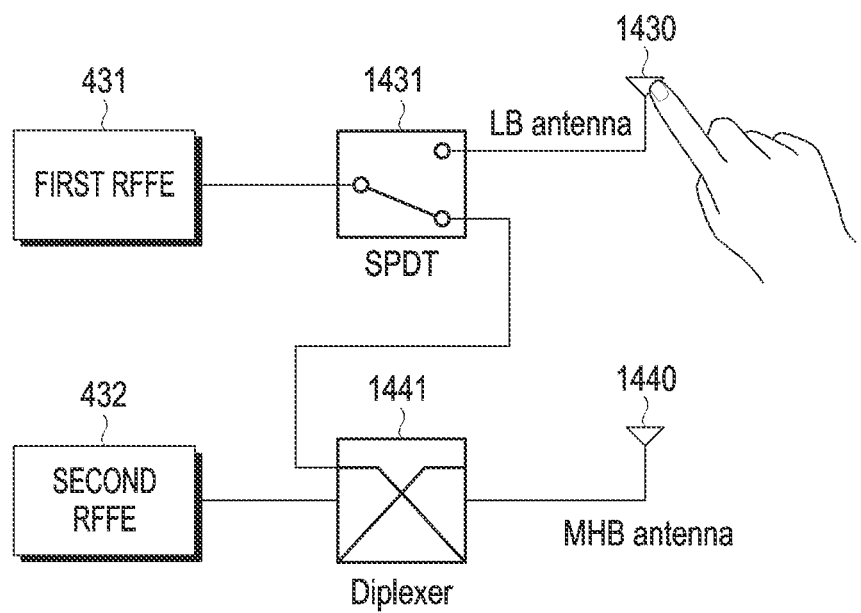
FIG. 14D is a circuit diagram illustrating an electronic device according to an embodiment of the disclosure.

FIGS. 14C and 14D are circuit diagrams illustrating an electronic device according to various embodiments of the disclosure.

Referring to FIG. 14C, the transmission signal output from the first RFFE 431 may be transmitted to the first antenna 1430 through the SPDT switch 1431, and the transmission signal output from the second RFFE 432 may be transmitted to the second antenna 1440 through the diplexer 1441.

Referring to FIG. 14D, when a hand grip occurs adjacent to the first antenna 1430, a transmission power loss may occur. According to various embodiments, as illustrated in FIG. 14D, when a hand grip occurs on the first antenna 1430, the SPDT switch 1431 may be controlled to switch the transmission path for transmission through the second antenna 1440 which is less influenced by the grip.

According to various embodiments, when the transmission path is changed using the SPDT switch 1431, the power of the transmission signal may be reduced by half due to path loss, and a performance degradation of 3 dB may occur. The antenna gain of the electronic device 101 may be reduced as the transmission path is changed. According to various embodiments, the switching condition of the SPDT switch 1431 may be divided into antenna switch (AS) conditions and set as CP events. When the transmission power is reduced by 3 dB due to the SPDT switch 1431 according to the set CP event, the electronic device 101 may additionally increases the power of the transmission signal of the corresponding frequency band, thereby compensating for the transmission power loss due to the change in path. According to various embodiments, the electronic device 101 may perform compensation, further considering the antenna gain reduced in the mid/high frequency band as a low frequency band component is included in the second antenna 1440 due to the change in path and the antenna gain loss which occurs due to the change of the antennas in the low frequency band.

According to various embodiments, the user may perform a voice call in the folded state of the electronic device 101. In the case of a voice call, the performance of the PCell transmission signal may be reduced due to a hand grip on the antenna (e.g., the first antenna 1411) at the lower end of the electronic device 101, so that the total transmission power may not be limited. The first antenna 1411 may be disposed in an intermediate position of the electronic device 101 due to the antenna structure and may be avoided from influence by the hand grip but may be influenced by the user's head. Thus, the transmission power may be limited by the SAR. For example, when the antenna position is changed like the low frequency band, if the electronic device cannot distinguish between hand effect and head effect, the transmission power of the second antenna 1412 may be reduced by 2 dB according to the condition of the head effect, so that the performance of the transmission power may be decreased. According to various embodiments, the electronic device 101 may control to limit the magnitude of transmission power in the first antenna 1411 and compensate for the magnitude of transmission power in the second antenna 1412 based on the transmission path change state, currently connected frequency band information, voice call state, and antenna performance interference occurring in the folded state.

Figure 15:
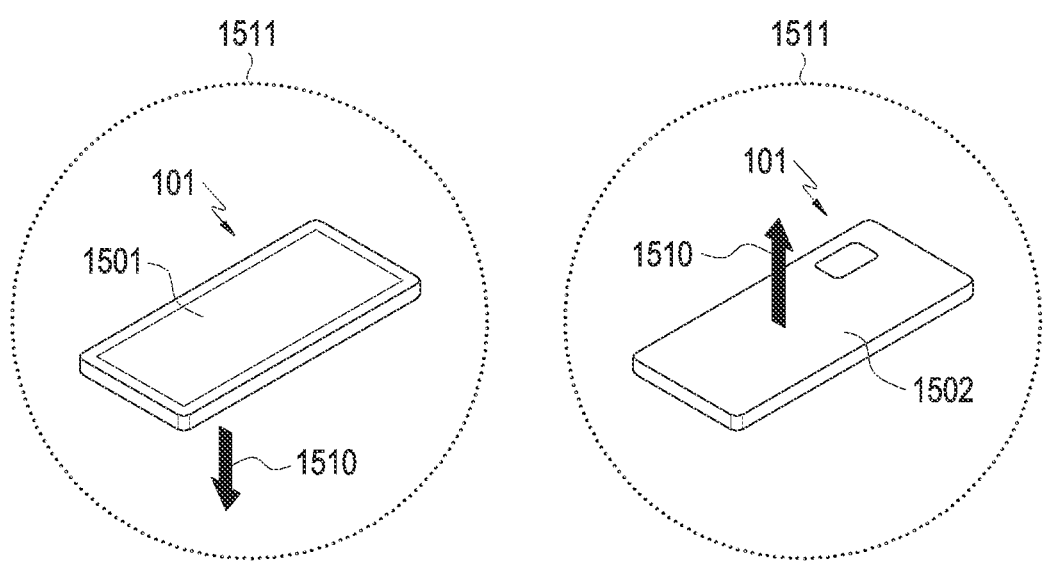
FIG. 15 is a perspective view illustrating an electronic device according to an embodiment of the disclosure.

FIG. 15 is a perspective view illustrating an electronic device according to various embodiments of the disclosure.

Referring to FIG. 15, in the folded state, the transformable electronic device 101 (e.g., a foldable electronic device) may operate in the same manner as a smartphone. For example, the smartphone-type electronic device 101 may have a display 1501 on its front surface and radiate transmission signals 1510 through the rear surface 1502. According to various embodiments, the pattern of the transmission signal radiated from the electronic device 101 may form a spherical isotropic pattern 1511.

Figure 16A:
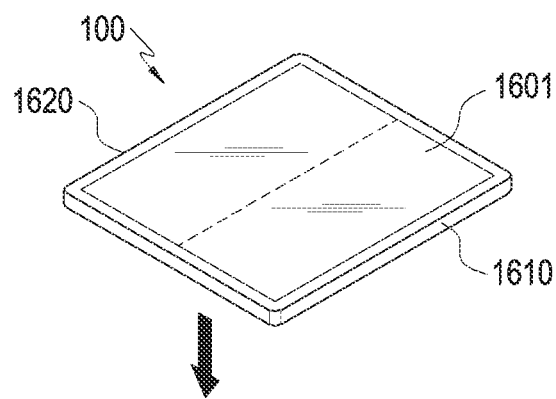
FIGS. 16A, 16B, and 16C are perspective views illustrating an electronic device according to an embodiment of the disclosure.
Figure 16B:
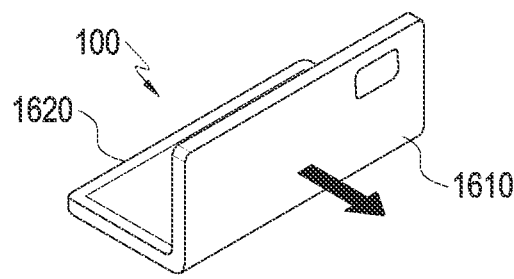
Figure 16C:
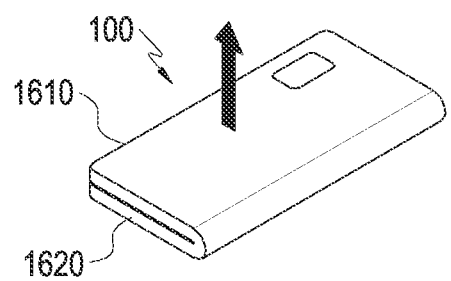

According to various embodiments, as switching from the folded state to the unfolded state, the transformable electronic device 101 (e.g., a foldable electronic device) may add a new antenna or a new RF path as shown in FIGS. 16A, 16B and 16C. The RF path added to the transformable electronic device 101 may be additionally used when an RF path is further needed to simultaneously process multiple frequency components, such as CA, or the NSA condition in which LTE and NR are simultaneously used. In the electronic device 101, in the case of adjacent frequency components or frequency components overlapping in harmonic components which may be generated as multiple RF paths are placed in a small space, RF paths may overlap, and the added RF path may be used to prevent overlapping signals.

According to various embodiments, if RF paths increase, more transmission paths may be selected than transmission paths used for actual transmission. Since each path may affect the radiation performance according to the CP event or AP event, the electronic device 101 may control to select an RF path considering both the radiation benefit and loss. In various embodiments described below, a method for compensating for radiation loss which may arise due to mechanical limitations in the electronic device 101 in a fixed type using an antenna and RF path added and expanded by the foldable structure. In various embodiments described below, it is possible to compensate for transmission power corresponding to the antenna state and RF path further expanded as the outer shape of the electronic device 101 is changed. In various embodiments described below, a change in the outer shape of the electronic device 101 is defined as an AP event and is managed as one state, and the CP determines the antenna state. Thus, it is possible to select an optimal RF path and compensate for transmission power according to the selected RF path. For example, the electronic device 101 may further compensate for the signal or limit the transmission power depending on each circumstance so as to output the transmission power suitable for the optimal antenna path selected from among the antenna paths added as the outer shape of the electronic device 101 is changed, considering the frequency components of LTE and NR together.

FIGS. 16A, 16B, and 16C are perspective views illustrating an electronic device according to an embodiment of the disclosure.

Referring to FIGS. 16A to 16C, an in-fold-type electronic device 101 may include a first housing 1610 and a second housing 1620. When the electronic device 101 is in an unfolded state as shown in FIG. 16A, the display 1601 may be exposed on the front surface of the first housing 1610 and the second housing 1620. Transmission signals may be radiated from the rear surface of the first housing 1610 of the electronic device 101. The electronic device 101 may radiate transmission signals through the rear surface of the first housing 1610 even in a half-folded state as shown in FIG. 16B or a fully-folded state as shown in FIG. 16C.

According to various embodiments, the electronic device 101 may include an additional antenna in the second housing 1620. Thus, it is possible to change the antenna of the first housing 1610 to the antenna of the second housing 1620 in a situation in which a reframing band using the same frequency component is simultaneously used or in a situation in which a high-frequency RF of a 3.5 GHz band is output with the maximum transmission power without affecting other components.

Figure 17:
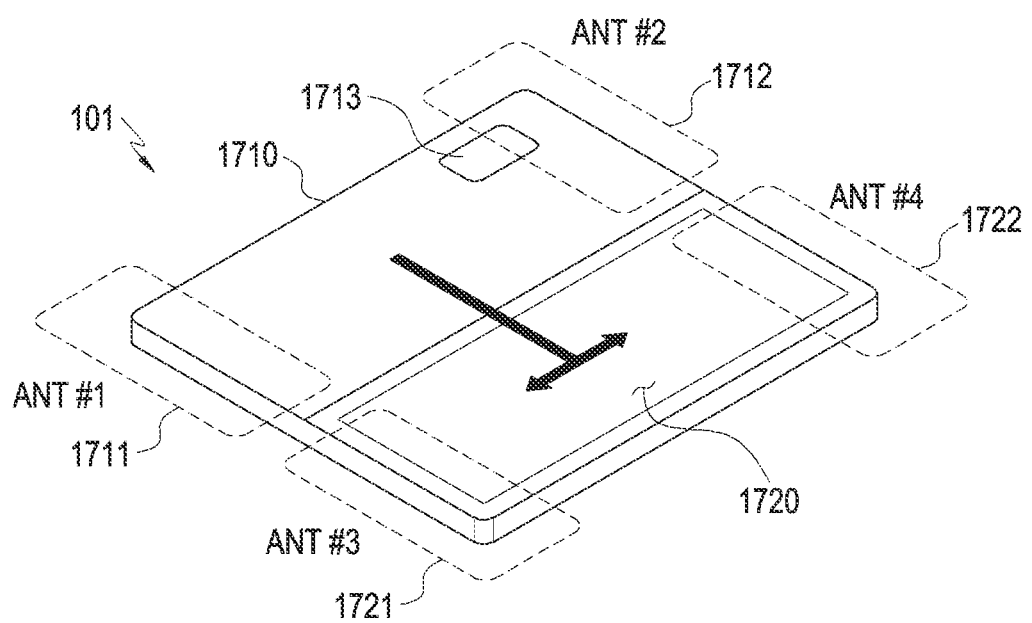
FIG. 17 is a perspective view illustrating an electronic device according to an embodiment of the disclosure.

FIG. 17 is a perspective view illustrating an electronic device according to an embodiment of the disclosure. Referring to FIG. 17, a first antenna 1711 may be disposed at a lower end of the first housing 1710, and a second antenna 1712 may be disposed at an upper end thereof. According to various embodiments, a third antenna 1721 may be disposed at a lower end of the second housing 1720, and a fourth antenna 1722 may be disposed at an upper end thereof. According to various embodiments, when the electronic device 101 changes to the use of the third antenna 1721 or the fourth antenna 1722 while using the first antenna 1711 or the second antenna 1712, the electronic device 101 may adjust the magnitude of transmission power. For example, the electronic device 101 may adjust the transmission power considering the path spacing of the reframing band and the positions of the upper/lower ends in a state of having compensated for the path loss that may occur to transfer a transmission signal in the case of the third antenna 1721 and fourth antenna 1722 added as the electronic device 101 is configured in the in-fold type.

Figure 18A:
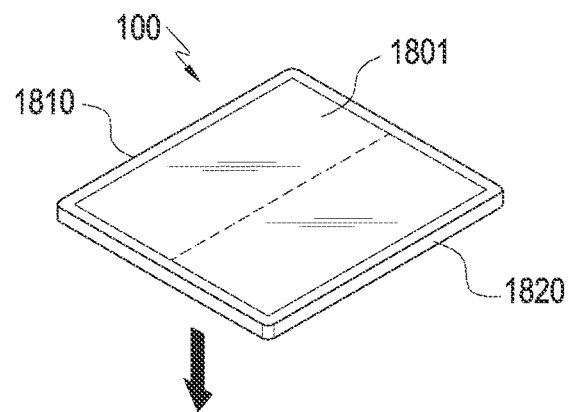
FIGS. 18A, 18B, and 18C are perspective views illustrating an electronic device according to an embodiment of the disclosure.
Figure 18B:
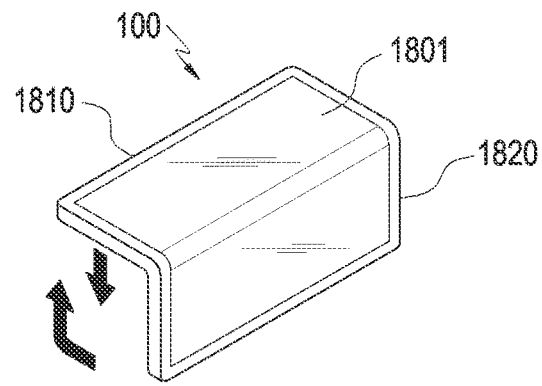
Figure 18C:
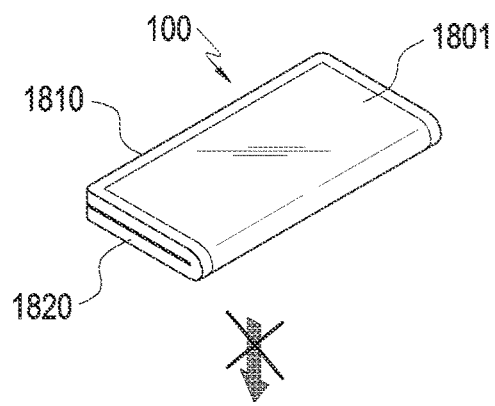

FIGS. 18A, 18B, and 18C are perspective views illustrating an electronic device according to an embodiment of the disclosure.

Referring to FIGS. 18A, 18B, and 18C, the electronic device 101 may be configured in an out-fold type. For example, the out-fold-type electronic device 101 may include a first housing 1810 and a second housing 1820. When the electronic device 101 is in an unfolded state as shown in FIG. 18A, the display 1801 may be exposed on the front surface of the first housing 1810 and the second housing 1820. Transmission signals may be radiated from the rear surface of the first housing 1810 of the electronic device 101. The electronic device 101 may radiate transmission signals through the rear surface of the first housing 1810 even in a half-folded state as shown in FIG. 18B. In the fully folded state of the electronic device 101 as shown in (c), since the rear surface of the first housing 1810 is covered by the second housing 1820, the transmission signal may be blocked. In the form of FIG. 18B, the electronic device 101 may transmit transmission signals through a dipole antenna type at an edge of the first housing 1810 or the second housing 1820. According to various embodiments, in the out-fold-type electronic device 101, the antenna directivity may be changed depending on the folding angle as shown in FIG. 18B or 18C. Thus, the electronic device 101 may use a separate available antenna suitable for each situation.

Figure 19:
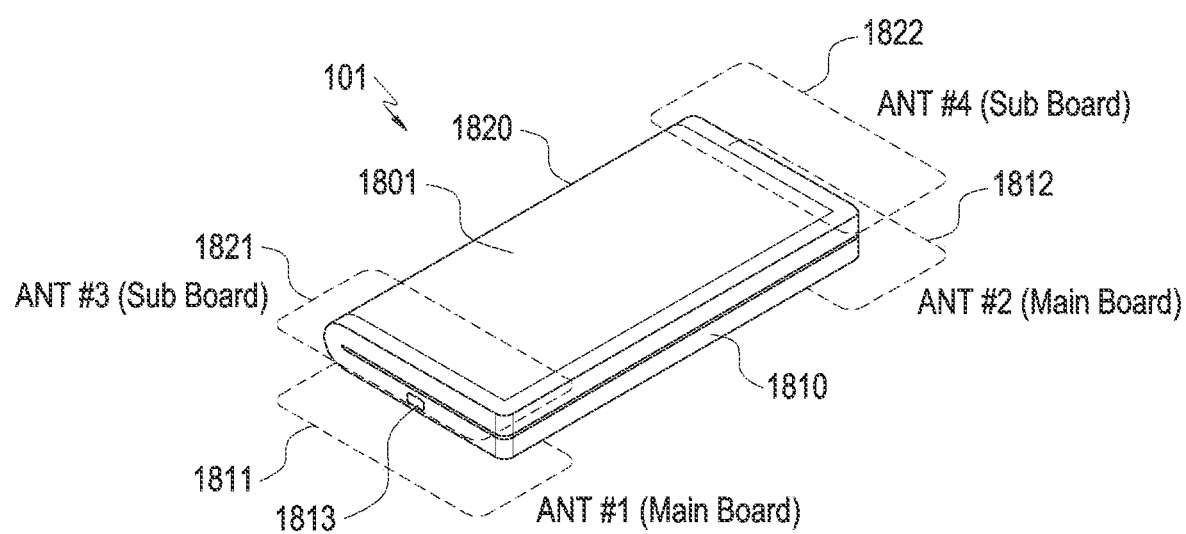
FIG. 19 is a perspective view illustrating an electronic device according to an embodiment of the disclosure.

FIG. 19 is a perspective view illustrating an electronic device according to an embodiment of the disclosure.

Referring to FIG. 19, in the out-fold-type electronic device 101, a first antenna 1811 may be disposed at a lower end of the first housing 1810, and a second antenna 1812 may be disposed at an upper end thereof. In the electronic device 101, a third antenna 1821 may be disposed at a lower end of the second housing 1820, and a fourth antenna 1822 may be disposed at an upper end thereof.

According to various embodiments, the electronic device 101 may change the antenna operation to be able to process multiple frequency component signals using the third antenna 1821 or the fourth antenna 1822 of the second housing 1820. The electronic device 101 may simultaneously operate frequency bands which do not overlap from a frequency point of view by increasing the number of lower antennas or RF paths and address the situation in which the first housing 1810 is covered by the second housing 1820 so that the number of antennas capable of transmitting transmission signals reduces.

According to various embodiments, if the out-fold-type electronic device 101 is fully folded as shown in FIG. 19, the first antenna 1811 and the third antenna 1821 may be positioned adjacent to each other, and the second antenna 1812 and the fourth antenna 1822 may be positioned adjacent to each other. For example, when the electronic device 101 outputs the same frequency components in the state shown in FIG. 19, signals may overlap and reduce due to an insufficient spacing between antennas. According to various embodiments, in the electronic device 101, LTE and NR frequency band signals may be separately disposed at the upper and lower ends under the NSA condition. The electronic device 101 may transmit signals whose frequency components may be divided, such as CA, through adjacent antennas.

According to various embodiments, since the camera or USB terminal 1813 may be influenced by a change in the shape of the electronic device 101, it is possible to remove noise components or adjust the magnitude of transmission signal power considering the same. For example, since the first antenna 1811 is adjacent to the USB terminal 1813, the transmission signal or reception signal may be influenced according to USB communication situations. The second antenna 1812 is adjacent to the camera component and its transmission power may be limited by influence of the transmission signal. In the above restriction situation, the electronic device 101 may stably maintain the transmission power without limitations, by using the third antenna 1821 or the fourth antenna 1822 instead of the first antenna 1811 or the second antenna 1812.

Figure 20:
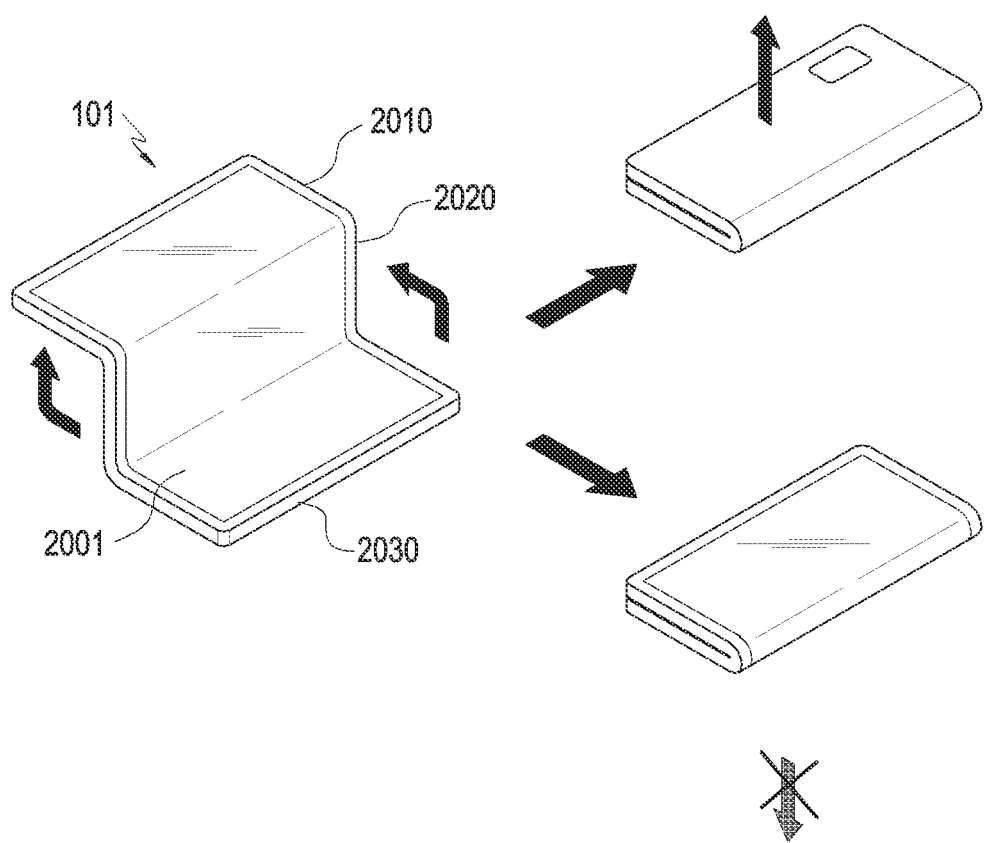
FIG. 20 is a perspective view illustrating an electronic device according to an embodiment of the disclosure.

FIG. 20 is a perspective view illustrating an electronic device according to an embodiment of the disclosure.

Referring to FIG. 20, in the electronic device 101, the first housing 2010 and the second housing 2020 operate in an out-fold type, and the second housing 2020 and the third housing 2030 may operate in an in-fold type. For example, in the fully folded state of the first housing 2010 and the second housing 2020, the display 2001 may be exposed to the outside. According to various embodiments, as the first housing 2010 and the second housing 2020 of the electronic device 101 operate in the out-fold type, the method described above in connection with FIGS. 18A, 18B, and 18C may be applied and, as the second housing 2020 and the third housing 2030 operate in the in-fold type the method described above in connection with FIGS. 16A to 16C may be applied. For example, the electronic device 101 may manage the first folding state information between the first housing 2010 and the second housing 2020 as a first AP event and the second folding state information between the second housing 2020 and the third housing 2030 as a second AP event. The electronic device 101 may control to select the antenna or RF path based on, at least, the first AP event and the second AP event and adjust the magnitude of transmission power according to the selected antenna or RF path.

Figure 21:
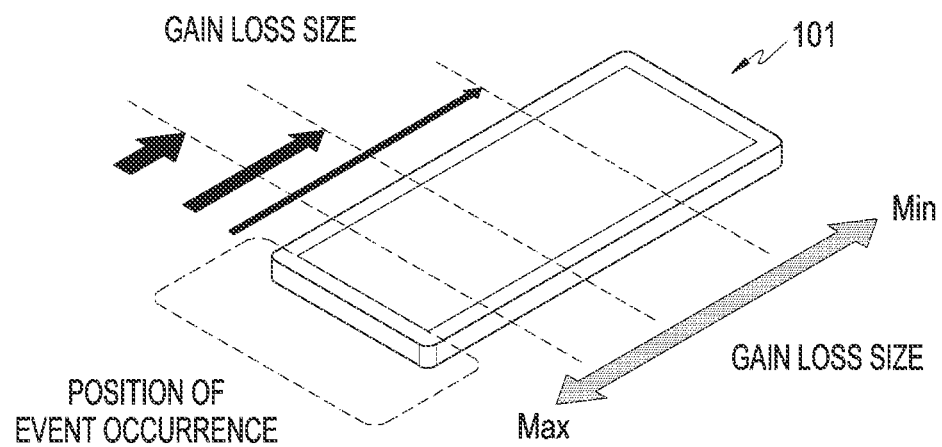
FIG. 21 is a perspective view illustrating an electronic device according to an embodiment of the disclosure.

FIG. 21 is a perspective view illustrating an electronic device according to an embodiment of the disclosure. Referring to FIG. 21, in the electronic device 101 vertically folded, as the antenna is closer to the position where an event occurs, the loss of gain may increase. For example, the electronic device 101 may measure loss according to the distance or position where each event (e.g., a grip event or proximity event), and the influence on gain by each event may be inversely proportional to the distance.

Figure 22A:
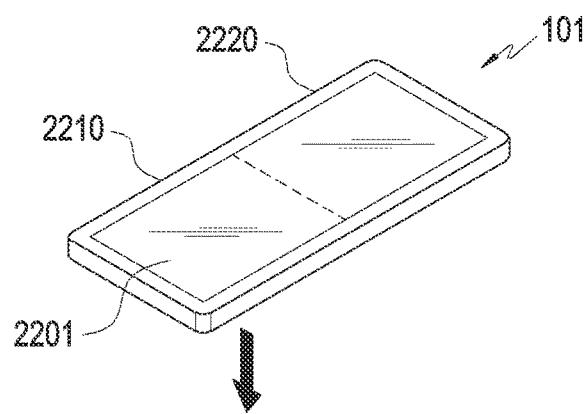
FIGS. 22A, 22B, and 22C are perspective views illustrating an electronic device according to an embodiment of the disclosure.
Figure 22B:
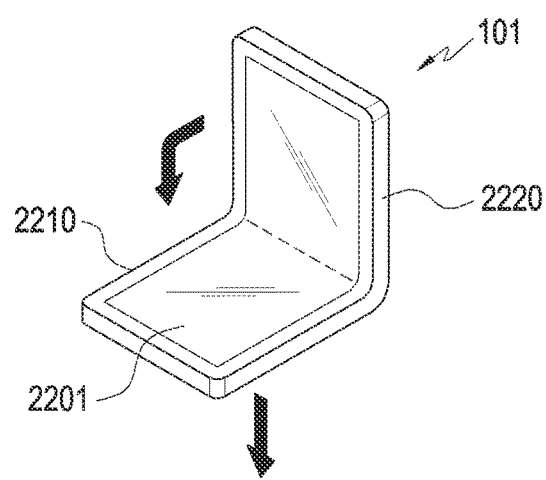
Figure 22C:
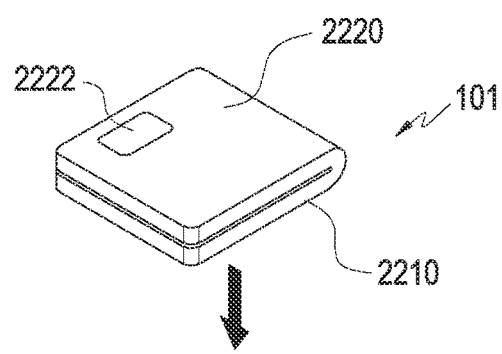

FIGS. 22A, 22B, and 22C are perspective views illustrating an electronic device according to an embodiment of the disclosure.

Referring to FIGS. 22A, 22B, and 22C, unlike the structure of being horizontally folded as shown in FIGS. 16A to 20, in the electronic device 101 which is vertically folded, the outer shape of the electronic device 101 may be expanded toward the antenna upper end or lower end in which case an antenna may be added in the direction in which the electronic device 101 is unfolded. When the electronic device 101 is in an unfolded state as shown in FIG. 22A, the display 2201 may be exposed on the front surface of the first housing 2210 and the second housing 2220. Transmission signals may be radiated from the rear surface of the first housing 2210 of the electronic device 101. The electronic device 101 may radiate transmission signals through the rear surface of the first housing 2210 even in a half-folded state as shown in FIG. 22B or a fully-folded state as shown in FIG. 22C. A camera module 2222 may be disposed on the rear surface of the second housing 2220.

Figure 23A:
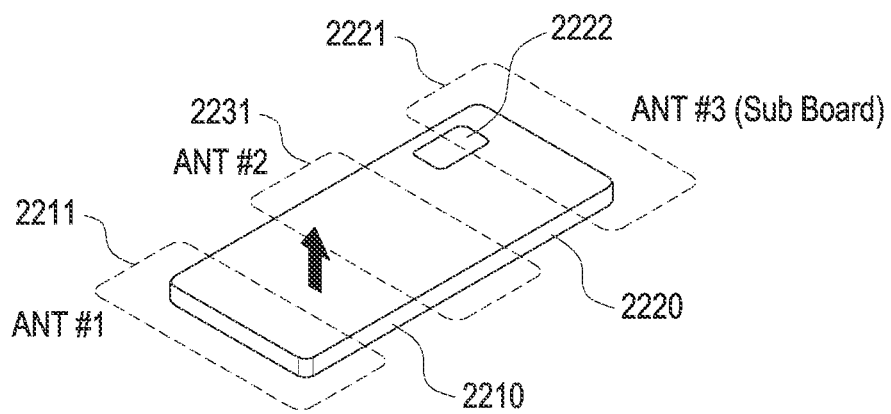
FIGS. 23A and 23B are perspective views illustrating an electronic device according to an embodiment of the disclosure.
Figure 23B:
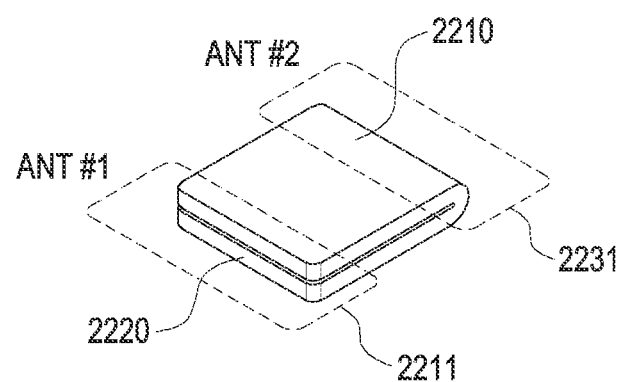

FIGS. 23A and 23B are perspective views illustrating an electronic device according to an embodiment of the disclosure.

Referring to FIGS. 23A and 23B, in the in-fold-type electronic device 101 expanded upward, a first antenna 2211 may be disposed at a lower end, and a second antenna 2231 may be disposed at an upper end, in the folded state. In the fully unfolded state of the electronic device 101, an upper antenna (the upper antenna (third antenna 2221) positioned farther away than the second antenna 2231) in the folded state with respect to the first antenna 2211 may be added as an upper antenna.

For example, as shown in FIGS. 23A and 23B, due to characteristics according to the length of the electronic device 101, the position of the third antenna 2221 at the upper end, extended through the second housing 2220, may be seen as an antenna physically extended as compared with the second antenna 2231 which is the upper antenna in folded state and, as the length has been increased, the third antenna 2221 may be more influenced by the user's head or a component, e.g., a camera, than the second antenna 2231. When using the third antenna 2221, the electronic device 101 may be less influenced by a hand grip or USB connection, which affects the lower end, than when using the second antenna 2231.

According to various embodiments, the electronic device 101 may adjust the transmission power according to each AP event. For example, in the fully unfolded state of the electronic device 101, if more benefit is given by the third antenna 2221 at the upper end, extended by the second housing 2220, the transmission path may be changed to the third antenna 2221. According to various embodiments, the second antenna 2231 and the third antenna 2221 may have the characteristics of an upper antenna and, in a specific event circumstance, the third antenna 2221 may be used instead of the second antenna 2231. For example, if the first antenna 2211 is influenced due to a hand grip condition or USB connection operation which affects the lower end of the electronic device 101 and radiation loss occurs due to a short spacing from the first antenna 2211 when the second antenna 2231 is used, use of the third antenna 2221 extended by the second housing 2220 in the fully unfolded state of the electronic device 101 may increase the distance from the first antenna 2211, thus maximizing the gain obtained when the upper antenna is used. The electronic device 101 may flexibly determine whether to use the second antenna 2231 or the third antenna 2221 depending on the AP event operation considering the benefit and loss of the antenna gain according to the use of the third antenna 2221. For example, in a phone talk situation, the user's head may be positioned adjacent to the third antenna 2221. In this case, as the upper antenna is positioned higher, the SAR effect affecting the head may increase, ending up with a situation in which the transmission power needs to be lowered. In this case, the electronic device 101 may use the second antenna 2231, securing sufficient transmission power without lowering performance and achieving stable communication performance.

According to various embodiments, in a situation in which the electronic device 101 performs data transmission/reception, the user may keep the electronic device 101 in the folding state to use it as a smartphone and, in this case, putting the antenna away from the hand grip condition allows the power of transmission signal to be stably maintained. Thus, the electronic device 101 may transmit transmission signals through the second antenna 2231, rather than the third antenna 2221.

Figure 24A:
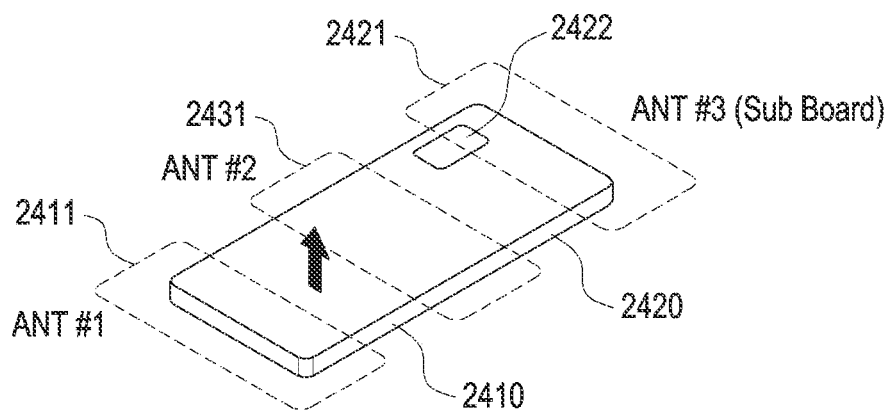
FIGS. 24A and 24B are perspective views illustrating an electronic device according to an embodiment of the disclosure.
Figure 24B:
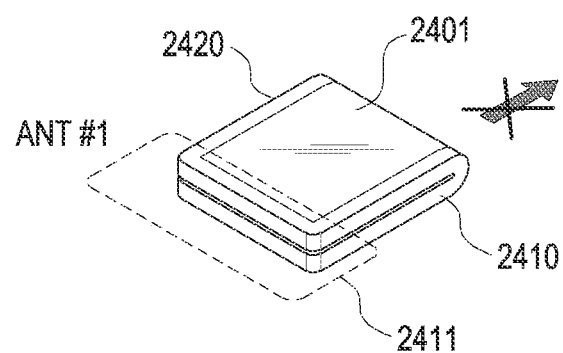

FIGS. 24A and 24B are perspective views illustrating an electronic device according to an embodiment of the disclosure.

Referring to FIGS. 24A and 24B, in an electronic device having a vertically folded structure in the out-fold type, the upper antenna portion may be blocked by the display when it is out folded. For example, in the fully unfolded state of the electronic device 101 of FIG. 24A, a first antenna 2411 may be disposed at a lower end of the first housing 2410, and a third antenna 2421 may be disposed at an upper end of the second housing 2420. In the fully folded state of the electronic device 101 as shown in FIG. 24B, the transmission signal from the second antenna 2431 may be blocked by the display 2401. According to various embodiments, in the fully folded state of the electronic device 101, as in FIG. 24B, it is possible to prevent the second antenna 2431 from being used by setting the path loss corresponding to the second antenna 2431 to infinity (00).

Figure 25:
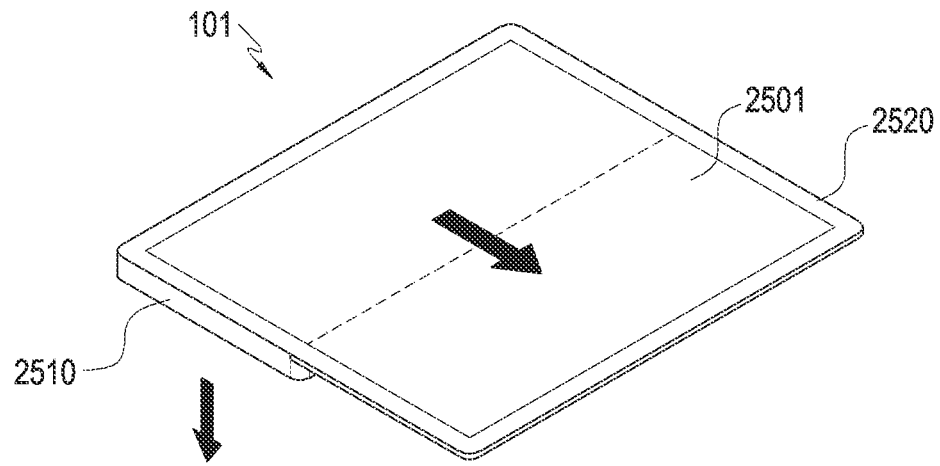
FIG. 25 is a perspective view illustrating an electronic device according to an embodiment of the disclosure.

FIG. 25 is a perspective view illustrating an electronic device according to an embodiment of the disclosure.

Referring to FIG. 25, a rollable or slidable electronic device 101 may be configured so that at least a portion of the second housing 2520 and display 2501 is received in the first housing 2510. According to various embodiments, since the rollable or slidable electronic device 101 extended horizontally, in the fully unfolded state of the display 2501, is similar to that in the unfolded state of the in-fold type shown in FIG. 17, it may be applied in a manner similar to the operation of FIG. 17.

Figure 26:
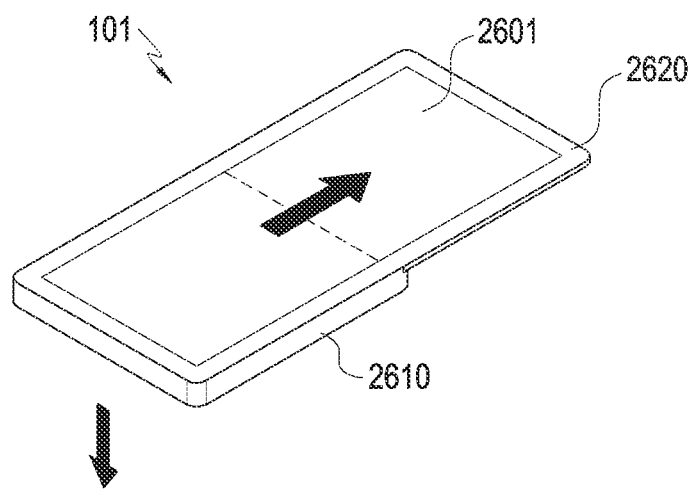
FIG. 26 is a perspective view illustrating an electronic device according to an embodiment of the disclosure.

FIG. 26 is a perspective view illustrating an electronic device according to an embodiment of the disclosure.

Referring to FIG. 26, a rollable or slidable electronic device 101 may be configured so that at least a portion of the second housing 2620 and display 2601 is received in the first housing 2610. According to various embodiments, since the rollable or slidable electronic device 101 extended vertically, in the fully unfolded state of the display 2601, is similar to that in the unfolded state of the in-fold type shown in FIGS. 22A to 22C, it may be applied in a manner similar to the operation of FIGS. 22A to 22C.

According to various embodiments, in the case of a foldable electronic device 101 as described above, there may be an antenna path that is further available or unavailable depending on the foldable type (horizontal/vertical/rollable). For example, since the number of additionally available or unavailable RF paths increases as compared to the number of TX transmissions used by the electronic device 101, a method for selecting an optimal antenna path for each antenna path according to various embodiments may be applied.

Figure 27:
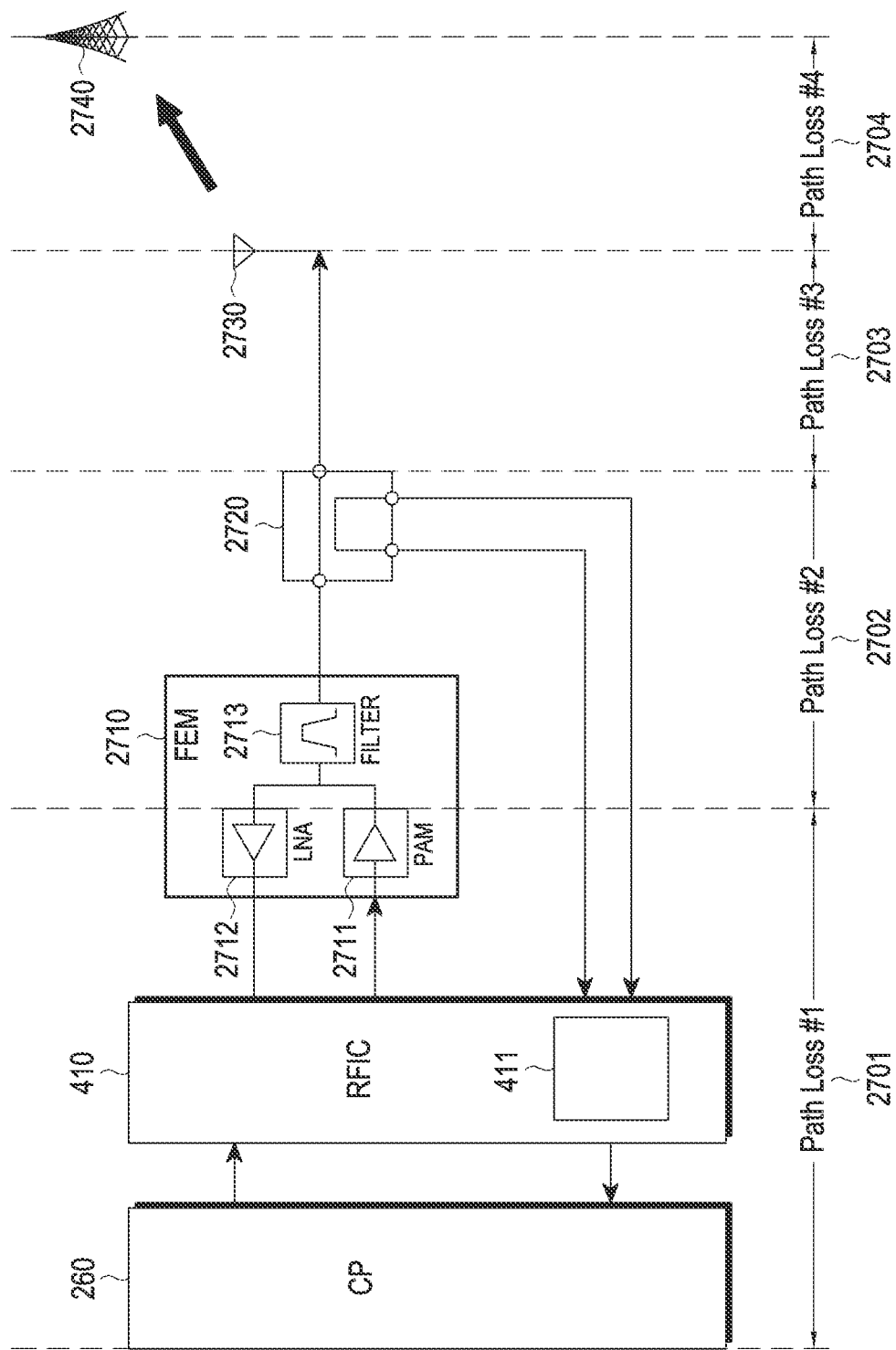
FIG. 27 is a circuit diagram illustrating an electronic device according to an embodiment of the disclosure.

FIG. 27 is a circuit diagram illustrating an electronic device according to an embodiment of the disclosure.

Referring to FIG. 27, the electronic device 101 may include a communication processor 260, an RFIC 410, a front end module (FEM) 2710, a coupler 2720, and an antenna 2730. The FEM 2710 may include a power amplifier module (PAM) 2711, a low noise amplifier (LNA) 2712, and a band pass filter (BPF) 2713. The electronic device 101 may transmit the signal generated by the communication processor 260 to the RFIC 410. The RFIC 410 may convert the signal received from the communication processor 260 into an RF signal and transmit it to the FEM 2710. The FEM 2710 may amplify the signal received from the RFIC 410 by the PAM 2711 and transmit it to the base station 2740 through the bandpass filter 2713 and the coupler 2720 and then the antenna 2730. For example, a portion of the transmission signal transmitted through the coupler 2720 may be input to the RFIC 410 through a feedback line. A power detector 411 of the RFIC 410 may determine the magnitude of transmission power based on the fed-back signal.

According to various embodiments, the pass loss PL occurring in each transmission section of the electronic device 101 may be divided into a first PL 2701, a second PL 2702, a third PL 2703, and a fourth PL 2704. The first PL 2701 may be defined as a path loss between the communication processor 260 and the PAM 2711. The second PL 2702 may be defined as a path loss between the PAM 2711 and the coupler 2720. The third PL 2703 may be defined as a path loss between the coupler 2720 and the antenna 2730. The fourth PL 2704 may be defined as a path loss between the antenna 2730 and the base station 2740.

Figure 28:
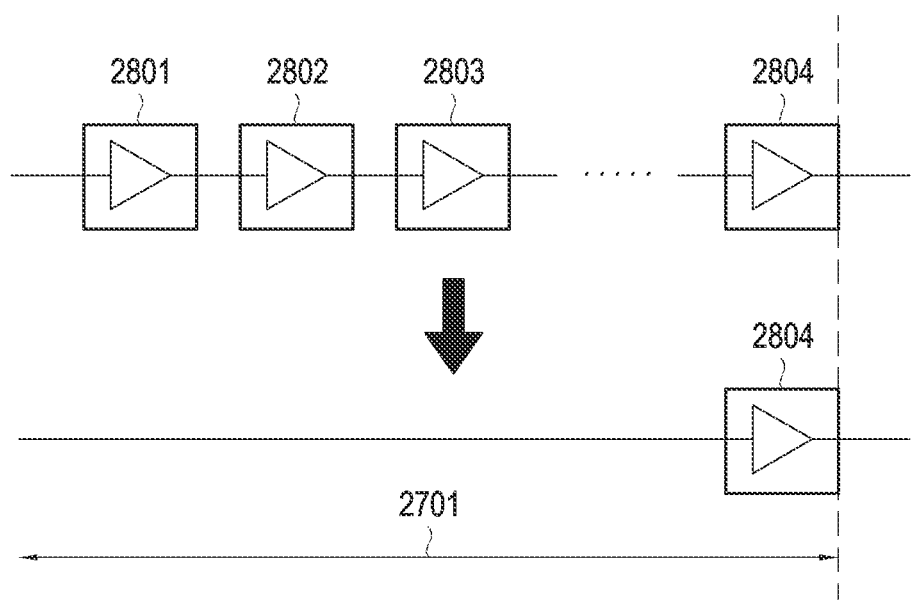
FIG. 28 illustrates a power amplifier of an electronic device according to an embodiment of the disclosure.

FIG. 28 illustrates a power amplifier of an electronic device according to an embodiment of the disclosure.

Referring to FIG. 28, the first PL 2701 may compensate for it by adjusting the gain the final power amplifier 2804 among the plurality of PAs 2801, 2802, 2803, and 2804 included in the PAM 2711 as shown in FIG. 28. For example, the electronic device 101 may regard the first PL 2701 as 0 dB. According to various embodiments, the second PL 2702 may be compensated by the signal fed back through the coupler 2720. The third PL 2703 may be estimated and compensated by the AP event or CP event. The fourth PL 2704 may be indirectly identified through the strength of the wireless signal arriving at the base station 2740, and the fourth PL 2704 may be compensated through transmission power control (TPC) control by the base station 2740.

According to various embodiments, the transformable electronic device 101 (e.g., a foldable, rollable, or slidable electronic device) may divide the path loss PL as shown in FIG. 27 depending on the position of the antenna and a mechanical change in the antenna added as the outer shape is changed. To reduce path loss on all the RF paths, the path corresponding to the first PL 2701 may be disposed as proximate to each antenna as possible, so that it is possible to compensate for all loss components that may occur in the design phase for all RF paths.

Figure 29:
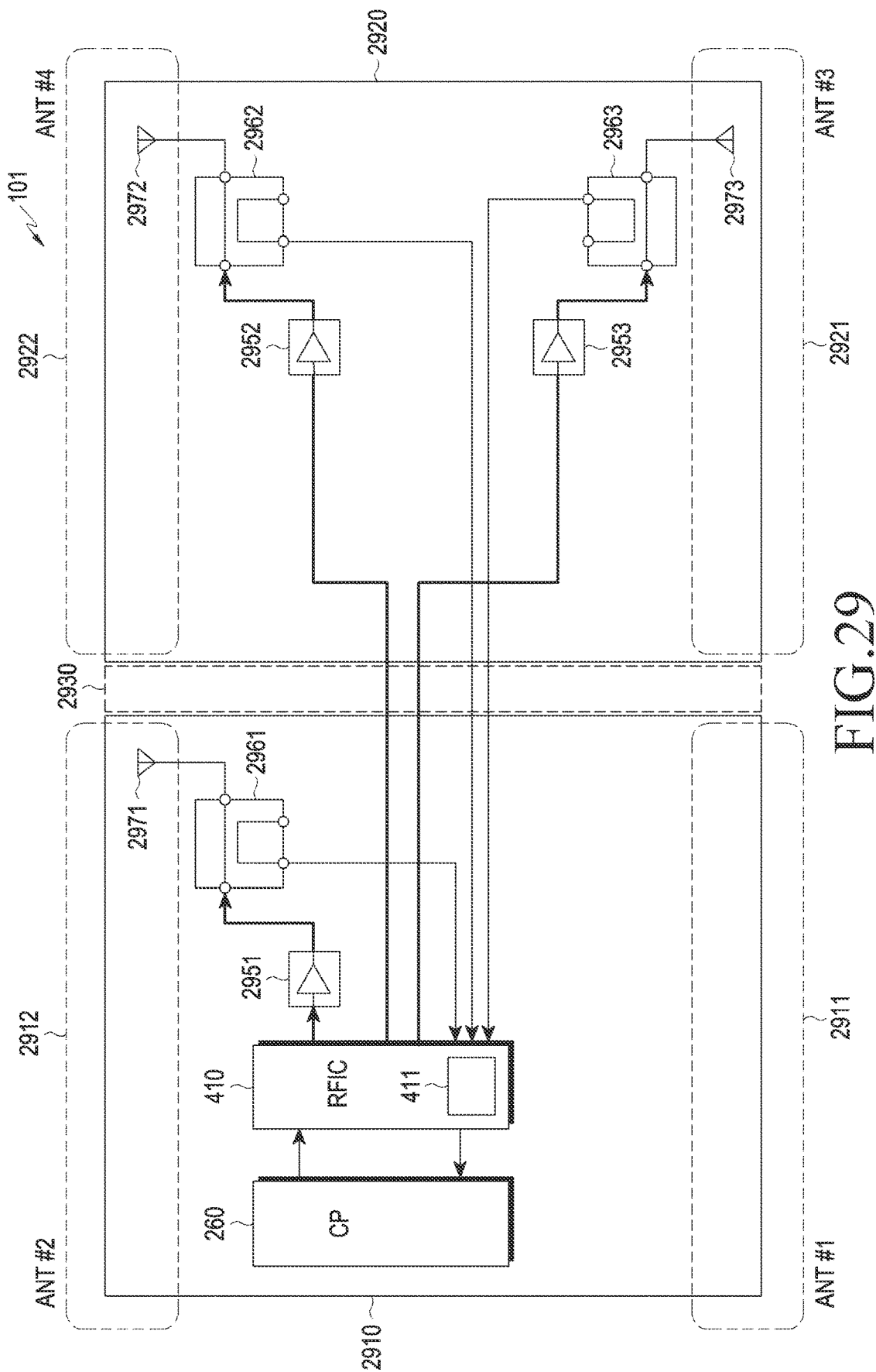
FIG. 29 is a circuit diagram illustrating an electronic device according to an embodiment of the disclosure.

FIG. 29 is a circuit diagram illustrating an electronic device according to an embodiment of the disclosure.

Referring to FIG. 29, the electronic device 101 may include a communication processor 260, an RFIC 410, a first PAM 2951, a first coupler 2961, a first antenna 2911, and a second antenna 2912 and 2971, in a first housing 2910. The electronic device 101 may include a second PAM 2952, a second coupler 2962, a third antenna 2921 and 2973, a third PAM 2953, a third coupler 2963, and a fourth antenna 2922 and 2972, in a second housing 2920. The electronic device 101 may transmit the signal generated by the communication processor 260 to the RFIC 410. The RFIC 410 may convert the signal received from the communication processor 260 into an RF signal and may transmit it to the first PAM 2951 in the first housing 2910. The RFIC 410 may convert the signal received from the communication processor 260 into an RF signal and may transmit it through a hinge area 2930 to the second PAM 2952 or the third PAM 2953 in the second housing 2920.

According to various embodiments, as illustrated in FIG. 29, the frequency band using the upper antenna path of the first housing 2910 may be extended so that the third antenna 2921 or the fourth antenna 2922 of the second housing 2920 may be used. For example, it is possible to set the path loss to substantially 0 by designing the PAMs 2951, 2952, and 2953 capable of compensating for the gain, adjacent to the couplers 2961, 2962, and 2963 corresponding to the path of the second PL.

According to various embodiments, referring to FIG. 29, when three RF paths are used in a structure in which one transmission signal is present, more burden may occur in light of costs and space as components, such as unused PAMs, are disposed. Given this, the electronic device 101 may set the transmission power based on the loss of the main transmission path transmitting signals and may set the transmission power for the remaining transmission paths considering the loss of the main transmission path.

Figure 30:
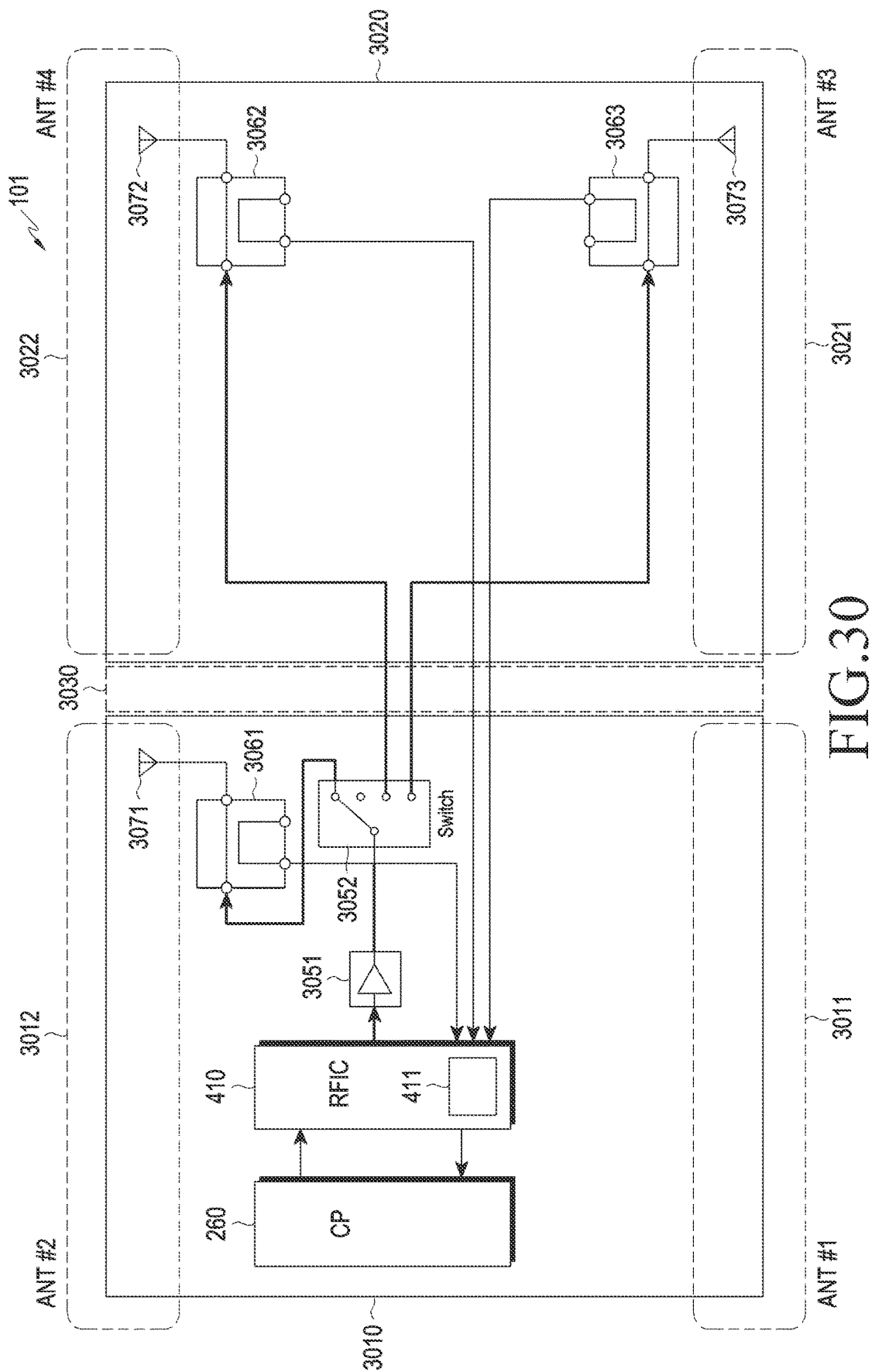
FIG. 30 is a circuit diagram illustrating an electronic device according to an embodiment of the disclosure.

FIG. 30 is a circuit diagram illustrating an electronic device according to an embodiment of the disclosure.

Referring to FIG. 30, the electronic device 101 may include a communication processor 260, an RFIC 410, a PAM 3051, a switch 3052, a first coupler 3061, a first antenna 3011, and a second antenna 3012 and 3071, in a first housing 3010. The electronic device 101 may include a third coupler 3063, a third antenna 3021 and 3073, a second coupler 3062, and a fourth antenna 3022 and 3072, in a second housing 3020. The electronic device 101 may transmit the signal generated by the communication processor 260 to the RFIC 410. The RFIC 410 may convert the signal received from the communication processor 260 into an RF signal and may transmit it to the PAM 3051 in the first housing 3010. The switch 3052 may transmit the signal amplified by the PAM 3051 to the second antenna 3012 through the first coupler 3061 in the first housing 3010. The switch 3052 may transmit the signal amplified by the PAM 3051 through the third coupler 3063 or the second coupler 3062 in the second housing 3020 to the third antenna 3021 or the fourth antenna 3022.

According to various embodiments, as illustrated in FIG. 30, when performance is compensated by a single PAM 3051 and an RF path is selected using the switch 3052, the signal strength of each RF path may be decreased by the path loss (¼ in the case of 1T4R) caused by the switch 3052. For example, a signal loss of, e.g., −6 dBm, may occur. In this case, since the distances from the first housing 3010 to each antenna are all different, path loss due to the distance of each antenna may be different. According to various embodiments, the electronic device 101 may set the RF path considering path loss according to each selectable antenna path.

According to various embodiments, the electronic device 101 may determine the path priority based on the path loss of the RF path before change and the path loss of the RF path after change. For example, when there is a gain in the RF path after change as a result of the path loss comparison, the electronic device 101 may control to change the transmission path when there is a gain of an additionally set margin or more so as to prevent a frequent transmission path change.

According to various embodiments, the electronic device 101 may control to change the transmission path when the main antenna path is physically blocked and is thus not used due to a change in the shape of the electronic device 101. The electronic device 101 may control to change the transmission path when other components or operations are affected by the transmission signal due to a change in the shape of the electronic device 101. The electronic device 101 may control not to change the transmission path when the path loss of the changed transmission path increases and thus no benefit is obtained only by compensating for gain.

For example, as described above in connection with FIGS. 18A, 18B, 18C, 20, 24A and 24B, when the antenna is covered by a material having a medium incapable of transmitting transmission signals and its radiation performance is thus affected, the electronic device 101 may set the path loss of the antenna to infinity. For example, when the currently set path loss of the transmission path is set to infinity according to a change in the shape of the electronic device 101, the electronic device 101 may be configured to change to a switchable transmission path.

According to various embodiments, referring back to FIG. 17, an LTE B1 signal may be transmitted through the first antenna 1711 of the first housing 1710, and an N78 signal of NR may be transmitted through the second antenna 1712 of the first housing 1710. The N78 frequency band of NR, as a high frequency band, may be significantly affected by the SAR by the nature of a high frequency, and its signal characteristics, such as diffraction and refraction, may have large straightness as compared with low-frequency components. By the above-described nature, the effect according to the user's use environment or the position of antenna may be large according to the change in shape. Thus, changing the transmission path may present better performance.

Referring back to FIG. 30, in the in-fold type electronic device 101, a change may be made to the third antenna 3021 or fourth antenna 3022 of the second housing 3030 according to a change in the shape of the device. For example, in FIG. 30, the total path loss for each transmission path may be set as the sum of the default path loss and the event path loss. The default path loss is a path loss caused by hardware design of the electronic device 101 and may be a fixed value. The event path loss is a path loss that may additionally occur according to a set AP event or CAP event and may be applied when a corresponding event occurs. According to various embodiments, the default path loss for each antenna may be set as shown in Table 12 below.

TABLE 12

| antenna | Antenna antenna position | upper/ lower | available antenna LTE B1 | NR N78 | Default Path loss value (dB) | reference |
|---|---|---|---|---|---|---|
| #1 | main | lower | o | x | 0 | unused |
| #2 | board | upper | x | o | 6 | 1T4R switch(3) + length loss(0) |
| #3 | sub board | lower | x | o | 7 | 1T4R switch(3) + length loss(1) |
| #4 | | high | x | o | 8 | 1T4R switch(3) + length loss(2) |

Referring to Table 12, under the condition where antenna paths do not overlap, the selectable path for antennas for transmitting the N78 frequency band signal is the second antenna, the third antenna, and the fourth antenna. Thus, the electronic device 101 may determine the currently available antenna path by reflecting the path loss according to each event. For example, the path loss for each event in the N78 frequency band may be set as shown in Table 13 below.

TABLE 13

| Event type | | Loss | Affected antenna | | | |
|---|---|---|---|---|---|---|
| Type | Value | (dB) | #1 | #2 | #3 | #4 |
| AP | Camera | 7 | | o | | |
| CP | RCV(Hand) | 2 | | o | | o |
| AP | GRIP | 3 | o | | o | |

The total path loss calculated considering the default path loss of Table 12 and the path loss for each event of Table 13 may be expressed as shown in Table 14.

TABLE 14

| Priority | Antenna | | | Loss | | | EVENT combination |
|---|---|---|---|---|---|---|---|
| | antenna | antenna position | upper/lower | Default | EVENT | Total | |
| 1 | #2 | main board | high | 6 | 0 | | |
| 2 | #4 | sub board | high | 7 | 0 | 7 | |
| 3 | #2 | main board | high | 6 | 2 | 8 | RCV |
| 4 | #3 | sub board | low | 8 | 0 | 8 | |
| 5 | #4 | sub board | high | 7 | 2 | 9 | RCV |
| 6 | #3 | sub board | low | 8 | 3 | 11 | GRIP |
| 7 | #2 | main board | high | 6 | 7 | 13 | CAMERA |

Referring to Table 14, the priority of each antenna may be determined according to the total path loss. For example, the electronic device 101 may set the second antenna (e.g., the second antenna) of the main board (e.g., the first housing 3010) with the least total path loss for transmitting the signal of the N78 frequency band in the absence of an AP event, as the optimal transmission path. According to various embodiments, when a call is received and a call event (RCV) occurs, priority 3 having a higher priority among priorities 3 and 5 in which the call event is considered in Table 14 may be set as the transmission path. For example, when the call event is identified as an AP event, the electronic device 101 may set the second antenna (e.g., the second antenna 3012) of the main board (e.g., the first housing 3010), as the optimal transmission path, according to priority 3, which has the highest priority for transmission of the N78 frequency band signal. According to various embodiments, when a plurality of paths have the same path loss in a corresponding event, the electronic device 101 may control to set it as the main transmission path without changing the path. If the transmission path is determined based on Table 14 above, it is possible to additionally limit or compensate for the transmission power according to the value set based on the frequency band, the AP event, and the CP event as shown in Table 7 above.

Figure 31:
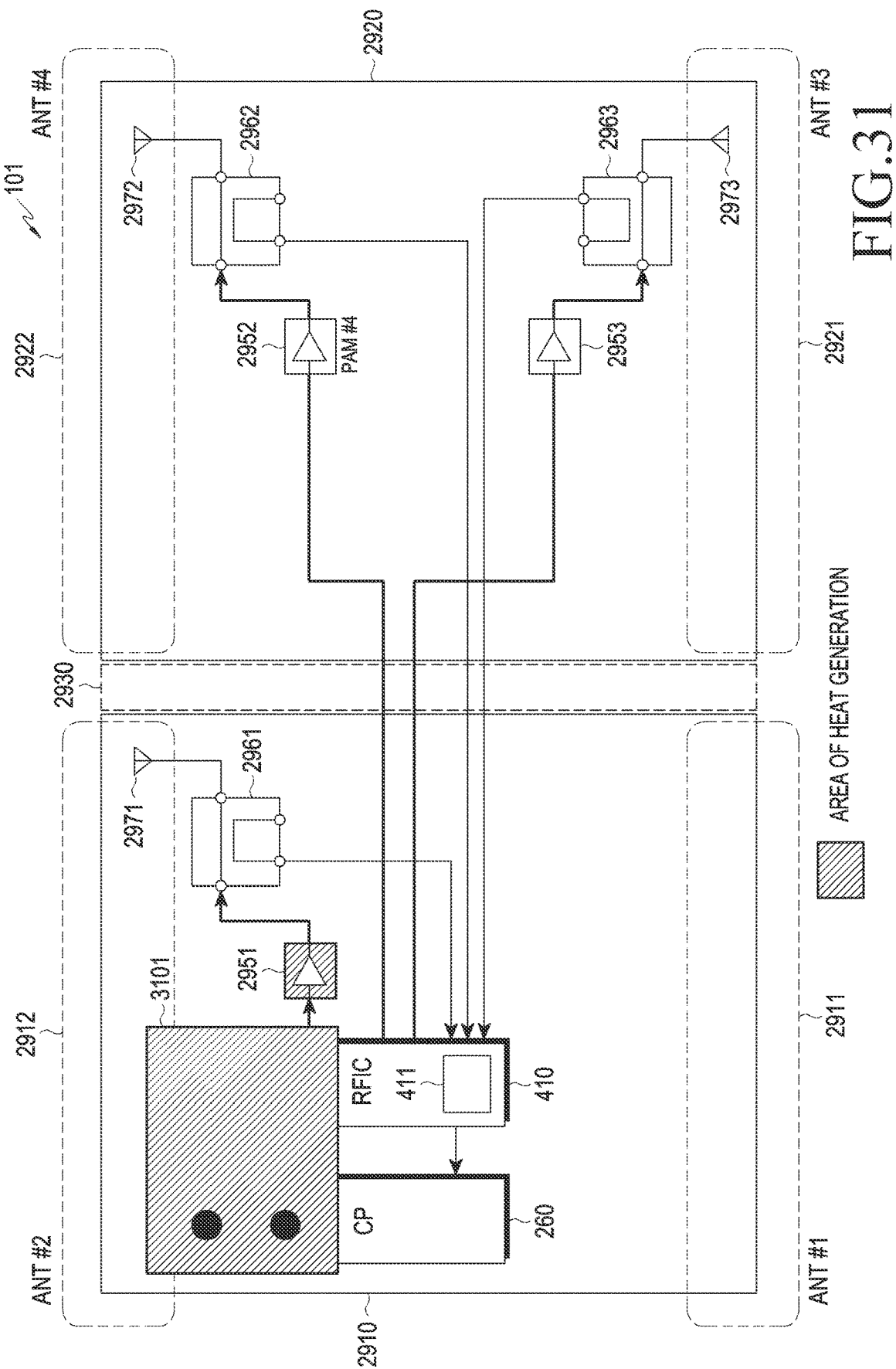
FIG. 31 is a circuit diagram illustrating an electronic device according to an embodiment of the disclosure.

Referring back to FIG. 29, since the PAMs 2951, 2952, and 2953 are added to each transmission path to compensate for the path loss, the gain according to the path change may be relatively small, so that the path change due to the default path loss may not occur. In the case of FIG. 29, the electronic device 101 may determine a transmission path based on the occurrence of an event. For example, as illustrated in FIG. 31, when the camera module 3101 and the first PAM 2951 are being used at the same time, they may affect each other. According to various embodiments, the electronic device 101 may set the operation of the camera module 3101 as an AP event and apply the AP event when determining a transmission path, thereby reducing a loss of transmission power gain. For example, a coupling and harmonic component may occur due to a reduction in the spacing between the transmission path of the N78 frequency band and the camera data line. Further, heat may be generated due to an increase in camera data throughput and an operation of the PAM 2951 for processing high-frequency components.

For example, the camera module 3101 may be disposed at an upper end of the first housing 2910. As the size and number of pixels of the image sensor increase to provide a better resolution and quality, the data lines may become complicated and increase. According to various embodiments, in a situation in which a 5G signal of a 3.5G band using an RF path corresponding to the second antenna 2912 disposed at the upper end of the first housing 2910 is transmitted, coupling and harmonic components of signals may be introduced into the camera data line due to the physical characteristics of high frequency signals. If the signal introduced into the camera data line increases the noise level of the camera data signal by a predetermined value or more, an error in image data may increase. According to various embodiments, the electronic device 101 may set the operation of the camera module 3101 as an AP event and may change the transmission path of the N78 frequency band signal to the third antenna 2921 or the fourth antenna 2922 of the second housing 2920 in a situation where the camera module 3101 is operating.

According to various embodiments, heat may be generated as the data throughput and capacity of the electronic device 101 increase, and since a low-temperature burn may be caused to the human body when the heat generation level is larger than a certain level, the electronic device 101 may lower or turn off the performance of the component. According to various embodiments, the electronic device 101 may set a transmission path to normally operate by reducing the effect of heat generation. The heat generated by the PAM 2951 may increase as more current is used by the PAM 2951 uses more current in the process of amplifying a signal, a high-frequency component is processed, or the strength of the current used is increased (the amplification is increased). For example, referring to FIG. 31, a situation in which the camera module 3101 and the PAMs 2951, 2953, and 2952 are used simultaneously may be represented as in Table 15 below.

TABLE 15

| Antenna | | available antenna | | Default Path loss | |
|---|---|---|---|---|---|
| antenna | antenna position | upper/lower | LTE B1 | NR N78 | value (dB) | reference |
| #1 | main board | low | ○ | x | 0 | unused |
| #2 | | high | x | ○ | 0 | PAM #1(0) + length loss (0) |
| #3 | sub board | low | x | ○ | 0 | PAM #2(0) + length loss (0) |
| #4 | | high | x | ○ | 0 | PAM #3(0) + length loss (0) |

In FIG. 31, since PAM is used for each transmission path, the default path loss is relatively small, and only event loss may be considered. For example, the loss for each event affecting the N78 frequency band signal, including the operation of the camera module 3101, may be represented as shown in Table 16 below.

TABLE 16

| Event type | | Loss | Affected antenna | | | |
|---|---|---|---|---|---|---|
| Type | Value | (dB) | #1 | #2 | #3 | #4 |
| AP | Camera | 7 | | ○ | | |
| AP | CAM heat | 99(∞) | ○ | ○ | ○ | |
| CP | RCV(Hand) | 2 | | ○ | | ○ |
| AP | GRIP | 3 | ○ | | ○ | |

Referring to Table 16, when a temperature higher than a reference value is detected due to the camera module 3101 when using the camera module 3101, the electronic device 101 may control to set the heat generation condition as an AP event and set the path loss to 99 or infinity (∞) so that the path is not set to the affected antenna. For example, when the camera module 3101 generates heat, the electronic device 101 may change the path to the fourth antenna 2922 which is less affected by the heat generation, instead of lowering the power of the transmission signal or turning off the power. The total path loss as a result of combining the above-mentioned Table 15 and Table 16 may be expressed as in Table 17 below.

TABLE 17

| | Antenna | | | | EVENT | |
| --- | --- | --- | --- | --- | --- | --- |
| Pri-ority | antenna | upper/position | lower | Default | Loss EVENT | Total | combi-nation |
| 1 | #2 | main board | high | 0 | 0 | 0 | |
| 2 | #4 | sub board | high | 0 | 0 | 0 | |
| 3 | #3 | sub board | low | 0 | 0 | 0 | |
| 4 | #2 | main board | high | 0 | 2 | 2 | RCV |
| 5 | #4 | sub board | high | 0 | 2 | 2 | RCV |
| 6 | #3 | sub board | low | 0 | 3 | 3 | GRIP |
| 7 | #2 | main board | high | 0 | 7 | 7 | CAMERA |
| 8 | #2 | main board | high | 0 | 99(∞) | 99(∞) | CAMERA heat |
| 9 | #4 | sub board | high | 0 | 99(∞) | 99(∞) | CAMERA heat |

According to various embodiments, referring to Table 17, the priority of the first housing 2910 (main board) may be set to be high in the same total path loss. For example, when a phone call event (RCV) occurs, the electronic device 101 may set the second antenna 2912 of the first housing 2910 (main board) as the transmission path according to priority 4 which is higher, among priority 4 and priority 5. According to various embodiments, in a situation in which the camera module 3101 is used, a setting is made to have opposite characteristics of the lower antenna transmitting the LTE B1 frequency signal using the fourth antenna 2922, and it is possible to compensate for the loss of power reduced by the influence of the camera module 3101. According to various embodiments, if the heat of the camera module 3101 increases, the priority of the third antenna 2921, which is positioned furthest from the position where the highest heat is generated according to the distance between the parts, increases, so that the electronic device 101 may change the path setting to the third antenna 2921. According to various embodiments, the electronic device 101 may set the performance degradation factor, which may occur due to heat generation or operation of components, as each event and compensate for it, thereby stably adjusting the radiation performance of the electronic device 101 to the optimal performance.

Figure 32:
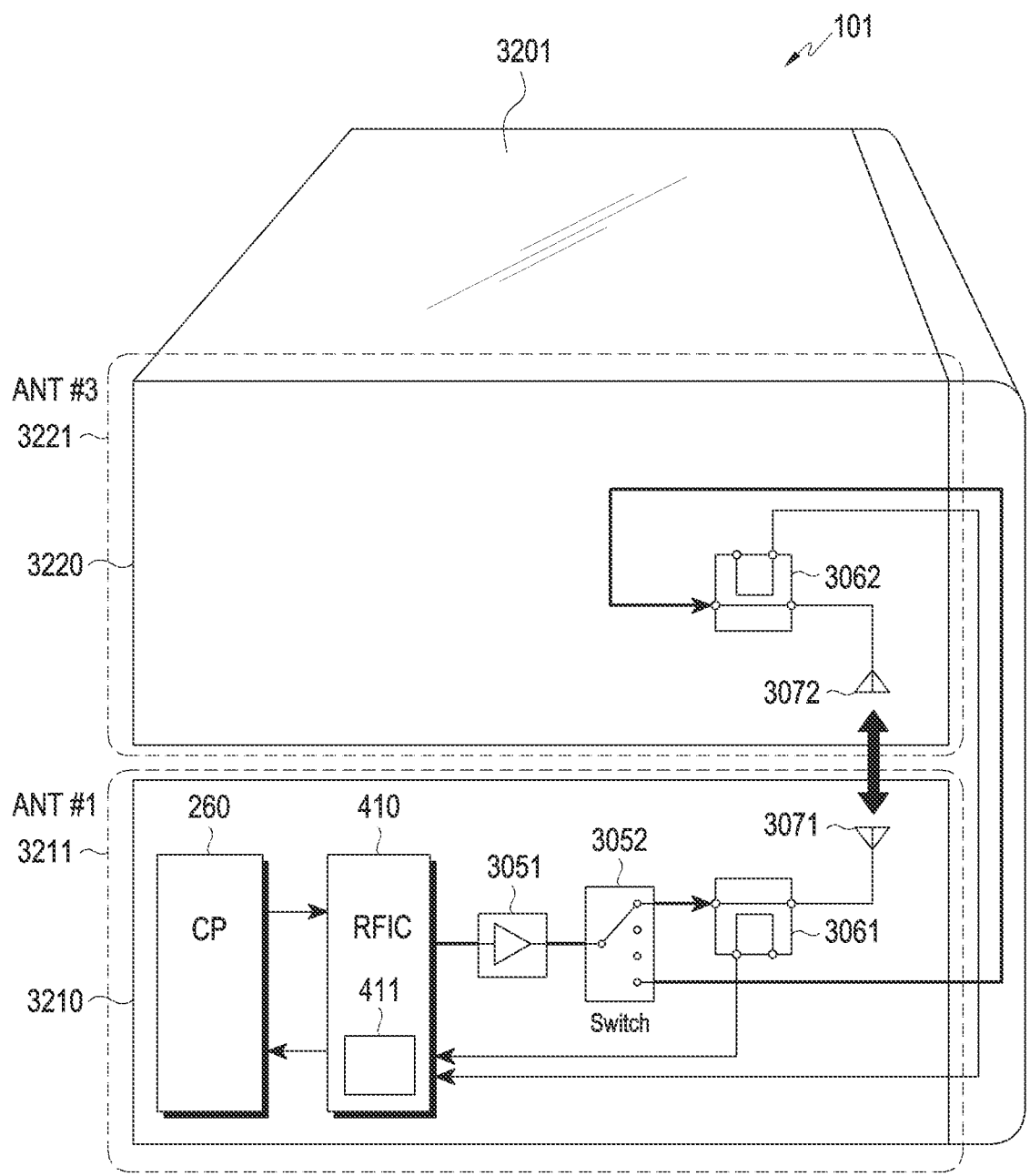
FIG. 32 is a circuit diagram illustrating an electronic device according to an embodiment of the disclosure.

FIG. 32 is a circuit diagram illustrating an electronic device according to an embodiment of the disclosure.

Referring to FIG. 32, the electronic device 101 may include a communication processor 260, an RFIC 410, a PAM 3051, a switch 3052, a first coupler 3061, and a first antenna 3211, in a first housing 3210. The electronic device 101 may include a second coupler 3062 and a third antenna 3221, in a second housing 3220. When the electronic device 101 is in the fully folded state, the first antenna 3211 and the third antenna 3221 may interfere with each other. For example, when the LTE B1 frequency band signal is transmitted from the lower end of the electronic device 101, and the NR N78 frequency band signal is transmitted from the upper end, if the electronic device 101 is fully folded as illustrated, the spacing between overlapping antennas is reduced, so that a signal coupling may occur. In this case, although two antennas are used, a situation in which signals are overlapped occurs like separating signals using one antenna, and the noise component of each signal may increase, degrading signal quality.

According to various embodiments, when the electronic device 101 is in the folded state so that the spacing between antennas is reduced, it is possible to lower the priority of the corresponding path by setting the folding state information as an AP event and setting the path loss to infinity (00). For example, as set forth in Table 18 below, the folded state (closed state) of the electronic device 101 may be set as an AP event, and the path loss value for the antenna paths overlapping due to a change in the shape of the electronic device 101 may be set to infinity, so that the priority is lowered, and the corresponding path is not selected.

TABLE 18

| Event type | | Loss | Affected antenna | | | |
| --- | --- | --- | --- | --- | --- | --- |
| Type | Value | (dB) | #1 | #2 | #3 | #4 |
| AP | Camera | 7 | | ○ | | ○ |
| CP | RCV(Hand) | 2 | | ○ | | ○ |
| AP | Close | 99(∞) | | | | ○ |
| AP | GRIP | 3 | ○ | | ○ | |

According to various embodiments, the total antenna loss in the state set as shown in Table 18 may be set as shown in Table 19 below.

TABLE 19

| | Antenna | | | Loss | | |
| --- | --- | --- | --- | --- | --- | --- |
| Priority | antenna | position | upper/lower | Default | EVENT | Total |
| 1 | #2 | main board | high | 6 | 0 | 6 |
| 2 | #2 | main board | high | 6 | 2 | 7 |
| 3 | #3 | sub board | low | 8 | 0 | 8 |
| 4 | #3 | sub board | low | 8 | 3 | 11 |
| 5 | #2 | main board | high | 6 | 7 | 13 |
| 6 | #4 | sub board | high | 7 | 99(∞) | 99(∞) |

Figure 33:
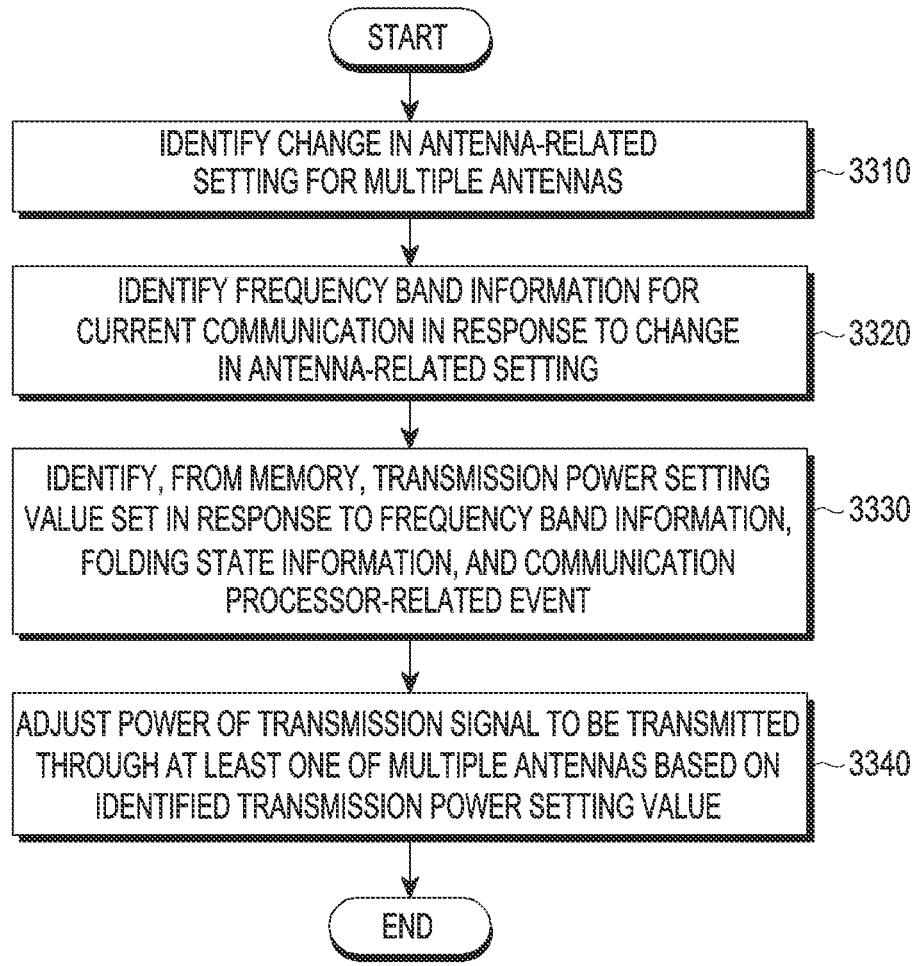
FIG. 33 is a flowchart illustrating an operation method of an electronic device according to an embodiment of the disclosure.

Referring to Table 19, the path which may cause a problem according to each event may be set to have low priority so that the path is not selected. If the transmission path is determined based on Table 19 above, it is possible to additionally limit or compensate for the transmission power according to the value set based on the frequency band, the AP event, and the CP event as shown in Table 7 above. FIG. 33 is a flowchart illustrating an operation method of an electronic device according to an embodiment of the disclosure; An electronic device (e.g., the electronic device 101) may include a memory (e.g., the memory 130), a communication processor (e.g., the wireless communication module 192, the first communication processor 212, the second communication processor 214, or the integrated communication processor 260), at least one RFIC (e.g., the first RFIC 222, the second RFIC 224, the third RFIC 226, the fourth RFIC 228, or the RFIC 410) connected with the communication processor, and a plurality of antennas (e.g., the antenna module 197, the first antenna module 242, the second antenna module 244, the third antenna module 246, the first antenna 441, the second antenna 442, the third antenna 443, the fourth antenna 444, and the fifth antenna 445) individually connected with the at least one RFIC and at least one RFFE circuit (e.g., the first RFFE 232 or 431, the second RFFE 234 or 432, or the third RFFE 236 or 433) or at least one antenna tuning circuit (e.g., the first antenna tuning circuit 441a, the second antenna tuning circuit 442a, or the third antenna tuning circuit 443a).

Referring to FIG. 33, according to various embodiments, the electronic device 101 may identify a change in antenna-related settings for a plurality of antennas in operation 3310. The change in the antenna-related setting may include a change in the path of the transmission signal transmitted from at least one RFIC to at least one antenna among the plurality of antennas. The change in the antenna-related setting may include a change in the setting of the antenna tuning circuit.

According to various embodiments, the electronic device 101 may identify frequency band information (e.g., the frequency band information 1112 of FIG. 11) currently in communication, in response to the change in the antenna-related setting in operation 3320.

According to various embodiments, in operation 3330, the electronic device 101 may identify, from the memory (e.g., the memory 1110 of FIG. 11), a setting value of the transmission power set corresponding to the frequency band information, folding state information (e.g., folded state or unfolded state), and communication processor-related event information (e.g., the CP event information 1111 of FIG. 11). The communication processor-related event may include at least one of carrier aggregation, dual connectivity (DC), antenna diversity (e.g., 2Rx or 4Rx), MIMO, antenna switching, call event, or dual connectivity (DC).

According to various embodiments, in operation 3340, the electronic device 101 may adjust the power of the transmission signal to be transmitted through at least one antenna among a plurality of antennas based on the identified setting value of the transmission power.

According to various embodiments, when identifying the setting value of the transmission power, the electronic device 101 may further consider an event related to the application processor. The application processor-related event may include an event based on the signal received from at least one sensor and may include at least one of, e.g., a grip event sensed by a grip sensor, a proximity event sensed by a proximity sensor, an event related to an image sensor, or an event related to connection of an external connecting terminal.

Figure 34:
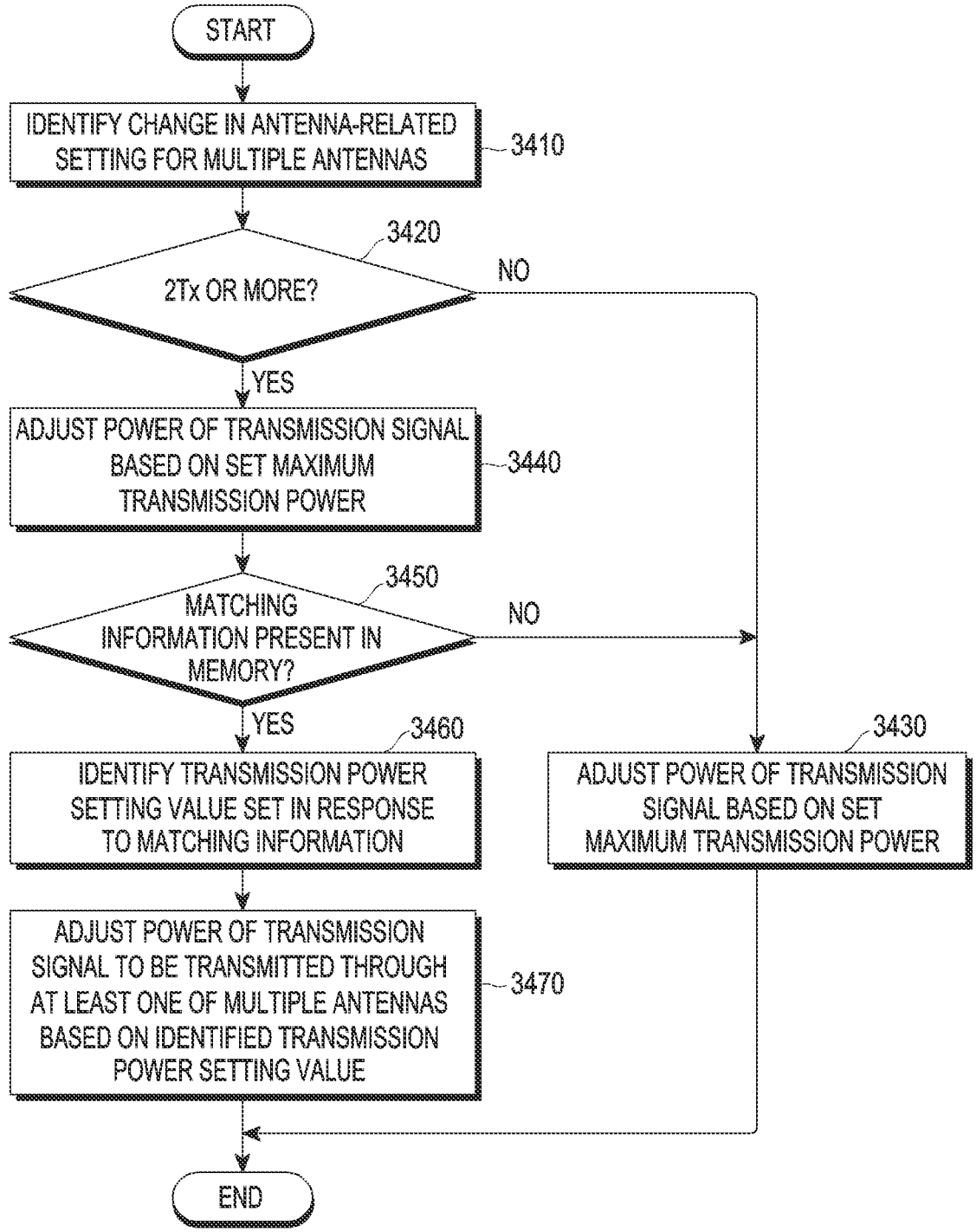
FIG. 34 is a flowchart illustrating an operation method of an electronic device according to an embodiment of the disclosure.

FIG. 34 is a flowchart illustrating an operation method of an electronic device according to an embodiment of the disclosure. An electronic device (e.g., the electronic device 101) may include a memory (e.g., the memory 130), a communication processor (e.g., the wireless communication module 192, the first communication processor 212, the second communication processor 214, or the integrated communication processor 260), at least one RFIC (e.g., the first RFIC 222, the second RFIC 224, the third RFIC 226, the fourth RFIC 228, or the RFIC 410) connected with the communication processor, and a plurality of antennas (e.g., the antenna module 197, the first antenna module 242, the second antenna module 244, the third antenna module 246, the first antenna 441, the second antenna 442, the third antenna 443, the fourth antenna 444, and the fifth antenna 445) individually connected with the at least one RFIC and at least one RFFE circuit (e.g., the first RFFE 232 or 431, the second RFFE 234 or 432, or the third RFFE 236 or 433) or at least one antenna tuning circuit (e.g., the first antenna tuning circuit 441a, the second antenna tuning circuit 442a, or the third antenna tuning circuit 443a).

Referring to FIG. 34, according to various embodiments, the electronic device 101 may identify a change in antenna-related settings for a plurality of antennas in operation 3410. The change in the antenna-related setting may include a change in the path of the transmission signal transmitted from at least one RFIC to at least one antenna among the plurality of antennas. The change in the antenna-related setting may include a change in the setting of the antenna tuning circuit.

According to various embodiments, in operation 3420, the electronic device 101 may identify whether the number of transmission paths is two or more (2Tx or more) (e.g., EN-DC or ULCA) with reference to an event related to the communication processor. As a result of the identification, unless the number of transmission paths is two or more (2Tx or more) (No in operation 3420), the electronic device 101 may adjust the power of the transmission signal based on a preset maximum transmission power in operation 3430. According to various embodiments, referring to FIGS. 2A and 2B together, as an example where the number of the transmission paths is two or more, the embodiments described below may be applied even where a plurality of antenna elements in one antenna module (e.g., the third antenna module (e.g., an mmWave module) of FIGS. 2A and 2B) have a plurality of transmission paths. According to another embodiment, as an example where the number of the transmission paths is two or more, it may include the case of including a plurality of transmission paths, as the first transmission path for converting into a Sub6 band (e.g., about 6 GHz or less) RF signal (hereinafter, a 5G Sub6 RF signal) to be used in the second cellular network 294 (e.g., a 5G network) through the second RFFE 234 and then transmitting it through the second antenna module 244 and the second transmission path for converting into a 5G Above6 band (e.g., about 6 GHz to about 60 GHz) RF signal (hereinafter, a 5G Above6 RF signal) to be used in the second cellular network 294 (e.g., a 5G network) through the third RFFE 236 and then transmitting it through the third antenna module 246. For example, the above-described methods for adjusting the power of transmission signal may be applied to the transmission power of the 5G Sub6 band (e.g., about 6 GHz or less) RF signal transmitted through the first transmission path and the transmission power of the 6G Above6 band (e.g., about 6 GHz to about 60 GHz) RF signal transmitted through the second transmission path.

According to various embodiments, if the number of transmission paths is two or more (2Tx or more) (e.g., in the case of EN-DC or ULCA), the electronic device 101 may identify, from the memory (e.g., the memory 1110 of FIG. 11), a setting value of the transmission power set corresponding to the frequency band information, folding state information (e.g., folded state or unfolded state), and communication processor-related event information (e.g., the CP event information 1111 of FIG. 11) in operation 3440. The communication processor-related event may include at least one of carrier aggregation, dual connectivity (DC), antenna diversity (e.g., 2Rx or 4Rx), MIMO, antenna switching, call event, or dual connectivity (DC).

According to various embodiments, in operation 3450, the electronic device 101 may identify whether information matching the identified frequency band information and event information related to the communication processor exists in the memory. As a result of the identification, if no matching information exists in the memory (No in operation 3450), the electronic device 101 may adjust the power of the transmission signal based on a preset maximum transmission power in operation 3430.

According to various embodiments, as a result of the identification, when matching information exists in the memory (Yes in operation 3450), the electronic device 101 may identify the setting value of the transmission power set corresponding to the matching information from the memory (e.g., the memory 1110 of FIG. 11) in operation 3460. The communication processor-related event may include at least one of carrier aggregation, dual connectivity (DC), antenna diversity (e.g., 2Rx or 4Rx), MIMO, antenna switching, call event, or dual connectivity (DC).

According to various embodiments, in operation 3470, the electronic device 101 may adjust the power of the transmission signal to be transmitted through at least one antenna among a plurality of antennas based on the identified setting value of the transmission power.

According to various embodiments, when identifying the setting value of the transmission power, the electronic device 101 may further consider an event related to the application processor. The application processor-related event may include an event based on the signal received from at least one sensor and may include at least one of, e.g., a grip event sensed by a grip sensor, a proximity event sensed by a proximity sensor, an event related to an image sensor, or an event related to connection of an external connecting terminal.

Figure 35:
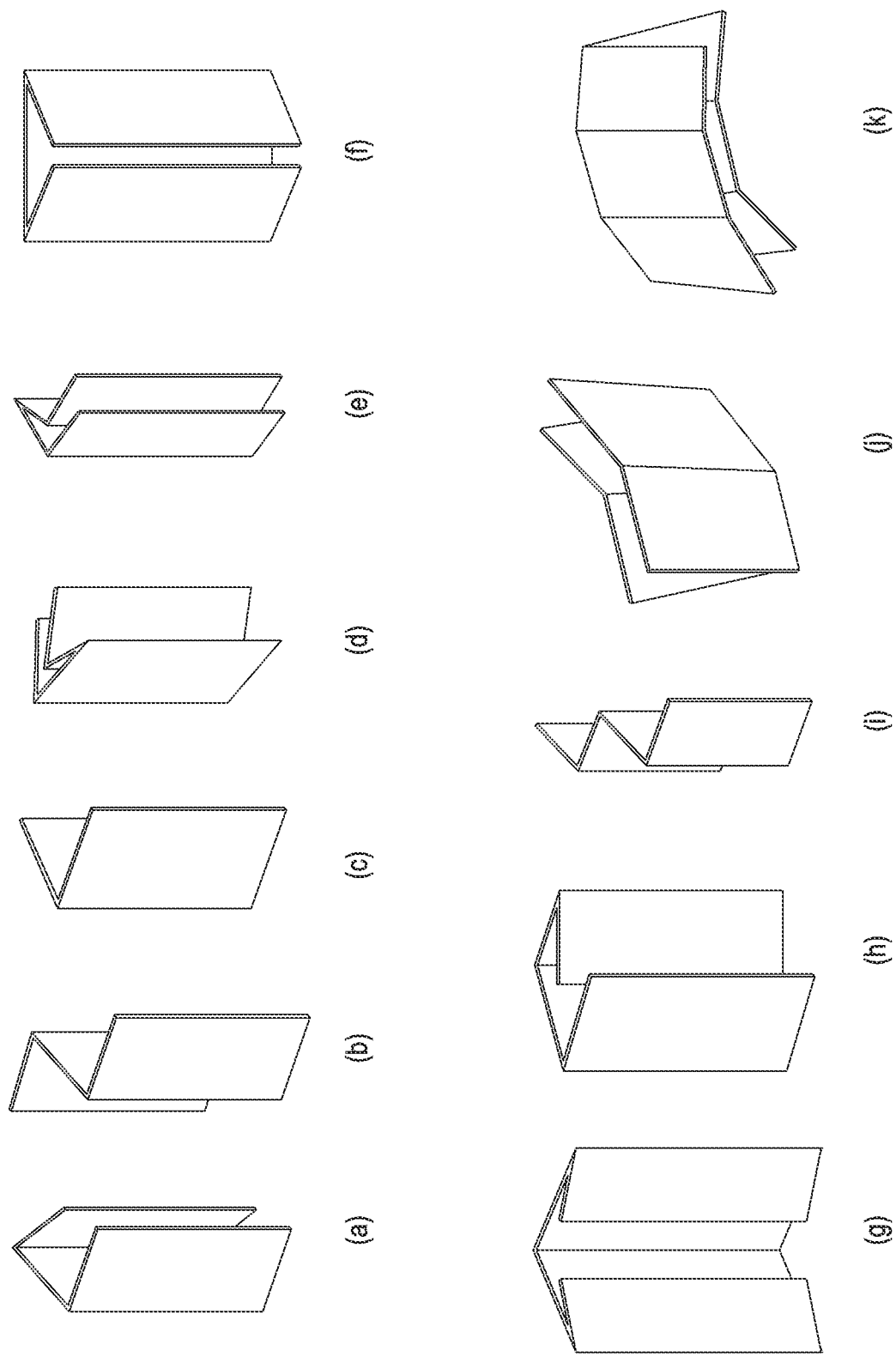
FIG. 35 is a view illustrating examples of a flexible display according to an embodiment of the disclosure.

FIG. 35 is a view illustrating various examples of an electronic device including at least two or more housing structures and a flexible display according to an embodiment of the disclosure.

Referring to FIG. 35, an electronic device (e.g., the electronic device 101 of FIG. 1) may include two or more housing structures rotatably connected with each other and a flexible display.

According to various embodiments, the flexible display may be disposed on two or more housing structures and may be bent according to the rotational state of the housing structures.

According to various embodiments, the electronic device may be formed in various forms according to two or more housing structures and a flexible display provided in the electronic device and a rotational state of the housing structures. For example, referring to FIG. 35, the various forms include a form (half fold) in which two areas are formed in the electronic device (e.g., a flexible display), a form (e.g., tri fold, z fold, or single open gate fold) in which three areas are formed in the electronic device (e.g., a flexible display), a form (e.g., double parallel reverse fold, double parallel fold, double gate fold, roll fold, accordion fold, half fold then half fold) in which four areas are formed in the electronic device (e.g., a flexible display), and a fold (e.g., half fold then tri fold) in which more areas are formed. The electronic device may include housing structures rotatably connected with each other and a flexible display. The housing structures may be rotated into a corresponding form.

The electronic device and the operation method thereof according to various embodiments of the disclosure may also be applied not only to an electronic device including two housing structures but also to an electronic device including three or more housings and a flexible display as illustrated in FIG. 35.

The electronic device according to various embodiments of the disclosure may include at least one antenna in each of the at least two housing structures. As illustrated in FIG. 35, the radiation direction of the antenna included in each housing structure may be changed as each housing structure is folded into an unfolded state or a folded state.

According to any one of various embodiments, an electronic device (e.g., the electronic device 101) may comprise a first housing, a second housing pivotably coupled with the first housing, a memory (e.g., the memory 130), an application processor, a communication processor (e.g., the wireless communication module 192, the first communication processor 212, the second communication processor 214, or the integrated communication processor 260), at least one RFIC (e.g., the first RFIC 222, the second RFIC 224, the third RFIC 226, the fourth RFIC 228, or the RFIC 410) connected with the communication processor, and a plurality of antennas each disposed inside or in a portion of the first housing or the second housing and connected with the at least one RFIC through at least one RFFE (e.g., the first RFFE 232 or 431, the second RFFE 234 or 432, or the third RFFE 236 or 433) circuit to transmit or receive a signal corresponding to at least one communication network. The communication processor may identify a change in an antenna-related setting for the plurality of antennas, identify frequency band information about a signal being communicated through at least one antenna among the plurality of antennas, in response to the change in the antenna-related setting, identify folding state information between the first housing and the second housing received from the application processor, identify, from the memory, a transmission power-related setting value set corresponding to the identified frequency band information, the folding state information, and an event related to the communication processor, and control to adjust a power of a transmission signal to be transmitted through at least one antenna among the plurality of antennas, based on the identified transmission power-related setting value.

According to various embodiments, the folding state information may include information corresponding to a folding angle between the first housing structure and the second housing structure.

According to various embodiments, the change in the antenna-related setting may include a change in a path of a transmission signal transmitted from the at least one RFIC to at least one antenna among the plurality of antennas.

According to various embodiments, the change in the antenna-related setting may include a change in a setting of the antenna tuning circuit.

According to various embodiments, the event related to the communication processor may include at least one of uplink carrier aggregation (CA), downlink CA, antenna diversity, multiple-input and multiple-output (MIMO), antenna switching, a call event, dual connectivity (DC), or an inter-reference signal received power (RSRP) difference.

According to various embodiments, the communication processor may identify an event related to the application processor received from the application processor and may identify a setting value related to a transmission power set in response to the event related to the application processor.

According to various embodiments, the event related to the application processor may include an event based on a signal received from at least one sensor.

According to various embodiments, the event related to the application processor may include at least one of a grip event sensed by a grip sensor, a proximity event sensed by a proximity sensor, an event related to an image sensor, or an event related to connection of an external connecting terminal.

According to various embodiments, the identified frequency band information and the event related to the communication processor may be stored with a transmission power-related setting value in the memory, as a mapping table.

According to various embodiments, the electronic device may further comprise at least one switch for changing transmission paths corresponding to the plurality of antennas. The communication processor may control a transmission path of the transmission signal by controlling the at least one switch.

According to various embodiments, the transmission power-related setting value may be determined based on at least one of a maximum transmission power set for each transmission path of the electronic device, a maximum transmission power received from a base station, or a maximum transmission power considering a specific absorption rate (SAR) backoff event.

According to any one of various embodiments, a method for controlling a power of a transmission signal in an electronic device comprising a first housing, a second housing pivotably coupled with the first housing, a memory (e.g., the memory 130), an application processor, a communication processor (e.g., the wireless communication module 192, the first communication processor 21, the second communication processor 214, or the integrated communication processor 260), at least one RFIC (e.g., the first RFIC 222, the second RFIC 224, the third RFIC 226, the fourth RFIC 228, or the RFIC 410) connected with the communication processor, and a plurality of antennas each disposed inside or in a portion of the first housing or the second housing and connected with the at least one RFIC through at least one RFFE circuit (e.g., the first RFFE 232 or 431, the second RFFE 234 or 432, or the third RFFE 236 or 433) to transmit or receive a signal corresponding to at least one communication network, may comprise identifying a change in an antenna-related setting for the plurality of antennas, identifying frequency band information for a signal being communicated through at least one antenna among the plurality of antennas, in response to the change in the antenna-related setting, identifying folding state information between the first housing and the second housing received from the application processor, identifying, from the memory, a transmission power-related setting value set corresponding to the identified frequency band information, the folding state information, and an event related to the communication processor, and adjusting a power of a transmission signal to be transmitted through at least one antenna among the plurality of antennas, based on the identified transmission power-related setting value.

According to various embodiments, the folding state information may include information corresponding to a folding angle between the first housing structure and the second housing structure.

According to various embodiments, the change in the antenna-related setting may include a change in a path of a transmission signal transmitted from the at least one RFIC to at least one antenna among the plurality of antennas.

According to various embodiments, the change in the antenna-related setting may include a change in a setting of the antenna tuning circuit.

According to various embodiments, the event related to the communication processor may include at least one of uplink carrier aggregation (CA), downlink CA, antenna diversity, multiple-input and multiple-output (MIMO), antenna switching, a call event, dual connectivity (DC), or an inter-reference signal received power (RSRP) difference.

According to various embodiments, the method may include identifying an event related to the application processor received from the application processor and identifying a setting value related to a transmission power set in response to the event related to the application processor.

According to various embodiments, the event related to the application processor may include an event based on a signal received from at least one sensor.

According to various embodiments, the event related to the application processor may include at least one of a grip event sensed by a grip sensor, a proximity event sensed by a proximity sensor, an event related to an image sensor, or an event related to connection of an external connecting terminal.

According to various embodiments, the identified frequency band information and the event related to the communication processor may be stored with a transmission power-related setting value in the memory, as a mapping table.

According to various embodiments, the method may control at least one switch to control a transmission path of the transmission signal.

According to various embodiments, the transmission power-related setting value may be determined based on at least one of a maximum transmission power set for each transmission path of the electronic device, a maximum transmission power received from a base station, or a maximum transmission power considering a specific absorption rate (SAR) backoff event.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing configured to be movable between a first state and a second state;
a plurality of antennas each disposed inside or in a portion of the housing;
at least one processor; and
memory storing instructions that, when executed by the at least one processor, cause the electronic device to:
based on a change of state information corresponding to a state of the housing, identify a change in a radio frequency (RF) path of transmission signals to be transmitted to at least one antenna among the plurality of antennas,
identify, from the memory, a setting value related to a transmission power of the transmission signals, based on frequency band information corresponding to the transmission signal to be transmitted to at least one antenna among the plurality of antennas, and the changed RF path, and
based on the setting value related to the transmission power of the transmission signals, control to adjust a power of the transmission signals to be transmitted through the at least one antenna among the plurality of antennas.

2. The electronic device of claim 1, wherein the state information corresponding to the state of the housing comprises information corresponding to a folding angle between the first state and the second state.

3. The electronic device of claim 1, wherein the frequency band information is stored with the setting value in the memory, as a mapping table.

4. The electronic device of claim 1, wherein the setting value related to the transmission power of the transmission signals is set based on event information identified from the at least one processor.

5. The electronic device of claim 4, wherein the event information identified from the at least one processor comprises event information related to an application processor among the at least one processor.

6. The electronic device of claim 5, wherein the event information related to the application processor comprises at least one of a grip event sensed by a grip sensor, a proximity event sensed by a proximity sensor, an event related to an image sensor, or an event related to connection of an external connecting terminal.

7. The electronic device of claim 4, wherein the event information identified from the at least one processor comprises event information related to a communication processor among the at least one processor.

8. The electronic device of claim 7, wherein the event information related to the communication processor comprises at least one of uplink carrier aggregation (CA), downlink CA, antenna diversity, multiple-input and multiple-output (MIMO), antenna switching, a call event, dual connectivity (DC), or an inter-reference signal received power (RSRP) difference.

9. A method for controlling a power of transmission signals in an electronic device comprising a housing configured to be movable between a first state and a second state, a plurality of antennas each disposed inside or in a portion of the housing, and at least one processor, the method comprising:
- based on a change of the state information corresponding to a state of the housing, identifying a change in a radio frequency (RF) path of transmission signals to be transmitted to at least one antenna among the plurality of antennas;
- identifying, from memory, a setting value related to a transmission power of the transmission signals, based on frequency band information corresponding to the transmission signal to be transmitted to at least one antenna among the plurality of antennas, and the changed RF path; and
- based on the setting value related to the transmission power of the transmission signal, controlling to adjust a power of the transmission signals to be transmitted through the at least one antenna among the plurality of antennas.

10. The method of claim 9, wherein the state information corresponding to the state of the housing comprises information corresponding to a folding angle between the first state and the second state.

11. The method of claim 9, wherein the frequency band information is stored with the setting value in the memory, as a mapping table.

12. The method of claim 9, wherein the setting value related to the transmission power of the transmission signals is set based on event information identified from the at least one processor.

13. The method of claim 12, wherein the event information identified from the at least one processor comprises event information related to an application processor among the at least one processor.

14. The method of claim 13, wherein the event information related to the application processor comprises at least one of a grip event sensed by a grip sensor, a proximity event sensed by a proximity sensor, an event related to an image sensor, or an event related to connection of an external connecting terminal.

15. The method of claim 12, wherein the event information identified from the at least one processor comprises event information related to a communication processor among the at least one processor.

16. The method of claim 15, wherein the event information related to the communication processor comprises at least one of uplink carrier aggregation (CA), downlink CA, antenna diversity, multiple-input and multiple-output (MIMO), antenna switching, a call event, dual connectivity (DC), or an inter-reference signal received power (RSRP) difference.

17. A non-transitory computer readable storage medium storing one or more programs, the one or more programs comprising instructions configured to, when executed by at least one processor of an electronic device, cause the electronic device to:
- based on a change of state information corresponding to a state of a housing of the electronic device, identify a change in a radio frequency (RF) path of transmission signals to be transmitted to at least one antenna among a plurality of antennas each disposed inside or in a portion of the housing;
- identify, from memory, a setting value related to a transmission power of the transmission signals, based on frequency band information corresponding to the transmission signal to be transmitted to at least one antenna among the plurality of antennas, and the changed RF path; and
- based on the setting value related to the transmission power of the transmission signals, control to adjust a power of the transmission signals to be transmitted through the at least one antenna among the plurality of antennas.

* * * * *